United States Patent [19]
Kuwabara et al.

[11] Patent Number: 5,590,388
[45] Date of Patent: *Dec. 31, 1996

[54] MOLDED CERAMIC ARTICLES AND PRODUCTION METHOD THEREOF

[75] Inventors: Mitsuo Kuwabara; Kiyoshi Ikegami; Teruaki Yoshida; Koji Takahashi; Tamotsu Harada; Takeshi Komiyama; Fumio Hirai; Masamichi Hayashi, all of Sayama, Japan

[73] Assignee: Honda Giken Kogyo Kabushiki Kaisha, Tokyo, Japan

[*] Notice: The term of this patent shall not extend beyond the expiration date of Pat. No. 5,374,391.

[21] Appl. No.: 299,306

[22] Filed: Sep. 1, 1994

Related U.S. Application Data

[62] Division of Ser. No. 76,500, Jun. 9, 1993, Pat. No. 5,374,391, which is a division of Ser. No. 965,085, Oct. 22, 1992, Pat. No. 5,443,615, which is a continuation of Ser. No. 652,884, Feb. 8, 1991, abandoned.

[30] Foreign Application Priority Data

| Feb. 13, 1990 | [JP] | Japan | 2-33023 |
| Feb. 22, 1990 | [JP] | Japan | 2-41976 |
| Mar. 22, 1990 | [JP] | Japan | 2-72854 |
| Mar. 26, 1990 | [JP] | Japan | 2-76131 |

[51] Int. Cl.$^6$ .......................... B22F 3/12
[52] U.S. Cl. ............... 419/39; 419/10; 419/16; 419/17; 419/19; 419/32; 419/37; 419/42; 419/57; 419/58
[58] Field of Search ............... 419/10, 16, 17, 419/19, 32, 37, 42, 57, 58, 5, 38, 39

[56] References Cited

U.S. PATENT DOCUMENTS

| 2,891,860 | 6/1959 | Woolard | 75/159 |
| 4,137,026 | 1/1979 | Gerstl | 425/78 |
| 4,562,040 | 12/1985 | Yamada | 419/23 |

(List continued on next page.)

FOREIGN PATENT DOCUMENTS

| 0160855 | 11/1985 | European Pat. Off. |
| 62077439 | 4/1987 | European Pat. Off. |
| 227973 | 7/1987 | European Pat. Off. |

(List continued on next page.)

OTHER PUBLICATIONS

Derwent Pub. Ltd. London, GB; AN 84-297727 & JP 59184714 (Hitachi Chemical KK) 20 Oct. 1984.

Pat. Abs. Japan, vol. 011, No. 080 (C-409) Mar. 11, 1987 & JP 61235524 (JGC Corp.) Oct., 20, 1986.

(List continued on next page.)

*Primary Examiner*—Donald P. Walsh
*Assistant Examiner*—John N. Greaves
*Attorney, Agent, or Firm*—Birch, Stewart, Kolasch & Birch, LLP

[57] ABSTRACT

A method of producing a molded ceramic article comprises the first step mixing powdery raw materials and a liquid additive, thereby obtaining a mixed raw material, the second step press-molding the mixed raw material obtained in the first step in a hydrostatically applied condition of pressure, thereby removing an excess of the liquid additive to obtain a preform, and the third step calcining the preform obtained in the second step to obtain a molded ceramic article. The molded ceramic article comprises, as a principal component, copper and, as essential components, Cr and Ni within composition ranges of $0.1 \leq Cr < 2$ wt. % and $0.1 \leq Ni < 10$ wt. % and further at least one additive component selected from the group consisting of the following composition ratios: the following composition ratios: $0 < Fe < 5$ wt. %, $0 \leq Co < 5$ wt. %, $0 \leq Al < 10$ wt. %, $0 \leq Ti < 20$ wt. %, $0 \leq Mo < 3$ wt. %, $0 \leq Si < 3$ wt. %, $0 \leq V < 3$ wt. %, $0 \leq Mg < 1$ wt. %, and $0 \leq C < 5$ wt. %, and has at least one composition range selected from the group consisting of the following composition ratios: $0 < O_2 < 10$ wt. %, $0 < N_2 < 5$ wt. % and $0 < B < 10$ wt. %.

10 Claims, 36 Drawing Sheets

U.S. PATENT DOCUMENTS

| | | | |
|---|---|---|---|
| 4,604,260 | 8/1986 | Shimizu et al. | 419/2 |
| 4,721,599 | 1/1988 | Nakamura | 419/23 |
| 4,752,333 | 6/1988 | Caisso et al. | 75/232 |
| 4,874,439 | 10/1989 | Akutsu | 148/433 |
| 4,988,480 | 1/1991 | Mecbanor | 419/11 |
| 5,049,355 | 9/1991 | Gennasi | 420/425 |
| 5,073,302 | 12/1991 | Igari et al. | 252/518 |
| 5,106,551 | 4/1992 | Kato | 264/66 |
| 5,374,391 | 12/1994 | Kuwabara et al. | 419/19 |

FOREIGN PATENT DOCUMENTS

| | | |
|---|---|---|
| 0364295 | 4/1990 | European Pat. Off. . |
| 3805794 | 9/1988 | Germany . |
| 59-035643 | 2/1984 | Japan . |
| 59-045636 | 3/1984 | Japan . |
| 60-2479 | 1/1985 | Japan . |
| 60-184479 | 9/1985 | Japan . |
| 1145104 | 6/1986 | Japan . |
| 64-78683 | 3/1989 | Japan . |
| 1152232 | 6/1989 | Japan . |
| 521927 | 6/1940 | United Kingdom . |
| 541471 | 11/1941 | United Kingdom . |
| 628323 | 8/1949 | United Kingdom . |
| 789653 | 6/1956 | United Kingdom . |
| 772435 | 4/1957 | United Kingdom . |
| 902932 | 8/1962 | United Kingdom . |
| 941947 | 11/1963 | United Kingdom . |
| 1105998 | 10/1966 | United Kingdom . |
| 1300275 | 12/1972 | United Kingdom . |
| 1448736 | 9/1976 | United Kingdom . |
| 1571101 | 7/1980 | United Kingdom . |
| 2163780 | 3/1986 | United Kingdom . |
| WO06871 | 11/1986 | WIPO . |

OTHER PUBLICATIONS

DIN 30 900 (Aug. Jul. 1982), S. 14.

Modern Cer. Eng., David W. Richerson, pp. 160–167, Att. 3, p. 417.

ABC Technik and Naturwissenschaft, Bd. 1 A–K, Vlg. Harri Deutsch, 1970, S. 489, 490.

Progress in Powder Metallurgy, vol. 43, "1987 Annual Pm Conf. Proc." (May 17–20, 1987 Dallas/Texas), S. 789–792.

FIG.9

| | | Components other than Copper (%) | | | | | | | | | | | | | resistance (μΩ) | Hardness, HRB | Number of times of welding before the occurrence of fusion bonding |
|---|---|---|---|---|---|---|---|---|---|---|---|---|---|---|---|---|---|
| | | Cr | Ni | Fe | Co | Al | Ti | Mo | Si | V | Mg | C | O₂ | N₂ | B | | | |
| Example | 1 | 1.0 | 0.2 | | | 0.4 | 0.6 | | 0.2 | | | | 1.2 | 0.1 | | 2 | 60 ~ 65 | 3500 |
| | 2 | 0.6 | 0.4 | | | 0.2 | 1.2 | | | | | | 0.8 | 0.1 | | 2 | 60 ~ 65 | 3500 |
| | 3 | 1.0 | | 0.2 | 0.4 | 0.8 | 1.5 | 0.2 | 0.2 | | | 0.1 | | | | 3 | 70 ~ 74 | 3000 |
| | 4 | 0.3 | 0.7 | | 0.1 | 0.1 | | | | | | | 1.2 | | 0.6 | 3 | 70 ~ 76 | 3000 |
| | 5 | 0.8 | 0.1 | | 0.8 | 0.4 | | | | | | | | | | 2 | 60 ~ 65 | 3500 |
| | 6 | 0.4 | 0.3 | | | | | | | | | | 0.5 | | | 3 | 60 ~ 65 | 2500 |
| | 7 | 0.8 | | | | 0.5 | 0.5 | 0.2 | 0.3 | 0.3 | 0.1 | 0.2 | 0.1 | | | 2 | 60 ~ 65 | 3500 |
| | 8 | 0.8 | 0.5 | | | 0.5 | 0.8 | | | | 0.1 | | 0.8 | 0.3 | | 3 | 63 ~ 68 | 3000 |
| | 9 | 0.6 | 0.1 | 0.1 | | 0.4 | 0.5 | | 0.15 | | | | 0.9 | 0.2 | | 3 | 62 ~ 68 | 3000 |
| Comp. Ex. | 1 | Commercial Cr-Cu, Cr Content : 0.8wt.% | | | | | | | | | | | | | | 7 | 63 ~ 65 | 600 |
| | 2 | Commercial Al₂O₃ dispersed Copper, Al₂O₃ content : 0.3wt.% | | | | | | | | | | | | | | 6 | 60 ~ 65 | 800 |

FIG. 10A

| No. | Chromium added (wt%) | Temperature upon heat treatment at 100 ~ 300°C (°C) | Temperature upon holding at 700°C or lower (°C) | Sintering Temperature (°C) | Temperature of solution treatment (°C) | Aging temperature (°C) |
|---|---|---|---|---|---|---|
| 1 | 0.1 | 300 | 680 | 950 | 950 | 500 |
| 2 | 0.3 | 280 | 690 | 1040 | 1020 | 495 |
| 3 | 0.4 | 100 | 650 | 1050 | 1000 | 500 |
| 4 | 0.4 | 300 | 700 | 1060 | 1030 | 515 |
| 5 | 0.8 | 80 | 650 | 1030 | 1000 | 500 |
| 6 | 0.8 | 150 | 650 | 1000 | 1000 | 485 |
| 7 | 0.8 | 250 | 680 | 1040 | 1060 | 510 |
| 8 | 1.5 | 180 | 600 | 1060 | 1020 | 500 |
| 9 | 1.5 | 270 | 630 | 1050 | 1000 | 500 |
| 10 | 1.5 | 320 | 700 | 1055 | 1040 | 485 |
| 11 | 2.4 | 310 | 700 | 1060 | 1035 | 530 |
| 12 | 2.4 | 300 | 680 | 1060 | 1020 | 500 |
| 13 | 2.4 | 110 | 580 | 1060 | 1010 | 500 |
| 14 | 2.4 | 95 | 540 | 1050 | 990 | 495 |
| 15 | 2.8 | 305 | 690 | 1065 | 1020 | 505 |
| 16 | 2.8 | 300 | 680 | 1030 | 1000 | 500 |
| 17 | 2.8 | 180 | 620 | 1050 | 1010 | 485 |
| 18 | 2.8 | 95 | 570 | 1025 | 1000 | 515 |
| 19 | 3.0 | 305 | 700 | 1070 | 1050 | 470 |
| 20 | 3.0 | 240 | 680 | 1065 | 1000 | 495 |
| 21 | 3.0 | 120 | 580 | 1030 | 980 | 500 |
| 22 | 3.0 | 95 | 530 | 1070 | 990 | 510 |
| 23 | 3.1 | 300 | 685 | 1065 | 1010 | 500 |
| 24 | 3.1 | 100 | 645 | 1065 | 1000 | 500 |
| 25 | 3.1 | 305 | 720 | 1068 | 1040 | 520 |
| 26 | 3.1 | 95 | 590 | 1030 | 980 | 500 |

FIG. 10B

| | Found amount of chromium (wt%) | Density of sintered body (g/cm³) | H_RB Hardness | Found amount of Oxygen (wt%) | Number of times of spot welding (times) | Number of times of fusion bonding (times) | Number of times of fusion bonding / Number of times of spot welding |
|---|---|---|---|---|---|---|---|
| 1 | 0.096 | 8.56 | 38 | 0.01 | 150 | 53 | 35.3% |
| 2 | 0.29 | 8.76 | 46 | 0.05 | 500 | 85 | 17.0% |
| 3 | 0.40 | 8.79 | 58 | 0.04 | 1200 | 68 | 5.7% |
| 4 | 0.41 | 8.87 | 63 | 0.05 | 1400 | 53 | 3.8% |
| 5 | 0.79 | 8.82 | 61 | 0.05 | 1600 | 48 | 3.0% |
| 6 | 0.82 | 8.78 | 58 | 0.07 | 2200 | 52 | 2.4% |
| 7 | 0.80 | 8.88 | 63 | 0.08 | 2600 | 61 | 2.4% |
| 8 | 1.49 | 8.94 | 65 | 0.16 | 3100 | 32 | 1.0% |
| 9 | 1.48 | 8.92 | 63 | 0.21 | 2700 | 25 | 0.9% |
| 10 | 1.51 | 8.48 | 52 | 0.30 | 1600 | 48 | 3.0% |
| 11 | 2.38 | 8.57 | 56 | 0.41 | 2000 | 45 | 2.3% |
| 12 | 2.40 | 8.91 | 67 | 0.28 | 2900 | 28 | 1.0% |
| 13 | 2.41 | 8.94 | 67 | 0.25 | 3400 | 25 | 0.7% |
| 14 | 2.40 | 8.88 | 62 | 0.21 | 3000 | 30 | 0.1% |
| 15 | 2.80 | 8.75 | 54 | 0.52 | 2200 | 80 | 3.6% |
| 16 | 2.81 | 8.89 | 62 | 0.34 | 2700 | 65 | 2.4% |
| 17 | 2.79 | 8.88 | 62 | 0.33 | 2600 | 70 | 2.7% |
| 18 | 2.81 | 8.74 | 52 | 0.30 | 2300 | 100 | 4.3% |
| 19 | 2.99 | 8.32 | 34 | 0.61 | 1200 | 150 | 1.3% |
| 20 | 2.98 | 8.86 | 56 | 0.48 | 2000 | 82 | 4.1% |
| 21 | 3.00 | 8.41 | 36 | 0.47 | 1500 | 100 | 6.7% |
| 22 | 3.00 | 8.34 | 28 | 0.21 | 1050 | 110 | 10.5% |
| 23 | 3.09 | 8.48 | 38 | 0.49 | 150 | 58 | 38.7% |
| 24 | 3.12 | 8.74 | 46 | 0.32 | 540 | 130 | 34.1% |
| 25 | 3.11 | 8.21 | 18 | 0.63 | 90 | 40 | 44.4% |
| 26 | 3.11 | 8.56 | 42 | 0.42 | 300 | 125 | 41.7% |

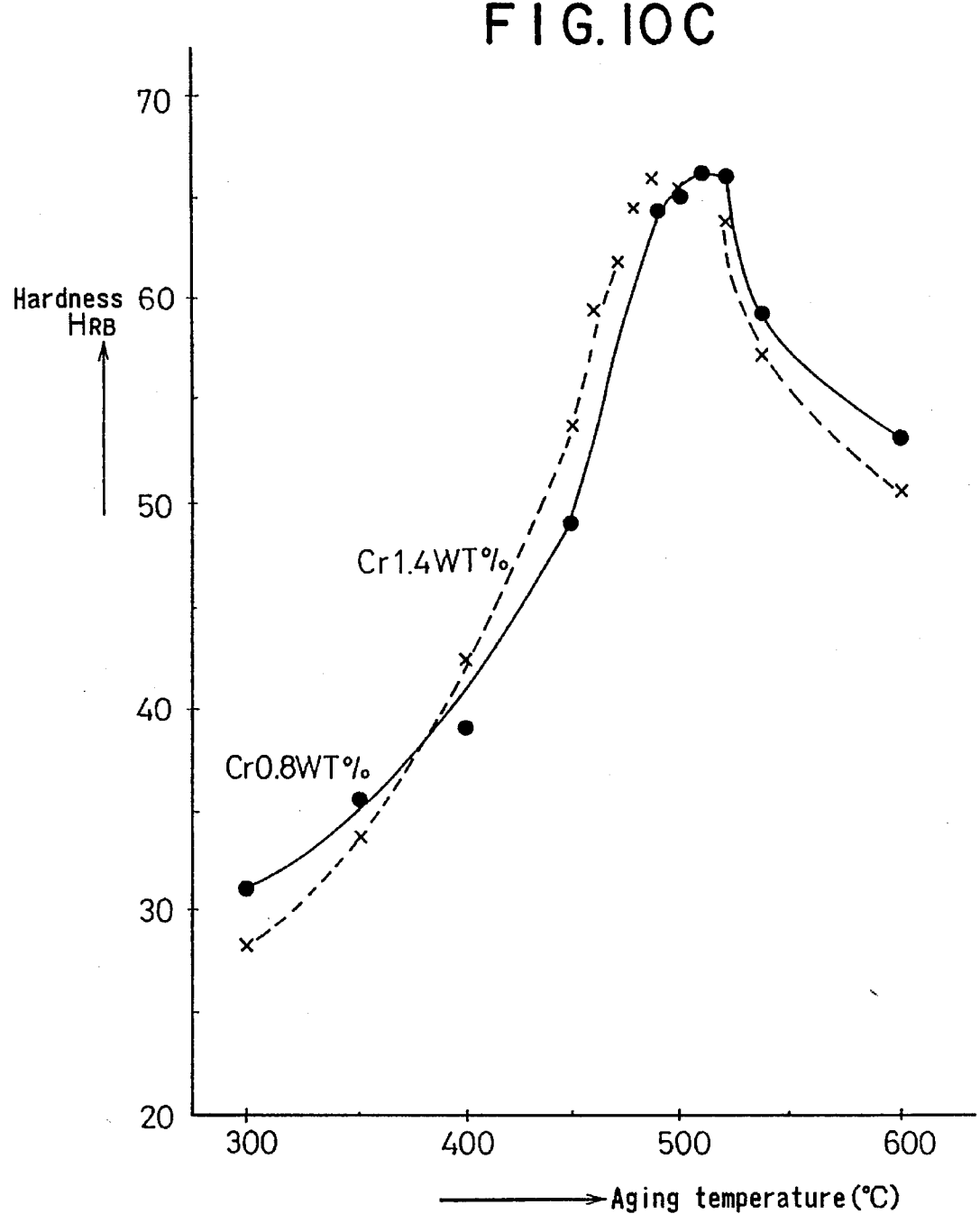

Temperature of solution treatment (°C)

FIG. 11

| No. | Chromium content $H_2/N_2 \times 100\%$ | Oxygen content in sintered body (wt%) | (wt%) | Density of sintered body | Hardness | Number of spot welding (times) | Number of times of fusion bonding (times) |
|---|---|---|---|---|---|---|---|
| 1  | 0  | 0.8 | 0.08 | 8.78 | 60 | 1600 | 34 |
| 2  | 5  | 0.8 | 0.07 | 8.86 | 68 | 2200 | 69 |
| 3  | 15 | 0.8 | 0.07 | 8.93 | 65 | 3200 | 45 |
| 4  | 35 | 0.8 | 0.06 | 8.92 | 65 | 3000 | 38 |
| 5  | 0  | 1.4 | 0.21 | 8.82 | 63 | 2400 | 28 |
| 6  | 5  | 1.4 | 0.18 | 8.88 | 63 | 2700 | 27 |
| 7  | 15 | 1.4 | 0.15 | 8.92 | 67 | 3400 | 37 |
| 8  | 35 | 1.4 | 0.12 | 8.93 | 67 | 3500 | 48 |
| 9  | 0  | 2.4 | 0.34 | 8.65 | 56 | 1300 | 50 |
| 10 | 5  | 2.4 | 0.25 | 8.78 | 62 | 1500 | 30 |
| 11 | 15 | 2.4 | 0.22 | 8.85 | 67 | 2800 | 32 |
| 12 | 35 | 2.4 | 0.18 | 8.92 | 67 | 3000 | 35 |

FIG.12

| | Continuous spot-welding ability (times) | Number of times of fusion bonding (times) | Density (g/cm³) | Hardness $H_{R_B}$ |
|---|---|---|---|---|
| Invention | 2500 | 28 | 8.91 | 53 |
| Comp. Ex. | 900 | 129 | 8.76 | 74 |

FIG.13

| No. | Cr content (wt%) | C content (wt%) | Sintering temperature (°C) | Pressure (kgf/cm²) | Temperature of solution treatment (°C) | Aging temperature (°C) |
|---|---|---|---|---|---|---|
| 1 | 0.3 | 0.005 | 1055 | 0.3 | 1000 | 500 |
| 2 | 0.4 | 0.01 | 1055 | 0.1 | 1000 | 500 |
| 3 | 0.4 | 0.01 | 1055 | 1 | 1000 | 500 |
| 4 | 0.4 | 0.01 | 1055 | 3 | 1000 | 500 |
| 5 | 0.4 | 0.01 | 1060 | 9.5 | 1000 | 500 |
| 6 | 0.4 | Ethyl cellosolve | 1055 | 0.3 | 1000 | 500 |
| 7 | 0.8 | 0.01 | 1055 | 0.1 | 1010 | 495 |
| 8 | 0.8 | 0.01 | 1055 | 3 | 1010 | 495 |
| 9 | 0.8 | 0.01 | 1055 | 5 | 1010 | 495 |
| 10 | 0.8 | 0.03 | 1055 | 0.1 | 1010 | 495 |
| 11 | 0.8 | 0.03 | 1055 | 1 | 1010 | 495 |
| 12 | 0.8 | Ethyl cellosolve | 1060 | 2 | 1000 | 500 |
| 13 | 1.5 | 0.03 | 1060 | 0.3 | 1010 | 500 |
| 14 | 1.5 | 0.03 | 1060 | 2.5 | 1010 | 500 |
| 15 | 1.5 | 0.03 | 1060 | 5 | 1010 | 500 |
| 16 | 1.5 | 0.03 | 1060 | 7 | 1010 | 500 |
| 17 | 1.5 | 0.06 | 1060 | 5 | 1010 | 500 |
| 18 | 1.5 | Ethyl cellosolve | 1065 | 3 | 1000 | 500 |
| 19 | 1.5 | Ethyl cellosolve | 1065 | 5 | 1000 | 500 |
| 20 | 3.0 | 0.05 | 1060 | 0.5 | 1000 | 500 |
| 21 | 3.0 | 0.05 | 1060 | 1 | 1020 | 495 |
| 22 | 3.0 | 0.05 | 1060 | 3 | 1020 | 495 |
| 23 | 3.0 | 0.05 | 1060 | 9 | 1020 | 495 |
| 24 | 3.0 | 0.1 | 1060 | 1 | 1020 | 495 |
| 25 | 3.0 | 0.1 | 1060 | 5 | 1020 | 495 |
| 26 | 3.0 | 0.1 | 1060 | 9.5 | 1020 | 495 |
| 27 | 3.0 | 0.15 | 1060 | 3 | 1020 | 495 |
| 28 | 3.1 | 0.07 | 1060 | 3 | 1000 | 500 |

FIG.14

| No. | Total amount of carbon (wt%) | Total amount of Nitrogen (wt%) | Density of sintered body (g/cm³) | Hardness Hᵣₙ | Number of times of spot welding (times) | Number of times of fusion bonding | Number of times of fusion bonding / Number of times of spot welding |
|---|---|---|---|---|---|---|---|
| 1 | 0.003 | 0.002 | 8.68 | 38 | 800 | 72 | 9 % |
| 2 | 0.006 | 0.003 | 8.84 | 52 | 1600 | 52 | 3.3% |
| 3 | 0.005 | 0.005 | 8.91 | 61 | 2500 | 53 | 2.1% |
| 4 | 0.005 | 0.008 | 8.81 | 54 | 2600 | 28 | 1.1% |
| 5 | 0.006 | 0.012 | 8.74 | 48 | 1800 | 21 | 1.2% |
| 6 | 0.005 | 0.006 | 8.88 | 58 | 2500 | 15 | 0.6% |
| 7 | 0.007 | 0.011 | 8.93 | 63 | 3200 | 16 | 0.5% |
| 8 | 0.006 | 0.015 | 8.88 | 61 | 2800 | 12 | 0.4% |
| 9 | 0.006 | 0.017 | 8.79 | 56 | 2400 | 11 | 0.5% |
| 10 | 0.016 | 0.011 | 8.91 | 63 | 3200 | 10 | 0.3% |
| 11 | 0.018 | 0.015 | 8.87 | 61 | 3000 | 9 | 0.3% |
| 12 | 0.008 | 0.021 | 8.91 | 63 | 3500 | 10 | 0.3% |
| 13 | 0.023 | 0.016 | 8.93 | 65 | 3600 | 11 | 0.3% |
| 14 | 0.019 | 0.031 | 8.89 | 61 | 3200 | 9 | 0.3% |
| 15 | 0.017 | 0.041 | 8.85 | 60 | 2500 | 7 | 0.3% |
| 16 | 0.017 | 0.050 | 8.81 | 60 | 2200 | 7 | 0.3% |
| 17 | 0.048 | 0.072 | 8.79 | 58 | 1800 | 6 | 0.3% |
| 18 | 0.006 | 0.052 | 8.89 | 65 | 2800 | 8 | 0.3% |
| 19 | 0.005 | 0.089 | 8.83 | 61 | 2400 | 10 | 0.4% |
| 20 | 0.032 | 0.023 | 8.91 | 63 | 3100 | 9 | 0.3% |
| 21 | 0.029 | 0.049 | 8.93 | 63 | 3000 | 9 | 0.3% |
| 22 | 0.026 | 0.065 | 8.85 | 63 | 2800 | 10 | 0.4% |
| 23 | 0.025 | 0.098 | 8.74 | 54 | 1800 | 25 | 1.4% |
| 24 | 0.058 | 0.032 | 8.89 | 63 | 2900 | 11 | 0.4% |
| 25 | 0.039 | 0.075 | 8.77 | 58 | 1800 | 34 | 1.9% |
| 26 | 0.046 | 0.115 | 8.71 | 52 | 1500 | 38 | 2.5% |
| 27 | 0.076 | 0.079 | 8.11 | 17 | 700 | 81 | 11.6% |
| 28 | 0.043 | 0.058 | 8.43 | 21 | 750 | 94 | 12.5% |

FIG. 15A

| No. | Chromium added (wt%) | carbon added (wt%) | Amount of H₂ gas (vol%) | Amount of NH₃ gas (vol%) | Amount of CO gas (vol%) | Sintering temperature (°C) | Gas pressure upon sintering (kg/cm²) |
|---|---|---|---|---|---|---|---|
| 1 | 0.8 | 0.01 | 30 | — | — | 1050 | 5 |
| 2 | 0.8 | 0.01 | 10 | — | — | 1050 | 5 |
| 3 | 0.8 | 0.01 | 10 | — | 10 | 1050 | 5 |
| 4 | 1.4 | 0.06 | 30 | — | — | 1050 | 5 |
| 5 | 1.4 | 0.06 | 10 | — | — | 1050 | 5 |
| 6 | 1.4 | 0.06 | 10 | — | 10 | 1050 | 5 |
| 7 | 3.0 | 0.05 | 30 | — | — | 1050 | 7 |
| 8 | 3.0 | 0.05 | 10 | — | — | 1050 | 7 |
| 9 | 3.0 | 0.05 | 10 | — | 10 | 1050 | 7 |
| 10 | 3.0 | 0.1 | 30 | — | — | 1050 | 9.5 |
| 11 | 3.0 | 0.1 | 10 | — | — | 1050 | 9.5 |
| 12 | 3.0 | 0.1 | 10 | — | 10 | 1050 | 9.5 |
| 13 | 1.4 | 0 | 30 | — | — | 1050 | 5 |
| 14 | 1.4 | 0 | 10 | — | — | 1050 | 2 |
| 15 | 1.4 | 0 | 10 | — | 10 | 1050 | 3 |
| 16 | 1.4 | Ethyl cellosolve | 30 | — | — | 1050 | 2 |
| 17 | 1.4 | Ethyl cellosolve | 10 | — | — | 1050 | 0.5 |
| 18 | 1.4 | Ethyl cellosolve | 10 | — | 10 | 1050 | 3 |

FIG. 15B

| No. | Total amount of carbon (wt%) | Total amount of Nitrogen (wt%) | Density of sintered body (g/cm³) | Hardness $H_{RB}$ | Number of times of spot welding (times) | Number of times of fusion bonding (times) | Number of times of fusion bonding / Number of times of spot welding |
|---|---|---|---|---|---|---|---|
| 1  | 0.001        | 0.006 | 8.94 | 65 | 3400 | 7 | 0.2% |
| 2  | 0.001        | 0.013 | 8.91 | 65 | 3300 | 7 | 0.2% |
| 3  | 0.006        | 0.010 | 8.92 | 65 | 3500 | 6 | 0.2% |
| 4  | 0.024        | 0.098 | 8.93 | 65 | 3500 | 8 | 0.2% |
| 5  | 0.018        | 0.132 | 8.91 | 65 | 3500 | 7 | 0.2% |
| 6  | 0.034        | 0.124 | 8.91 | 65 | 3400 | 6 | 0.2% |
| 7  | 0.016        | 0.134 | 8.92 | 63 | 2900 | 7 | 0.2% |
| 8  | 0.011        | 0.185 | 8.91 | 65 | 3000 | 7 | 0.2% |
| 9  | 0.031        | 0.162 | 8.89 | 65 | 2800 | 7 | 0.2% |
| 10 | 0.032        | 0.118 | 8.93 | 61 | 3000 | 5 | 0.2% |
| 11 | 0.024        | 0.195 | 8.90 | 65 | 3000 | 5 | 0.2% |
| 12 | 0.045        | 0.185 | 8.84 | 65 | 2800 | 3 | 0.2% |
| 13 | 0            | 0.062 | 8.94 | 65 | 3000 | 8 | 0.2% |
| 14 | 0            | 0.089 | 8.93 | 65 | 3000 | 7 | 0.2% |
| 15 | 0.001 or less| 0.068 | 8.92 | 65 | 3100 | 7 | 0.2% |
| 16 | 0.001 or less| 0.085 | 8.92 | 65 | 3000 | 6 | 0.2% |
| 17 | 0.001 or less| 0.125 | 8.93 | 65 | 2900 | 5 | 0.2% |
| 18 | 0.003        | 0.104 | 8.89 | 62 | 2700 | 4 | 0.2% |

FIG. 16A

| | Number of times of continuous spot welding (times) | Number of times of fusion bonding (times) | Density (g/cm³) | H$_{RB}$ Hardness |
|---|---|---|---|---|
| Invention | 1800 | 0 | 8.91 | 62 |
| Comp. Ex. | 900 | 129 | 8.76 | 74 |

FIG. 16B

| | Number of times of continuous spot welding (times) | Number of times of fusion bonding (times) | Density (g/cm³) | H$_{RB}$ Hardness |
|---|---|---|---|---|
| Invention | 258 | 0 | 8.91 | 62 |
| Comp. Ex. | 78 | 62 | 8.76 | 74 |

FIG. 17

| No. | Chromium added (wt. %) | Aluminum added (wt. %) | Titanium added (wt. %) | Carbon content (wt. %) | Sintering temperature (°C) | Pressure (Kgf/cm²) | Temperature of solution treatment (°C) | Aging temperature (°C) |
|---|---|---|---|---|---|---|---|---|
| 1 | 0.3 | 0.1 | 0.07 | 0.005 | 1055 | 0.3 | 1000 | 500 |
| 2 | 0.3 | 0.3 | 0.1 | 0.01 | 1055 | 0.1 | 1000 | 500 |
| 3 | 0.3 | 1.0 | 0.5 | 0.01 | 1055 | 0.1 | 1000 | 500 |
| 4 | 0.4 | 0.04 | 0.3 | 0.01 | 1055 | 0.1 | 1000 | 495 |
| 5 | 0.4 | 0.1 | 0.02 | 0.01 | 1055 | 0.3 | 1020 | 495 |
| 6 | 0.4 | 0.3 | 0.1 | 0.01 | 1055 | 1 | 1020 | 495 |
| 7 | 0.4 | 0.1 | 0.05 | Ethyl cellosolve | 1055 | 3 | 1020 | 495 |
| 8 | 0.4 | 1.3 | 0.2 | 0.01 | 1055 | 9.5 | 1020 | 495 |
| 9 | 0.8 | 0.04 | 0.1 | 0.01 | 1060 | 0.1 | 1020 | 500 |
| 10 | 0.8 | 0.5 | 0.3 | 0.01 | 1060 | 0.3 | 1040 | 500 |
| 11 | 0.8 | 0.3 | 0.1 | 0.01 | 1060 | 1 | 1040 | 500 |
| 12 | 0.8 | 1.0 | 0.5 | 0.03 | 1060 | 3 | 1040 | 500 |
| 13 | 0.8 | 1.2 | 0.1 | Ethyl cellosolve | 1060 | 5 | 1040 | 500 |
| 14 | 0.8 | 0.04 | 1.1 | 0.03 | 1060 | 9.5 | 1000 | 500 |
| 15 | 1.5 | 0.3 | 0.02 | 0.03 | 1060 | 1 | 1000 | 510 |
| 16 | 1.5 | 0.5 | 0.3 | 0.03 | 1060 | 3 | 1000 | 510 |
| 17 | 1.5 | 0.8 | 0.1 | 0.03 | 1060 | 5 | 1020 | 510 |
| 18 | 1.5 | 1.2 | 0.5 | 0.03 | 1060 | 0.1 | 1040 | 500 |
| 19 | 1.5 | 0.3 | 1.0 | Ethyl cellosolve | 1060 | 0.3 | 1040 | 510 |
| 20 | 1.5 | 0.3 | 1.1 | Ethyl cellosolve | 1060 | 9.5 | 1020 | 500 |
| 21 | 1.5 | 1.2 | 0.02 | 0.06 | 1060 | 1 | 1000 | 500 |
| 22 | 1.5 | 0.04 | 0.3 | 0.05 | 1055 | 3 | 1020 | 510 |
| 23 | 2.8 | 0.3 | 0.02 | 0.05 | 1060 | 0.5 | 1020 | 510 |
| 24 | 2.8 | 0.5 | 0.3 | 0.05 | 1060 | 0.3 | 1000 | 510 |
| 25 | 2.8 | 0.7 | 0.3 | 0.05 | 1060 | 1 | 1000 | 510 |
| 26 | 2.8 | 0.5 | 0.7 | 0.05 | 1060 | 3 | 1020 | 500 |
| 27 | 2.8 | 1.3 | 0.1 | Ethyl cellosolve | 1060 | 5 | 1020 | 500 |
| 28 | 3.0 | 0.04 | 0.1 | 0.1 | 1060 | 1 | 1040 | 500 |
| 29 | 3.0 | 0.3 | 0.1 | 0.1 | 1060 | 3 | 1040 | 510 |
| 30 | 3.0 | 0.6 | 0.3 | 0.1 | 1060 | 5 | 1040 | 510 |
| 31 | 3.0 | 1.3 | 0.3 | 0.1 | 1060 | 1 | 1020 | 510 |
| 32 | 3.1 | 0.04 | 0.2 | 0.15 | 1060 | 9.5 | 1020 | 510 |
| 33 | 3.1 | 0.5 | 0.3 | 0.15 | 1060 | 5 | 1040 | 500 |
| 34 | 3.1 | 0.3 | 0.1 | 0.07 | 1060 | 0.2 | 1040 | 500 |
| 35 | 3.1 | 1.0 | 0.2 | 0.07 | 1060 | 0.5 | 1040 | 500 |

FIG. 18

| No. | Total amount of carbon (wt.%) | Total amount of nitrogen (wt.%) | Total amount of oxygen (wt.%) | Density of sintered body (g/cm³) | Hardness ($H_{RB}$) | Number of times of spot welding (times) | Number of times of fusion bonding (times) | Number of times of fusion bonding/Number of times of spot welding |
|---|---|---|---|---|---|---|---|---|
| 1 | 0.004 | 0.021 | 0.095 | 8.54 | 39 | 310 | 150 | 48.4% |
| 2 | 0.008 | 0.031 | 0.285 | 8.32 | 28 | 200 | 132 | 66.0% |
| 3 | 0.008 | 0.148 | 0.895 | 8.24 | 14 | 58 | 52 | 89.7% |
| 4 | 0.009 | 0.094 | 0.036 | 8.59 | 41 | 350 | 120 | 34.3% |
| 5 | 0.009 | 0.011 | 0.097 | 8.64 | 45 | 450 | 81 | 18.0% |
| 6 | 0.009 | 0.034 | 0.287 | 8.81 | 60 | 1910 | 0 | 0 |
| 7 | 0.009 | 0.020 | 0.097 | 8.85 | 64 | 2030 | 0 | 0 |
| 8 | 0.007 | 0.064 | 0.291 | 8.46 | 33 | 300 | 150 | 50.0% |
| 9 | 0.008 | 0.044 | 0.038 | 8.72 | 47 | 820 | 78 | 9.5% |
| 10 | 0.008 | 0.103 | 0.486 | 8.92 | 77 | 2200 | 0 | 0 |
| 11 | 0.008 | 0.044 | 0.288 | 8.90 | 76 | 2500 | 0 | 0 |
| 12 | 0.024 | 0.161 | 0.907 | 8.88 | 72 | 2000 | 0 | 0 |
| 13 | 0.021 | 0.044 | 1.160 | 8.89 | 74 | 2400 | 0 | 0 |
| 14 | 0.025 | 0.336 | 0.039 | 8.72 | 45 | 600 | 68 | 11.3% |
| 15 | 0.025 | 0.047 | 0.286 | 8.68 | 42 | 720 | 82 | 11.4% |
| 16 | 0.025 | 0.129 | 0.496 | 8.91 | 78 | 2200 | 0 | 0 |
| 17 | 0.024 | 0.070 | 0.501 | 8.91 | 78 | 2250 | 0 | 0 |
| 18 | 0.025 | 0.187 | 0.795 | 8.89 | 75 | 2000 | 0 | 0 |
| 19 | 0.016 | 0.333 | 1.161 | 8.88 | 73 | 2300 | 0 | 0 |
| 20 | 0.021 | 0.362 | 0.292 | 8.78 | 56 | 1500 | 45 | 3.0% |
| 21 | 0.052 | 0.047 | 0.295 | 8.74 | 52 | 1300 | 58 | 4.5% |
| 22 | 0.046 | 0.129 | 1.165 | 8.79 | 56 | 1400 | 42 | 3.0% |
| 23 | 0.044 | 0.064 | 0.039 | 8.72 | 49 | 700 | 69 | 9.9% |
| 24 | 0.045 | 0.146 | 0.294 | 8.89 | 68 | 1900 | 0 | 0 |
| 25 | 0.044 | 0.152 | 0.498 | 8.88 | 69 | 1850 | 0 | 0 |
| 26 | 0.045 | 0.262 | 0.710 | 8.87 | 68 | 1800 | 0 | 0 |
| 27 | 0.028 | 0.087 | 0.485 | 8.68 | 45 | 380 | 78 | 20.5% |
| 28 | 0.085 | 0.095 | 1.311 | 8.72 | 54 | 780 | 42 | 5.4% |
| 29 | 0.085 | 0.098 | 0.042 | 8.88 | 72 | 1780 | 0 | 0 |
| 30 | 0.085 | 0.153 | 0.298 | 8.87 | 72 | 1920 | 0 | 0 |
| 31 | 0.083 | 0.162 | 0.589 | 8.65 | 42 | 350 | 78 | 22.3% |
| 32 | 0.11 | 0.137 | 1.311 | 8.69 | 45 | 450 | 62 | 13.8% |
| 33 | 0.12 | 0.163 | 0.042 | 8.68 | 42 | 370 | 55 | 14.9% |
| 34 | 0.11 | 0.108 | 0.314 | 8.72 | 48 | 530 | 41 | 7.7% |
| 35 | 0.11 | 0.133 | 1.121 | 8.41 | 32 | 250 | 98 | 39.2% |

FIG. 19A

| No. | Chromium added (wt. %) | Aluminum added (wt. %) | Titanium added (wt. %) | Carbon content (wt. %) | Amount of H₂ gas (Vol. %) | Amount of NH₃ gas (Vol. %) | Amount of CO gas (Vol. %) | Sintering temperature (°C) | Gas pressure upon sintering (kg/cm²) |
|---|---|---|---|---|---|---|---|---|---|
| 1 | 0.8 | 0.3 | 0.1 | 0.01 | 30 | — | — | 1050 | 0.5 |
| 2 | 0.8 | 0.3 | 0.1 | 0.01 | 10 | — | — | 1050 | 0.5 |
| 3 | 0.8 | 0.3 | 0.1 | 0.01 | 10 | — | 10 | 1050 | 0.5 |
| 4 | 1.5 | 0.5 | 0.3 | 0.03 | 30 | — | — | 1050 | 3 |
| 5 | 1.5 | 0.5 | 0.3 | 0.03 | 10 | — | — | 1050 | 3 |
| 6 | 1.5 | 0.5 | 0.3 | 0.03 | 10 | — | 10 | 1050 | 3 |
| 7 | 2.8 | 0.5 | 0.3 | 0.05 | 30 | — | — | 1050 | 5 |
| 8 | 2.8 | 0.5 | 0.3 | 0.05 | 10 | — | — | 1050 | 5 |
| 9 | 2.8 | 0.5 | 0.3 | 0.05 | 10 | — | 10 | 1050 | 5 |
| 10 | 1.5 | 0.5 | 0.3 | 0 | 30 | — | — | 1050 | 3 |
| 11 | 1.5 | 0.5 | 0.3 | 0 | 10 | — | — | 1050 | 5 |
| 12 | 1.5 | 0.5 | 0.3 | 0 Ethyl cellosolve | 30 | — | 10 | 1050 | 7 |
| 13 | 1.5 | 0.5 | 0.3 | Ethyl cellosolve | 10 | — | — | 1050 | 3 |
| 14 | 1.5 | 0.5 | 0.3 | Ethyl cellosolve | 10 | — | — | 1050 | 5 |
| 15 | 1.5 | 0.5 | 0.3 | Ethyl cellosolve | 10 | — | 10 | 1050 | 7 |

FIG.19B

| No. | Total amount of carbon (wt.%) | Total amount of nitrogen (wt.%) | Total amount of oxygen (wt.%) | Density of sintered body (g/cm³) | Hardness ($H_{RB}$) | Number of times of spot welding (times) | Number of times of fusion bonding (times) | Number of times of fusion bonding / Number of times of spot welding |
|---|---|---|---|---|---|---|---|---|
| 1 | 0.004 | 0.035 | 0.265 | 8.92 | 78 | 2700 | 0 | ○ |
| 2 | 0.003 | 0.042 | 0.260 | 8.91 | 82 | 2900 | 0 | ○ |
| 3 | 0.006 | 0.039 | 0.257 | 8.91 | 81 | 2600 | 0 | ○ |
| 4 | 0.021 | 0.118 | 0.468 | 8.92 | 80 | 2700 | 0 | ○ |
| 5 | 0.018 | 0.179 | 0.454 | 8.92 | 81 | 2500 | 0 | ○ |
| 6 | 0.025 | 0.148 | 0.451 | 8.92 | 80 | 2400 | 0 | ○ |
| 7 | 0.23 | 0.128 | 0.479 | 8.90 | 76 | 2500 | 0 | ○ |
| 8 | 0.20 | 0.201 | 0.468 | 8.90 | 75 | 2200 | 0 | ○ |
| 9 | 0.27 | 0.169 | 0.468 | 8.89 | 75 | 2300 | 0 | ○ |
| 10 | 0 | 0.101 | 0.475 | 8.92 | 78 | 2800 | 0 | ○ |
| 11 | 0 | 0.156 | 0.462 | 8.91 | 80 | 2600 | 0 | ○ |
| 12 | 0.002 | 0.145 | 0.458 | 8.91 | 80 | 2650 | 0 | ○ |
| 13 | 0.002 | 0.184 | 0.442 | 8.92 | 81 | 2650 | 0 | ○ |
| 14 | 0.001 | 0.213 | 0.431 | 8.92 | 82 | 2500 | 0 | ○ |
| 15 | 0.006 | 0.171 | 0.428 | 8.92 | 82 | 2500 | 0 | ○ |

FIG. 20A

|  | Number of times of continuous spot welding (times) | Number of times of fusion bonding (times) |
|---|---|---|
| Invention | 1500 | 0 |
| Comp. Ex. | 900 | 129 ( 14.3 % ) |

FIG.20B

|  | Number of times of continuous spot welding (times) | Number of times of fusion bonding (times) |
|---|---|---|
| Invention | 216 | 6 ( 2.78 % ) |
| Comp. Ex. — $Al_2O_3$ dispersed copper containing 0.8 wt. % of $Al_2O_3$ | 78 | 62 ( 79.5 % ) |
| Comp. Ex. — Chromium-copper containing 0.8 wt. % of Cr | 120 | 85 ( 71 % ) |

FIG. 21

| No. | Chromium added (wt.%) | Aluminum added (wt.%) | Titanium added (wt.%) | Temperature upon heat treatment at 100~300°C (°C) | Temperature upon holding at 700°C or lower (°C) | Sintering temperature (°C) | Temperature of solution treatment (°C) | Aging temperature (°C) |
|---|---|---|---|---|---|---|---|---|
| 1 | 0.1 | 0.3 | 0.1 | 150 | 650 | 950 | 950 | 485 |
| 2 | 0.1 | 0.5 | 0.3 | 200 | 700 | 1040 | 1000 | 500 |
| 3 | 0.1 | 1.0 | 0.5 | 140 | 680 | 1065 | 1000 | 515 |
| 4 | 0.3 | 1.3 | 0.4 | 180 | 650 | 1010 | 1010 | 520 |
| 5 | 0.3 | 0.5 | 0.3 | 170 | 650 | 1000 | 1000 | 480 |
| 6 | 0.4 | 0.02 | 0.01 | 200 | 630 | 1060 | 1020 | 495 |
| 7 | 0.4 | 0.03 | 0.02 | 200 | 650 | 1065 | 1000 | 500 |
| 8 | 0.4 | 0.5 | 0.3 | 220 | 670 | 1055 | 1010 | 500 |
| 9 | 0.4 | 1.3 | 0.01 | 150 | 680 | 1040 | 1020 | 495 |
| 10 | 0.8 | 0.02 | 0.04 | 200 | 650 | 1055 | 1020 | 515 |
| 11 | 0.8 | 0.03 | 0.01 | 200 | 640 | 1050 | 1020 | 500 |
| 12 | 0.8 | 0.3 | 0.2 | 250 | 700 | 1060 | 1030 | 500 |
| 13 | 0.8 | 0.7 | 0.5 | 190 | 690 | 1060 | 1010 | 495 |
| 14 | 0.8 | 1.3 | 0.3 | 250 | 700 | 1060 | 1050 | 520 |
| 15 | 1.2 | 0.04 | 0.01 | 170 | 650 | 1060 | 1030 | 515 |
| 16 | 1.2 | 0.1 | 0.05 | 150 | 650 | 1060 | 1030 | 500 |
| 17 | 1.2 | 1.0 | 0.5 | 170 | 700 | 1055 | 1050 | 495 |
| 18 | 1.2 | 0.7 | 0.6 | 150 | 680 | 1055 | 1050 | 490 |
| 19 | 1.2 | 0.2 | 1.1 | 200 | 650 | 1050 | 1050 | 500 |
| 20 | 2.4 | 0.3 | 0.01 | 200 | 650 | 1050 | 1050 | 510 |
| 21 | 2.4 | 0.3 | 0.02 | 180 | 670 | 1055 | 1020 | 505 |
| 22 | 2.4 | 0.9 | 0.6 | 210 | 650 | 1060 | 1000 | 500 |
| 23 | 2.4 | 0.6 | 0.3 | 130 | 670 | 1060 | 1000 | 500 |
| 24 | 2.4 | 1.1 | 0.5 | 150 | 670 | 1060 | 1030 | 500 |
| 25 | 2.8 | 1.2 | 0.01 | 150 | 650 | 1055 | 1010 | 495 |
| 26 | 2.8 | 0.02 | 0.8 | 150 | 680 | 1055 | 1040 | 500 |
| 27 | 2.8 | 0.7 | 0.04 | 150 | 680 | 1055 | 1000 | 505 |
| 28 | 3.0 | 0.5 | 0.01 | 150 | 680 | 1055 | 1000 | 515 |
| 29 | 3.0 | 0.7 | 0.3 | 150 | 680 | 1055 | 1000 | 515 |
| 30 | 3.0 | 1.3 | 0.1 | 150 | 680 | 1055 | 1000 | 505 |
| 31 | 3.0 | 0.5 | 1.1 | 150 | 680 | 1055 | 1000 | 500 |
| 32 | 3.1 | 0.1 | 0.01 | 250 | 650 | 1055 | 1000 | 500 |
| 33 | 3.1 | 0.5 | 1.1 | 200 | 670 | 1050 | 1030 | 500 |
| 34 | 3.1 | 0.03 | 0.5 | 150 | 680 | 1060 | 1000 | 495 |
| 35 | 3.1 | 1.3 | 0.1 | 120 | 700 | 1065 | 1010 | 500 |

FIG. 22

| No. | Found amount of chromium (wt.%) | Found amount of aluminum (wt.%) | Found amount of titanium (wt.%) | Found amount of oxygen (wt.%) | Hardness ($H_{RB}$) | Number of times of spot welding (times) | Number of times of fusion bonding (times) | Number of times of fusion bonding/ Number of times of spot welding |
|---|---|---|---|---|---|---|---|---|
| 1 | 0.098 | 0.29 | 0.096 | 0.38 | 24 | 78 | 70 | 89.7% |
| 2 | 0.097 | 0.50 | 0.30 | 0.65 | 18 | 54 | 50 | 92.6% |
| 3 | 0.098 | 0.99 | 0.51 | 0.82 | 12 | 26 | 22 | 84.6% |
| 4 | 0.30 | 1.29 | 0.50 | 1.03 | 28 | 100 | 48 | 48.0% |
| 5 | 0.31 | 0.50 | 0.39 | 0.74 | 34 | 120 | 53 | 44.2% |
| 6 | 0.40 | 0.019 | 0.01 | 0.025 | 41 | 1100 | 68 | 5.7% |
| 7 | 0.41 | 0.03 | 0.02 | 0.039 | 48 | 1000 | 65 | 6.5% |
| 8 | 0.41 | 0.48 | 0.31 | 0.51 | 58 | 1500 | 0 | 0 % |
| 9 | 0.40 | 1.31 | 0.01 | 1.20 | 38 | 350 | 98 | 28.0% |
| 10 | 0.79 | 0.02 | 0.04 | 0.048 | 56 | 1900 | 48 | 2.5% |
| 11 | 0.78 | 0.03 | 0.01 | 0.032 | 57 | 2200 | 52 | 2.4% |
| 12 | 0.81 | 0.31 | 0.21 | 0.49 | 65 | 1850 | 0 | 0 % |
| 13 | 0.81 | 0.69 | 0.48 | 1.11 | 67 | 1800 | 0 | 0 % |
| 14 | 0.80 | 1.28 | 0.29 | 1.39 | 54 | 1000 | 45 | 4.5% |
| 15 | 1.21 | 0.04 | 0.01 | 0.115 | 63 | 2700 | 68 | 6.8% |
| 16 | 1.20 | 0.11 | 0.05 | 0.14 | 62 | 2200 | 3 | 0.1% |
| 17 | 1.20 | 1.01 | 0.49 | 1.27 | 68 | 1600 | 0 | 0 % |
| 18 | 1.20 | 0.70 | 0.61 | 1.19 | 69 | 1870 | 0 | 0 % |
| 19 | 1.19 | 0.19 | 1.09 | 1.17 | 58 | 1200 | 15 | 1.3% |
| 20 | 2.38 | 0.31 | 0.01 | 0.35 | 59 | 1900 | 68 | 3.6% |
| 21 | 2.40 | 0.31 | 0.02 | 0.318 | 58 | 1800 | 54 | 3.0% |
| 22 | 2.40 | 0.90 | 0.59 | 1.36 | 68 | 1600 | 0 | 0 % |
| 23 | 2.41 | 0.58 | 0.29 | 0.81 | 72 | 1900 | 0 | 0 % |
| 24 | 2.40 | 1.08 | 0.51 | 1.49 | 64 | 1480 | 0 | 0 % |
| 25 | 2.79 | 1.20 | 0.01 | 1.16 | 62 | 1200 | 76 | 6.3% |
| 26 | 2.80 | 0.02 | 0.80 | 0.63 | 65 | 1600 | 114 | 7.1% |
| 27 | 2.80 | 0.71 | 0.04 | 0.68 | 69 | 2100 | 0 | 0 % |
| 28 | 2.99 | 0.48 | 0.01 | 0.46 | 68 | 2200 | 100 | 4.5% |
| 29 | 3.00 | 0.69 | 0.31 | 0.93 | 67 | 1700 | 1 | 0.1% |
| 30 | 3.01 | 1.29 | 0.10 | 1.24 | 52 | 700 | 120 | 17.1% |
| 31 | 2.99 | 0.49 | 1.11 | 1.51 | 48 | 500 | 190 | 38.0% |
| 32 | 3.09 | 0.10 | 0.01 | 0.12 | 38 | 110 | 59 | 53.6% |
| 33 | 3.10 | 0.50 | 1.09 | 1.62 | 42 | 125 | 58 | 46.4% |
| 34 | 3.10 | 0.03 | 0.50 | 0.58 | 46 | 150 | 62 | 41.3% |
| 35 | 3.12 | 1.30 | 0.10 | 1.48 | 29 | 60 | 37 | 61.7% |

FIG. 23

| | Material | Form of powder | Average Particle size (μm) | Clearance (μm) | Liquid Additive |
|---|---|---|---|---|---|
| Ex. 1 | Copper | Gas atomized | 8 | 110 | Ethyl alcohol Hexanol |
| Ex. 2 | Copper | Dendritic | 20 | 300 | Ethyl alcohol |
| Ex. 3 | Titanium | Ground | 20 | 200 | Flonsolve (Dehydrated) |
| Ex. 4 | Aluminum | Ground | 70 | 250 | Flonsolve |
| Ex. 5 | Aluminum | Spherical | 20 | 150 | Flonsolve Cellosolve |
| Ex. 6 | Alumina | Ground | 0.6 | 100 | Water |
| Ex. 7 | Silicon nitride | Finely divided | 1.2 | 100 | Water |

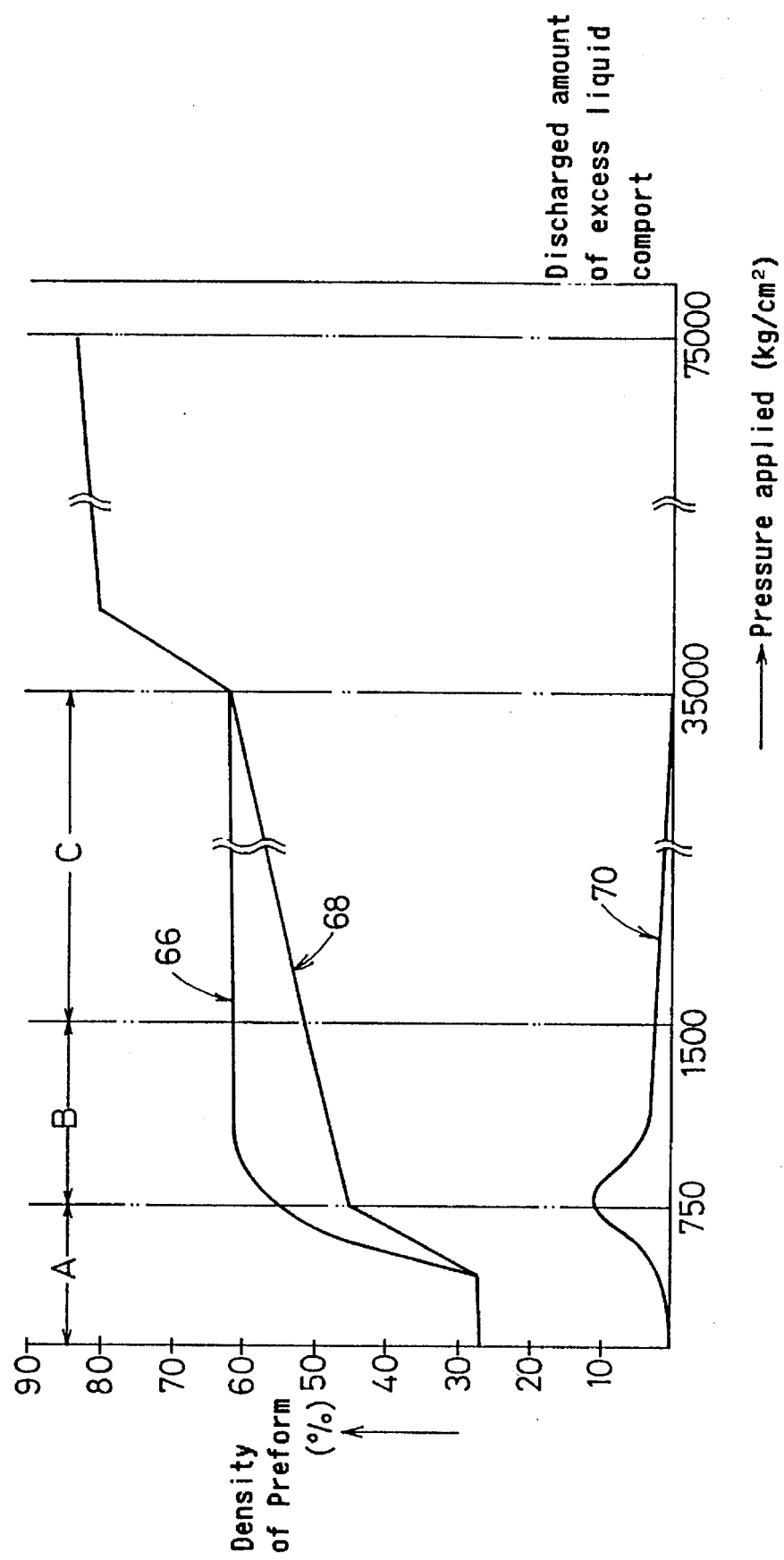

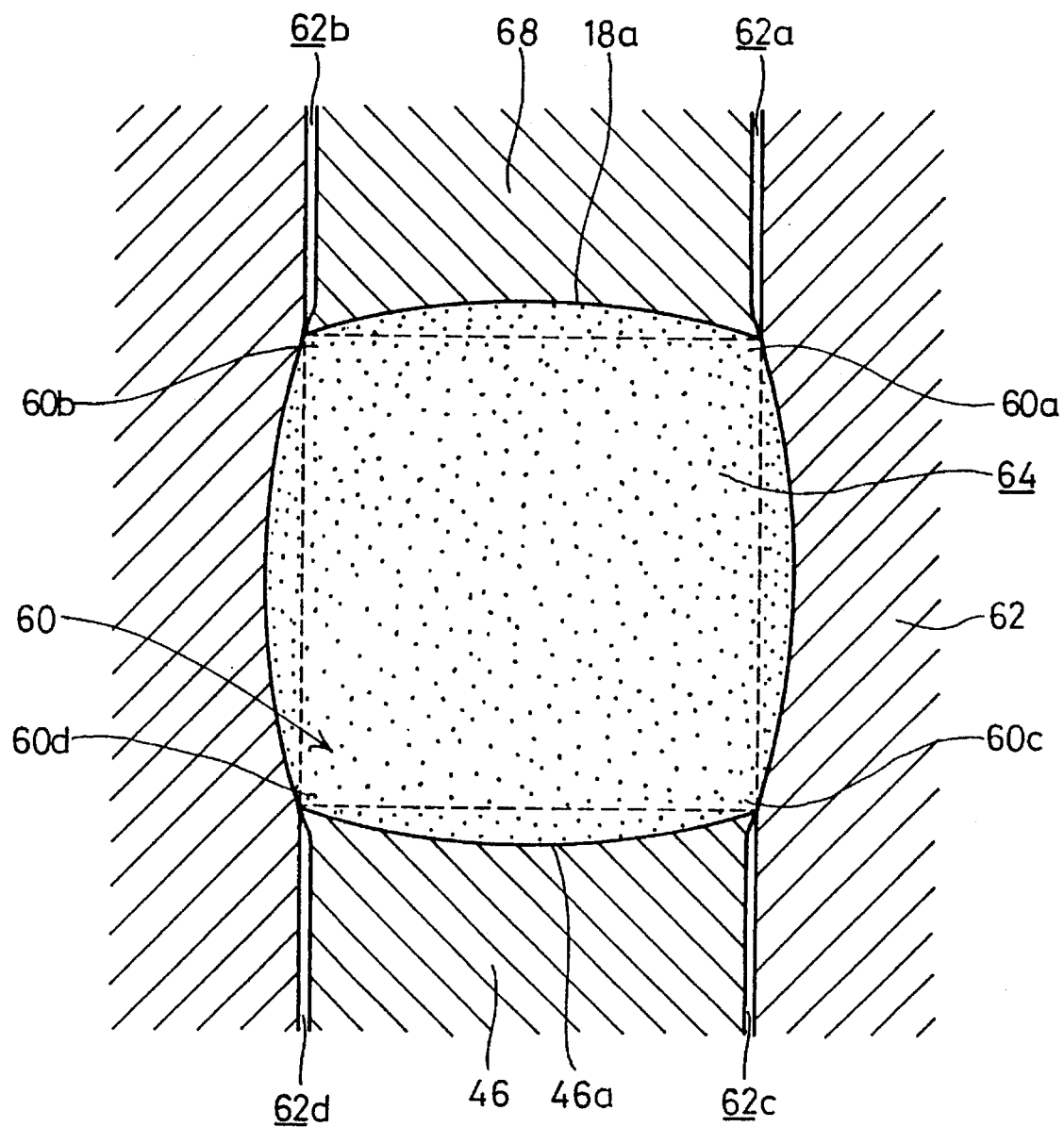

MOLDED CERAMIC ARTICLES AND PRODUCTION METHOD THEREOF

This application is a divisional of application Ser. No. 08/076,500 filed on Jun. 9, 1993 now U.S. Pat. No. 5,374,391, which is a divisional application under 37 CFR 1.60 of Ser. No. 07/965,085 filed Oct. 22, 1992 now U.S. Pat. No. 5,443,615, which is continuation application under 37 CFR 1.62 of Ser. No. 07/652,884 filed Feb. 8, 1991 which is now abandoned, the entire contents of which are hereby incorporated by reference.

FIELD OF THE INVENTION

The present invention relates to molded ceramic articles and a production method thereof, and more specifically to a method of producing molded ceramic articles, which permits the effective provision of a molded ceramic article by adding a liquid additive to a powder mix as raw materials, press-molding the resulting mixture in a hydrostatic state into a preform and then calcining the preform, and molded ceramic articles obtained by such a method and having remarkably improved abrasion resistance and corrosion resistance.

PRIOR ARTS

To obtain preforms with a view toward producing molded articles of a ceramic or the like, there are a uniaxial press molding in which a powder mix as raw materials is pressed in a uniaxial direction, a hydrostatic press molding in which the powder mix is granulated, an additive for press molding is added to the resultant granules and the thus-obtained mixture is pressed under hydrostatic pressure, and a method making use of an injection molding machine.

In the uniaxial press molding, the molding is conducted by pressing the mixed raw material composed of particles of various forms in only one direction to plastically deform it. In this case, the mere uniaxial press molding of the powder mix itself fails to uniformly apply a pressure to the whole raw material due to frictional resistance between adjacent particles and differences in size, hardness, etc. of the particles. Therefore, it is difficult to obtain a molded article having a throughout uniform density.

According to the hydrostatic press molding, it is possible to simultaneously apply an equal pressure to surfaces of the particles of the mixed raw material. It is therefore possible to obtain a molded article having an evener density compared with the case of the uniaxial press molding. However, such a method generally requires, as processes prior to the practice of the hydrostatic press molding, a granulation process for making the particles of the mixed raw material uniform in size and an addition process of a liquid additive to the particles for apply a hydrostatic pressure thereto, and moreover a dewaxing process for remove the liquid additive from a resultant preform after molding. In addition, an apparatus used in the hydrostatic press molding is extremely expensive. From these results, the productivity of the hydrostatic press molding becomes inferior, and hence molded articles obtained by such a molding come expensive.

Besides, the injection molding has been used, particularly, with a view toward improving cycle time in production, surface roughness of the preforms and mass productivity. The conventional technique of this kind generally comprises the following steps. Namely, a mixed particulate raw material of a desired composition is first of all weighed. In order to improve the flowability, pressure-transmitting ability and moldability of the powder mix, a low-viscosity additive composed of organic compounds such as petroleum paraffin and a phenol resin is then added in a proportion of 20–50 wt. % of the whole weight to mix uniformly them, thereby obtaining a mixed raw material.

In the injection molding, the mixed raw material is heated to 120°–180° C. to improve its flowability. The thus-heated mixed raw material is injected into a mold pre-heated to the same temperature as the mixed raw material to mold it, and then cooled and solidified, thereby obtaining a preform. After the thus-obtained preform is then subjected to a so-called dewaxing process in which the low-viscosity additive is removed from the preform, the preform is calcined to obtain a molded ceramic article.

In order to intimately mix the low-viscosity additive added in a proportion as high as 20–50 wt. % of the whole weight with the particulate raw materials and feed the mixed raw material thus obtained into the mold, it is however necessary to improve the flowability of the mixed raw material. To achieve this object, it is necessary to pre-heat the mold and moreover the particulate raw materials and the low-viscosity additive. In addition, it is necessary to strictly control a temperature of the mold in order to obtain a preform by injecting the mixed raw material into the mold to mold it and then cooling and solidifying it.

Further, since the low-viscosity additive is composed of organic compounds such as petroleum paraffin and a phenol resin, it has potential disadvantages that it forms the cause of brittleness and the predominant cause of defects in a resulting molded article unless it is decomposed and removed by the dewaxing process prior to the sintering of the preform.

It is however necessary to heat the preform for 5–10 days under pressure or under reduced pressure in order to remove the low-viscosity additive, i.e., the organic compound, without adversely affecting the preform with a view toward overcoming these disadvantages. Therefore, production efficiency is not very enhanced.

In recent years, various kinds of materials have come to use widely for molded ceramic articles. For example, composite materials making use of ceramic materials and having high durability have been employed in various application fields. As suitable examples, may be mentioned electrode tips for resistance welding machines, contacts for breakers to which a heavy electric current is applied at all times, and the like.

In view of this point, as disclosed in Japanese Patent Application Laid-Open No. 152232/1989, there is, as the electrode tip making use of a ceramic-copper composite, a technical idea in which a ceramic such as aluminum oxide ($Al_2O_3$) is welded on a periphery of an electrode tip composed of a copper alloy by using laser beams or the like to form a film of the ceramic on the electrode tip.

In addition, as disclosed in Japanese Patent Application Laid-Open No. 78683/1979, there is another technical idea in which a ceramic is embedded in the distal end of an electrode tip composed of a copper alloy, thereby improving its durability. Further, there is disclosed in Japanese Patent Application Laid-Open No. 2479/1985 a further technical idea wherein a ceramic is mixed with a copper alloy and the resulting mixture is then sintered, thereby improving the durability.

However, the composite of the prior art disclosed, for example, in Japanese Patent Application Laid-Open No. 152232/1989 involves a drawback that the wettability between the copper alloy and the ceramic is poor and hence, the ceramic is liable to separate from the copper alloy.

Besides, the composite of the prior art disclosed in Japanese Patent Application Laid-Open No. 78683/1979 tends to discharge electricity between the copper alloy and the ceramic. Therefore, when it is used as an electrode tip for a resistance welding machine, its durability is not very expectable.

In the case of the prior art disclosed in Japanese Patent Application Laid-Open No. 2479/1985 on the other hand, the durability is enhanced only by about 20–30 percent compared with the copper alloy free of the ceramic. Therefore, an electrode tip having desired durability has not come to be provided.

Namely, in the composites with ceramics, which are disclosed in these prior art, for example, copper particles used as a principal material for the electrode tip often have a dendritic structure. It is therefore difficult for particles of a different component to enter spaces in the dendritic structure.

Even when the copper particles are of a spherical form, it is only possible to disperse ceramic particles having a particle size on the order of μm by the conventional method of adding the ceramic particles. It has therefore been impossible to increase the amount of the ceramic to be added without raising the electric resistance of the composite.

Further, as a material for electrode tips, in some cases, a Cr—Cu alloy may be used with a view toward improving mechanical strength and preventing different species of particles in a weld metal from diffusing into the electrode.

However, the wettability of the Cr—Cu alloy to a galvanized weld metal is high, so that when the galvanized weld metal is welded by using the Cr—Cu alloy as an electrode material, the alloy fusion-bonds to the weld metal. Namely, the following disadvantages have been revealed. When metals such as Zn and Fe are caused to penetrate into the Cr—Cu alloy by welding or the like, Zn, Fe and Cr are oxidized with oxygen in atmosphere, so that the oxides enlarged make the structure of the alloy brittle, the alloy is cracked and finally undergoes fusion bonding. In addition, its electric resistance is increased by the penetration of the metals and hence its electrical conductivity is lowered.

Moreover, with respect to the electrode tip formed of, for example, a molded ceramic article of this kind, the following disadvantages have also been revealed depending upon the composition of the molded article. An example of such disadvantages is illustrated in FIGS. 1a and 1b.

FIG. 1a shows the condition of an electrode tip 10 formed of a molded ceramic article of the Cr—Cu alloy according to the prior art after welding by using it. As understood form the drawing, a crack A is clearly observed at its distal end.

FIG. 1b is an enlarged illustration of the crack A seen through a metallurgical microscope of 100 magnifications. It is recognized that Fe 14 and a diffusion layer 16 of Fe and Zn penetrate into the structure of a base metal 12.

In order to overcome the above-mentioned disadvantages, an aluminum oxide dispersed and reinforced copper alloy obtained by diffusing and sintering a ceramic component composed of aluminum oxide in the crystal structure of copper as a base metal has come to be use as an electrode material. Namely, spaces in the crystal structure of copper are filled up with aluminum oxide to check the penetration of metals such as Zn and Fe by the so-called pinning. When copper is used as a base metal for an electrode material in the electrode tip molded by this method, copper powder having a dendritic structure is often used. It is difficult to disperse and penetrate other metal components into interparticle spaces of the copper powder having the dendritic structure.

On the other hand, when aluminum oxide is also dispersed in the interparticle spaces of the copper powder, it is only possible to disperse particles having a particle size of the order of several μm. Therefore, the amount of aluminum oxide to be added as a ceramic component has not come to be increased without raising the electric resistance of the copper alloy.

Besides, even in the case where the alloy-oxidizing method is used, the diffusion of oxygen into the interior of the crystal structure, which is required for the formation of a ceramic, is not sufficiently done. Therefore, the amount of the ceramic to be added is not increased without substantially raising the electric resistance of the composite.

In other words, even when the aluminum oxide dispersed and reinforced copper alloy has been used as an electrode material, the ceramic component composed of fine aluminum oxide has not come to be dispersed and deposited in an amount sufficient to conduct the so-called pinning in the interparticle spaces of the copper powder.

As a result, it is hard to say that the fusion bonding caused by the penetration of metals such as Zn and Fe has been solved upon the welding of the galvanized weld metal. Besides, its service life is merely prolonged by about 20–30 percent compared with the case where the Cr—Cu alloy is used as an electrode material.

Namely, it cannot be said that the use of the aluminum oxide dispersed and reinforced copper alloy as an electrode material is practically preferred in its effects in consideration of its complicated production process and the production cost required therefor.

Furthermore, even when carbon particles are used to fill up the interparticle spaces of copper powder, they cannot be used in a great amount because they lower the electrical conductivity of the copper powder. Moreover, since element carbon deposits as is without converting into a ceramic upon sintering and hence, the dispersion and deposition of a dense ceramic are inhibited, it is impossible to substantially check the penetration of metals such as Zn and Fe. For example, FIG. 2a shows an electrode tip 20 making use of the aluminum oxide dispersed copper alloy after welding. A crack B caused by the fact that the so-called pinning is not uniformly accomplished is observed at its distal end. FIG. 2b is an enlarged illustration of a crack B seen through a metallurgical microscope of 100 magnifications. The penetration of Fe 24 and an oxide alloy 26 composed of Fe, Zn and Cu is recognized and moreover, the diffusion of an diffusion layer 28 composed of Zn and Fe into the interior of the electrode tip is allowed.

OBJECTS OF THE INVENTION

It is thus a principal object of the present invention to provide a method of producing molded ceramic articles, which permits the production of a molded ceramic article having a throughout uniform density and stable properties with an economical apparatus in accordance with a simple process by adding a liquid additive to a powder mix as raw materials to enhance the flowability and pressure-transmitting ability of the powder mix, and molded ceramic articles obtained by such a method.

Another object of this invention is to provide a molded ceramic article having improved durability and corrosion resistance owing to the fact that predetermined amounts of additive components, by which the electric resistance is not sharply increased, are added to a powdery raw material in advance, thereby preventing metal component(s) from diffusing from the constituents of one material into the constituents of the other material and hence inhibiting the formation of any alloys or solid solutions by the reaction of the metal component(s) of said one material with the constituents of said the other material and the formation of any oxides, and a method of producing such a molded ceramic article.

A further object of this invention is to provide a molded ceramic article which is excellent in mechanical strength and electrical conductivity and can prolong its service life as an electrode by reducing its fusion bonding behavior to a weld metal, upon welding of galvanized weld metals, aluminum alloys and the like, and a method of producing such a molded ceramic article.

Still a further object of this invention is to provide a method of producing a molded ceramic article, which comprises:

the first step mixing powdery raw materials and a liquid additive, thereby obtaining a mixed raw material;

the second step press-molding the mixed raw material obtained in the first step in a hydrostatically applied condition of pressure, thereby removing an excess of the liquid additive to obtain a preform; and the third step calcining the preform obtained in the second step to obtain a molded ceramic article.

Yet still a further object of this invention is to provide a method of producing a molded ceramic article, wherein the powdery raw materials comprises Cu as a main component and a mixture of at least two powders selected from the group consisting of Cr, Ni, Co, Fe, Ti, V, Mn, Mo, Al, Mg and Si and at least one of oxides such as CuO, $Cu_2O$, $Ag_2O$ and SnO.

Yet still a further object of this invention is to provide a method of producing a molded ceramic article, wherein the liquid additive comprises at least one of alcohols such as methanol, ethanol and 2-propanol, arenes such as benzene, toluene and xylene, ketones such as acetone, alkanes such as hexane, alkanes containing fluorine and/or the like, and water.

Yet still a further object of this invention is to provide a method of producing a molded ceramic article, wherein the second step comprises subjecting the mixed raw material obtained in the first step to uniaxial press molding making use of a uniaxial press molding machine, thereby removing an excess of the liquid additive out of a mold to obtain a preform.

Yet still a further object of this invention is to provide a method of producing a molded ceramic article, wherein the uniaxial press molding is conducted by pressing a mixture under a pressure within a pressure range, in which the mixture is elastically deformed, through the hydrostatically applied condition of pressure, thereby molding the mixture into the preform.

Yet still a further object of this invention is to provide a method of producing a molded ceramic article, wherein the second step comprises injecting the mixed raw material obtained in the first step into a mold making use of an injection molding machine and molding same under a pressure higher than an injection pressure, thereby discharging an excess of the liquid additive out of a mold to obtain the preform.

Yet still a further object of this invention is to provide a method of producing a molded ceramic article, wherein the pressure higher than the injection pressure is composed of an injection pressure, a pressure at which the mixed raw material is held in the mold in a hydrostatically applied condition of pressure and a pressure for eliminating the excess of the liquid additive out of the mold.

Yet still a further object of this invention is to provide a method of producing a molded ceramic article, which comprises:

the first step wet-mixing a powder mix as raw materials comprising electrolytic copper powder as a main component, and chromium powder within a composition range of from at least 0.4 wt. % to at most 3.0 wt. % based on the whole weight of the powder mix and a carbonaceous material in which the carbon residue falls within a composition range of at most 0.1 wt. %, or chromium powder in a proportion of from at least 4 mg to at most 30 mg per gram of the powder mix and a carbonaceous material in which the carbon residue is in a proportion of at most 1 mg per gram of the powder mix to diffuse the chromium powder into the electrolytic copper powder, thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of at most 700° C. under an inert gas atmosphere and then sintering the preform in a temperature range of from at least 950° C. to at most 1065° C. under an inert gas atmosphere whose pressure is lower than 10 $kg/cm^2$, thereby depositing a reinforcement on a part of the surface of the chromium powder.

Yet still a further object of this invention is to provide a method of producing a molded ceramic article, wherein the reinforcement deposited in the third step is at least one carbide, nitride or carbonitride selected from the group consisting of $Cr_4C_3$, $Cr_3C_2$, $CrN_2$, CrN and Cr(C, N).

Yet still a further object of this invention is to provide a method of producing a molded ceramic article, wherein the inert gas atmosphere is obtained by adding $H_2$, CO or $NH_3$ to an inert gas.

Yet still a further object of this invention is to provide a method of producing a molded ceramic article, which comprises:

the first step wet-mixing a powder mix as raw materials comprising electrolytic copper powder as a main component, and chromium powder within a composition range of from at least 0.4 wt. % to at most 3.0 wt. % based on the whole weight of the powder mix or in a proportion of from at least 4 mg to at most 30 mg per gram of the powder mix to diffuse the chromium powder into the electrolytic copper powder, thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of from at least 100° C. to at most 300° C. under an inert gas atmosphere and then sintering the preform in a temperature range of from at least 950° C. to at most 1065° C. under an inert gas atmosphere, thereby depositing and dispersing a ceramic reinforcement on a part of the surface of the chromium powder.

Yet still a further object of this invention is to provide a method of producing a molded ceramic article, wherein the reinforcement deposited and dispersed in the third step is at least one oxide selected from the group consisting of CrO, CrO$_2$ and Cr$_2$O$_3$.

Yet still a further object of this invention is to provide a method of producing a molded ceramic article, which comprises:

the first step wet-mixing a powder mix as raw materials comprising electrolytic copper powder as a main component, and chromium powder within a composition range of from at least 0.4 wt. % to at most 3.0 wt. % based on the whole weight of the powder mix, aluminum powder within a composition range of from at least 0.05 wt. % to at most 1.2 wt. %, titanium powder within a composition range of from at least 0.03 wt. % to at most 1.0 wt. % and a carbonaceous material in which the carbon residue falls within a composition range of at most 0.1 wt. %, or chromium powder in a proportion of from at least 4 mg to at most 30 mg per gram of the powder mix, aluminum powder in a proportion of from at least 0.5 mg to at most 12 mg per gram of the powder mix, titanium powder in a proportion of from at least 0.3 mg to at most 10 mg per gram of the powder mix and a carbonaceous material in which the carbon residue is in a proportion of at most 1 mg per gram of the powder mix to diffuse the chromium powder, the aluminum powder and the titanium powder into the electrolytic copper powder, thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of at most 700° C. under an inert gas atmosphere and then sintering the preform in a temperature range of from at least 950° C. to at most 1065° C. under an inert gas atmosphere whose pressure is lower than 10 kg/cm$^2$, thereby depositing a reinforcement on a part of the surface of the chromium powder and on at least parts of the surfaces of the aluminum powder and titanium powder.

Yet still a further object of this invention is to provide a method of producing a molded ceramic article, wherein the reinforcement obtained in the third step comprises:

at least one carbide or nitride selected from the group consisting of Cr$_4$C$_3$, Cr$_3$C$_2$, CrN$_2$, CrN, TiN and TiC;

at least one carbonitride selected from the group consisting of Cr(C, N) and Ti(C, N); and at least one oxide selected from the group consisting of Al$_2$O$_3$, TiO$_2$ and TiO.

Yet still a further object of this invention is to provide a method of producing a molded ceramic article, wherein the inert gas atmosphere is obtained by adding H$_2$, CO or NH$_3$ to an inert gas.

Yet still a further object of this invention is to provide a method of producing a molded ceramic article, which comprises:

the first step wet-mixing a powder mix as raw materials comprising electrolytic copper powder as a main component, and chromium powder within a composition range of from at least 0.4 wt. % to at most 3.0 wt. % based on the whole weight of the powder mix or in a proportion of from at least 4 mg to at most 30 mg per gram of the powder mix, aluminum powder within a composition range of from at least 0.05 wt. % to at most 1.2 wt. % based on the whole weight of the powder mix or in a proportion of from at least 0.5 mg to at most 12 mg per gram of the powder mix and titanium powder within a composition range of from at least 0.03 wt. % to at most 1.0 wt. % based on the whole weight of the powder mix or in a proportion of from at least 0.3 mg to at most 10 mg per gram of the powder mix to diffuse the chromium powder, the aluminum powder and the titanium powder into the electrolytic copper powder, thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of from at least 100° C. to at most 300° C. under an inert gas atmosphere and then sintering the preform in a temperature range of from at least 950° C. to at most 1065° C. under an inert gas atmosphere, thereby depositing and dispersing a ceramic reinforcement on a part of the surface of the chromium powder and on at least parts of the surfaces of the aluminum powder and titanium powder.

Yet still a further object of this invention is to provide a method of producing a molded ceramic article, wherein the deposited and dispersed reinforcement obtained in the third step is at least one oxide selected from the group consisting of CrO, CrO$_2$, Cr$_2$O$_3$, Al$_2$O$_3$, TiO and TiO$_2$.

Yet still a further object of this invention is to provide a molded ceramic article comprising, as a principal component, copper and, as essential components, Cr and Ni within the following composition ranges:

0.1≦Cr<2 wt. %

0.1≦Ni<10 wt. % and further comprising at least one additive component selected from the group consisting of the following composition ratios:

0<Fe<5 wt. %

0≦Co<5 wt. %

0≦Al<10 wt. %

0≦Ti<20 wt. %

0≦Mo<3 wt. %

0≦Si<3 wt. %

0≦V<3 wt. %

0≦Mg<1 wt. %

0≦C<5 wt. % and having at least one composition range selected from the group consisting of the following composition ratios:

0<O$_2$<10 wt. %

0<N$_2$<5 wt. %

0<B<10 wt. %.

Yet still a further object of this invention is to provide a molded ceramic article, wherein the copper as a principal component is electrolytic copper or oxygen free copper in the form of powder having a particle size of 100 μm or smaller.

Yet still a further object of this invention is to provide a molded ceramic article, wherein Ti, Al or Si is incorporated in the form of an organic compound represented by the general formula of Ti(OR)$_4$, Ai(OR)$_3$ or Si(OR)$_4$.

Yet still a further object of this invention is to provide a molded ceramic article, wherein the additive component is incorporated in the form of an ethoxide, propoxide, butoxide or carbonyl compound.

Yet still a further object of this invention is to provide a molded ceramic article comprising, as a principal component, copper and, as additive raw materials, at least two powders selected from the group consisting of Cr, Ni, Co, Fe, Ti, V, Mn, Mo, Al, Mg and Si in a proportion not less than 0.5 wt. % but less than 30 wt.

Yet still a further object of this invention is to provide a molded ceramic article comprising copper as a base metal and chromium within a composition range of from at least 0.4 wt. % to at most 3.0 wt. % based on the whole weight of the ceramic article or in a proportion of from at least 4 mg to at most 30 mg per gram of the ceramic article, and having, on the outer surface of a part of the chromium, a reinforcement obtained by depositing a carbide layer and/or a nitride layer.

Yet still a further object of this invention is to provide a molded ceramic article, wherein the reinforcement is at least one carbide or nitride selected from the group consisting of $Cr_4C_3$, $Cr_3C_2$, $CrN_2$ or CrN and/or a carbonitride Cr(C, N).

Yet still a further object of this invention is to provide a molded ceramic article comprising copper as a base metal and chromium within a composition range of from at least 0.4 wt. % to at most 3.0 wt. % based on the whole weight of the ceramic article or in a proportion of from at least 4 mg to at most 30 mg per gram of the ceramic article, and having a deposited and dispersed reinforcement obtained by forming a part of the chromium into a ceramic.

Yet still a further object of this invention is to provide a molded ceramic article, wherein the deposited and dispersed reinforcement is at least one oxide selected from the group consisting of CrO, $CrO_2$ and $Cr_2O_3$.

Yet still a further object of this invention is to provide a molded ceramic article comprising:

copper as a base metal;

chromium within a composition range of from at least 0.4 wt. % to at most 3.0 wt. % based on the whole weight of the ceramic article or in a proportion of from at least 4 mg to at most 30 mg per gram of the ceramic article;

aluminum within a composition range of from at least 0.05 wt. % to at most 1.2 wt. % based on the whole weight of the ceramic article or in a proportion of from at least 0.5 mg to at most 12 mg per gram of the ceramic article; and titanium within a composition range of from at least 0.03 wt. % to at most 1.0 wt. % based on the whole weight of the ceramic article or in a proportion of from at least 0.3 mg to at most 10 mg per gram of the ceramic article, and having a reinforcement obtained by:
depositing a carbide layer and/or a nitride layer on the outer surface of the chromium;
depositing an oxide layer on the outer surface of at least part of the aluminum; and
depositing an oxide layer on the outer surface of at least part of the titanium and a carbide or nitride layer on the outer surface of the residual part.

Yet still a further object of this invention is to provide a molded ceramic article, wherein the reinforcement comprises:

at least one carbide or nitride selected from the group consisting of $Cr_4C_3$, $Cr_3C_2$, $CrN_2$, CrN, TiN and TiC;

at least one carbonitride selected from the group consisting of Cr(C, N) and Ti(C, N); and at least one oxide selected from the group consisting of $Al_2O_3$, $TiO_2$ and TiO.

Yet still a further object of this invention is to provide a molded ceramic article comprising:

copper as a base metal;

chromium within a composition range of from at least 0.4 wt. % to at most 3.0 wt. % based on the whole weight of the ceramic article or in a proportion of from at least 4 mg to at most 30 mg per gram of the ceramic article;

aluminum within a composition range of from at least 0.05 wt. % to at most 1.2 wt. % based on the whole weight of the ceramic article or in a proportion of from at least 0.5 mg to at most 12 mg per gram of the ceramic article; and titanium within a composition range of from at least 0.03 wt. % to at most 1.0 wt. % based on the whole weight of the ceramic article or in a proportion of from at least 0.3 mg to at most 10 mg per gram of the ceramic article, and having a deposited and dispersed reinforcement obtained by forming a part of the chromium, and at least parts of the aluminum and titanium into ceramics.

Yet still a further object of this invention is to provide a molded ceramic article, wherein the deposited and dispersed reinforcement is at least one oxide selected from the group consisting of CrO, $CrO_2$, $Cr_2O_3$, $Al_2O_3$, TiO and $TiO_2$.

Yet still a further object of this invention is to provide a molded ceramic article, wherein the amount of the oxygen contained in the molded ceramic article is within a composition range of from at least 0.05 wt. % to at most 1.5 wt. % or in a proportion of from at least 0.5 mg to at most 15 mg per gram of the molded ceramic article.

Other objects and advantages of the present invention will be readily appreciated from the preferred embodiments of the present invention, which will be described subsequently in detail with reference to the accompanying drawings.

BRIEF DESCRIPTION OF THE DRAWINGS

In the accompanying drawings:

FIG. 9 diagrammatically illustrates the test results of molded ceramic specimens obtained in Experimental Example D according to a preferred embodiment of the production method of the present invention;

FIG. 10a diagrammatically illustrates the compositions of molded ceramic specimens obtained in Experimental Example E2 according to a preferred embodiment of the production method of the present invention;

FIG. 10b diagrammatically illustrates the test results of the molded ceramic specimens obtained in Experimental Example E2 according to the preferred embodiment of the production method of the present invention;

FIG. 10c graphically illustrates the test results of molded ceramic specimens obtained in Experimental Example E3 according to the preferred embodiment of the production method of the present invention;

FIG. 11 diagrammatically illustrates the test results of molded ceramic specimens obtained in Experimental Example E5 according to a preferred embodiment of the production method of the present invention;

FIG. 12 diagrammatically illustrates the test results of molded ceramic specimens obtained in Experimental Example F1 according to a preferred embodiment of the production method of the present invention;

FIG. 13 diagrammatically illustrates the compositions of molded ceramic specimens obtained in Experimental Example F2 according to a preferred embodiment of the production method of the present invention;

FIG. 14 diagrammatically illustrates the test results of the molded ceramic specimens obtained in Experimental Example F2 according to the preferred embodiment of the production method of the present invention;

FIG. 15a diagrammatically illustrates the compositions of molded ceramic specimens obtained in Experimental Example F3 according to a preferred embodiment of the production method of the present invention and preset conditions upon sintering;

FIG. 15b diagrammatically illustrates the test results of the molded ceramic specimens obtained in Experimental Example F3 according to the preferred embodiment of the production method of the present invention;

FIG. 16a diagrammatically illustrates the results of tests making use of galvanized steel plates as weld metals with respect to molded ceramic specimens obtained in Experimental Example G1 according to a preferred embodiment of the production method of the present invention;

FIG. 16b diagrammatically illustrates the results of tests making use of aluminum plates as weld metals with respect to molded ceramic specimens obtained in Experimental Example G1 according to a preferred embodiment of the production method of the present invention;

FIG. 17 diagrammatically illustrates the compositions of molded ceramic specimens obtained in Experimental Example G2 according to a preferred embodiment of the production method of the present invention;

FIG. 18 diagrammatically illustrates the test results of the molded ceramic specimens obtained in Experimental Example G2 according to the preferred embodiment of the production method of the present invention;

FIG. 19a diagrammatically illustrates the compositions of ceramic specimens obtained in Experimental Example G3 according to a preferred embodiment of the production method of the present invention and preset conditions upon sintering;

FIG. 19b diagrammatically illustrates the test results of the molded ceramic specimens obtained in Experimental Example G3 according to the preferred embodiment of the production method of the present invention;

FIG. 20a diagrammatically illustrates the results of tests making use of galvanized steel plates as weld metals with respect to molded ceramic specimens obtained in Experimental Example H1 according to a preferred embodiment of the production method of the present invention;

FIG. 20b diagrammatically illustrates the results of tests making use of aluminum plates as weld metals with respect to molded ceramic specimens obtained in Experimental Example H1 according to a preferred embodiment of the production method of the present invention;

FIG. 21 diagrammatically illustrates the compositions of molded ceramic specimens obtained in Experimental Example H2 according to a preferred embodiment of the production method of the present invention;

FIG. 22 diagrammatically illustrates the test results of the molded ceramic specimens obtained in Experimental Example H2 according to the preferred embodiment of the production method of the present invention.

FIG. 23 diagrammatically illustrates the experimental conditions of the first through seventh experiments in Experimental Example I according to a preferred embodiment of the production method of the present invention;

FIG. 27 graphically illustrates the progress of processes for the production of a molded ceramic article in both Experimental Example I according to the preferred embodiment of the production method of the present invention and the prior art;

FIG. 29 schematically illustrates the relationship between a mixture, and punches and a mold in a transition process in Experimental Example I according to the preferred embodiment of the production method of the present invention;

DETAILED DESCRIPTION OF THE PREFERRED EMBODIMENTS

Figure 1A:
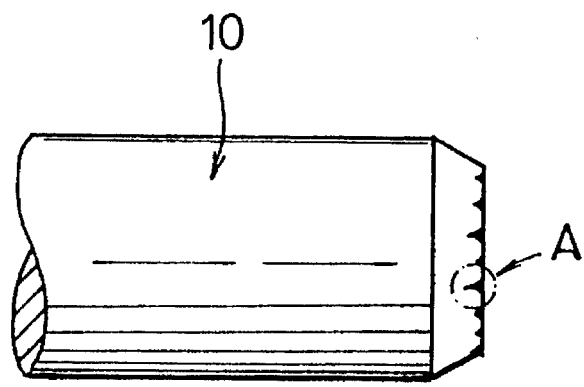
FIG. 1a is a side elevation view illustrating an electrode tip making use of a Cr—Cu alloy according to the prior art.
Figure 1B:
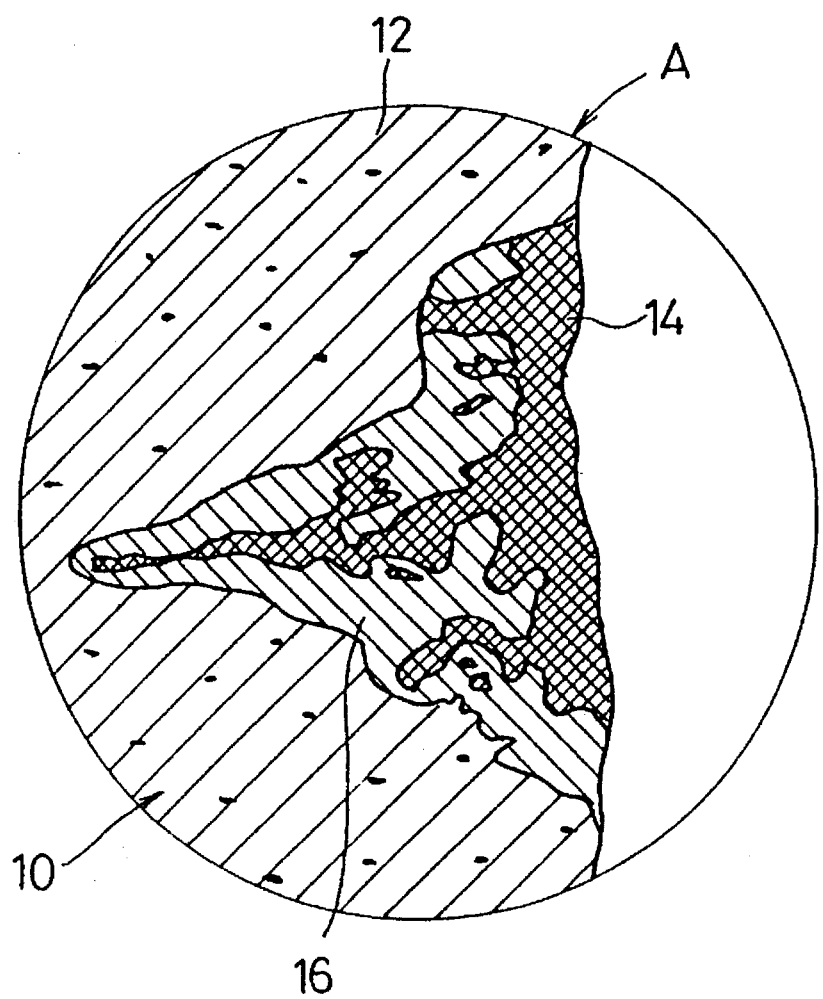
FIG. 1b is an enlarged view of the distal end of the electrode tip making use of the Cr—Cu alloy according to the prior art.
Figure 2A:
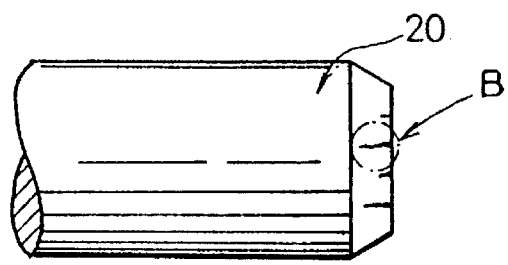
FIG. 2a is a side elevation view of an electrode tip making use of an aluminum oxide dispersed copper alloy according to the prior art.
Figure 2B:
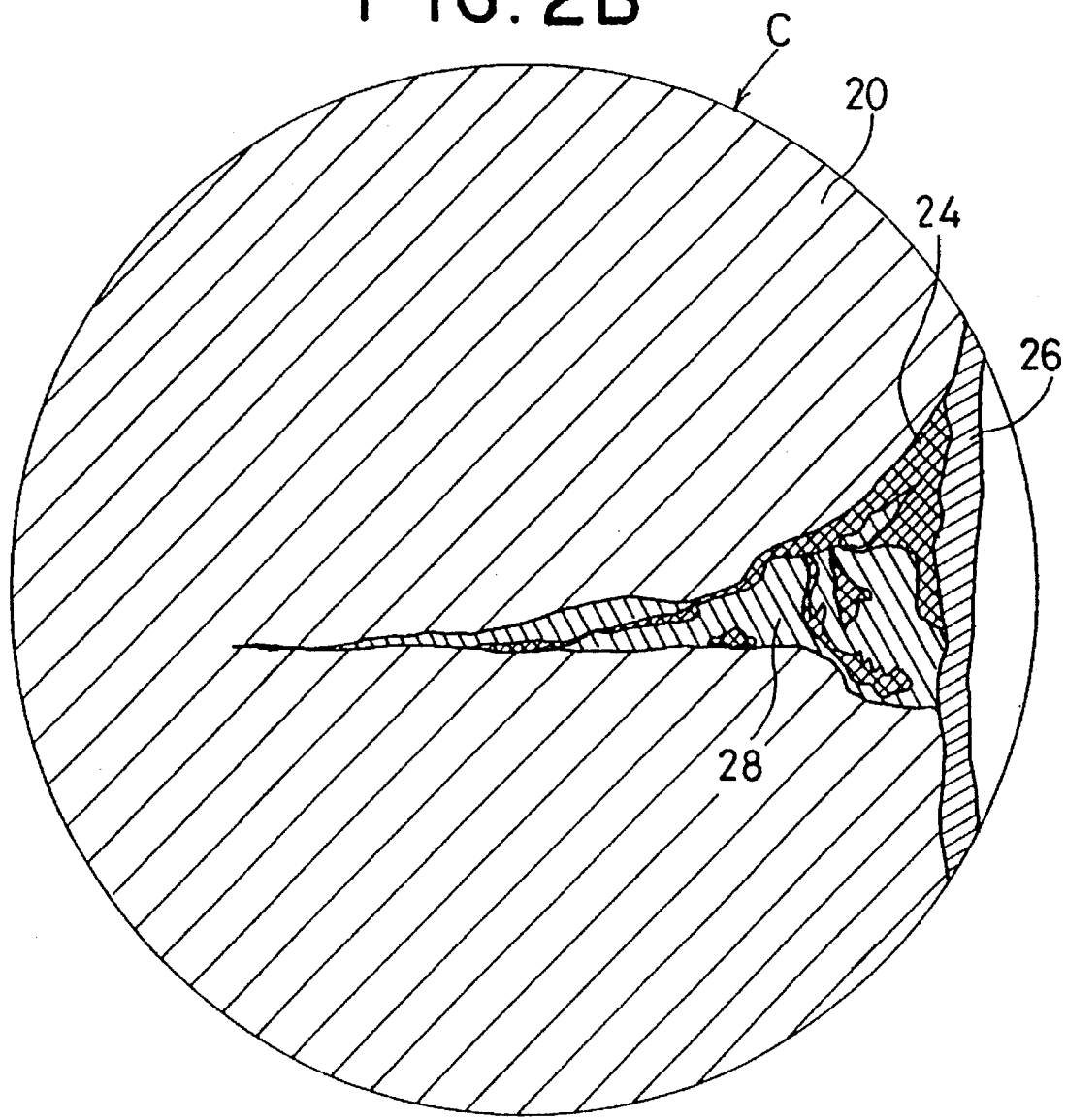
FIG. 2b is an enlarged view of the distal end of the electrode tip making use of the aluminum oxide dispersed alloy according to the prior art.

A production method of molded ceramic articles according to the first embodiment of the present invention by using a uniaxial press molding machine illustrated in FIG. 3 will hereinafter be described.

The uniaxial press molding machine includes a lower punch 34 and an upper punch 36, which are inserted in an opposite relation to each other into a cavity 32 defined in a mold 30.

In the first step, a raw material 37 as a mixture composed of a powder high in modulus of elasticity and a powder low in modulus of elasticity such as a metal-ceramic composite, as a powder composed of grown dendrite crystals such as electrolyte powder, as plates manufactured as quench-coagulated powder, or as a powder having acicular horns is thoroughly mixed, to which a liquid additive 39 as a liquid phase product is added.

In this case, the liquid additive 39 may be selected from water, alcohols such as ethanol, methanol and isopropanol, aromatic compounds such as toluene, xylene and benzene and saturated organic compounds such as hexane. By the way, it is necessary to add the liquid additive 39 in an amount suitable for filling up spaces of the raw material 37 to realize the hydrostatically applied of pressure, which will be described subsequently. The amount should be preset according to, for example, the shape, type, particle size, particle size distribution, etc. of the powder used. Specifically, it is suitable to add the liquid additive 39 in a proportion of, for example, 10–30 wt. % based on 100 wt. % of the raw material 37.

Figure 3:
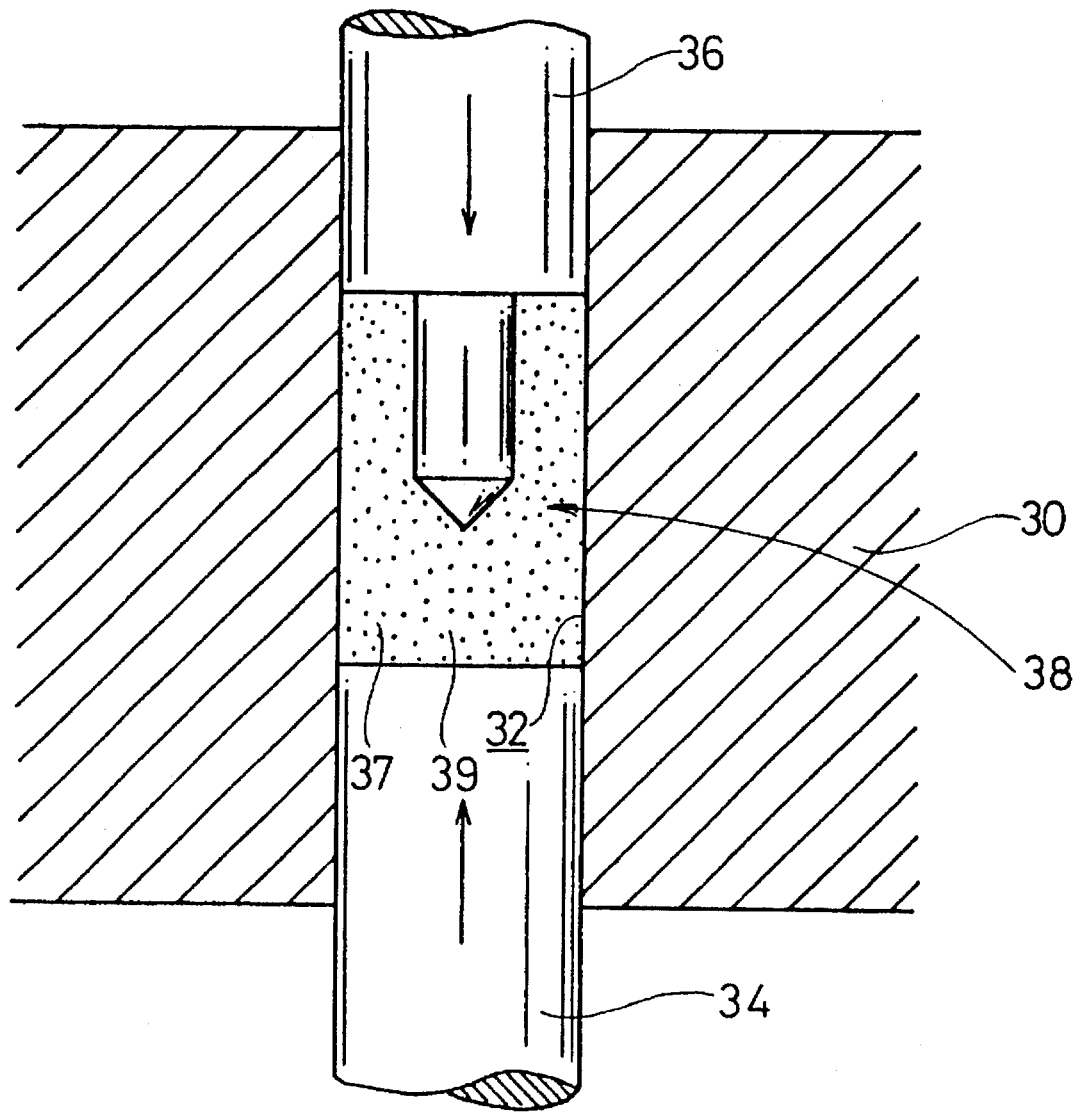
FIG. 3 is a schematic illustration of a uniaxial press molding machine to which the method of the present invention is applied.

In the second step, a mixture 38 obtained in the first step and composed of the raw material 37 and the liquid additive 38 is charged in the cavity 32 of the uniaxial press molding machine illustrated in FIG. 3. Thereafter, the mixture 38 is subjected to uniaxial press molding using the lower punch 34 and the upper punch 36 to form a preform. In this case, the pressure applied is uniformly transmitted through the liquid additive 39 to the raw material 37, namely, the pressure to be transmitted is applied uniformly to the raw material 37 owing to the presence of the liquid additive 39, thereby attaining the same effects as in the hydrostatically applied of pressure in spite of the uniaxial application of pressure and hence compressing the mixture 38 uniformly.

The uniaxial press molding is further continued as described above, so that an excess of the liquid additive 39 in the mixture 38 is discharged out through a gap defined by the mold 30, the lower punch 34 and the upper punch 36. Namely, the upper punch 36 and the lower punch 34 are fitted in the mold 30 with a clearance narrower than the size of the raw material 37. Therefore, the liquid additive 39 leaks out through the clearance, while the raw material 37 remains in the cavity. Incidentally, a pressure of 30 MPa to 10 GPa is suitably applied in the third step.

Lastly, the lower punch 34 and the upper punch 36 are separated away from each other to open the mold 30, thereby taking the mixture 38 out of the mold 30.

Experimental Example A1

Ten wt. % of titanium isopropoxide was added to 100 wt. % of a mixed raw material 37 composed of 96 wt. % of electrolytic copper powder (325 mesh), 1 wt. % of Ni powder (average particle size: 0.5 μm) and 3 wt. % of $Al_2O_3$ powder (average particle size: 0.4 μm) and they were thoroughly mixed.

Then, 30 wt. % of a liquid additive 39 composed of 20 wt. % of acetone and 80 wt. % of ethanol was added to the raw material 37, and they are thoroughly mixed to form a mixture 38. In this case, the titanium isopropoxide was deposited and coagulated on the surface of the dendritically grown electrolytic copper powder and the surfaces of the other components of the mixed raw material 37 by the liquid additive 39.

The mixture 38 was then charged in a cavity 32 in the uniaxial press molding machine illustrated in FIG. 3 to press-mold it under a pressure of 300 MPa.

In this case, the clearance between the mold 30 and the lower punch 34 and upper punch 36 is 100–200 μm, and the sliding surface of the upper punch 36 to the mold 30 is planished. In the course of the press molding, when the pressure applied became higher than 30 MPa, an excess of the liquid additive 39 flowed out through the clearance between the mold 30 and the lower punch 34 and upper punch 36. This flowing confirmed that a uniform pressure was applied to the mixed raw material 37 through the liquid additive 39.

After increasing the pressure further to 300 MPa, the mixture 38 was taken out of the uniaxial press molding machine. In this case, a pressure (external force) required to remove the preform of the mixture 38 from the molding machine was 10 MPa or lower and hence, its removal operation was extremely easy.

The preform of the mixture 38 was then calcined. After the calcination, a molded ceramic article in which $Al_2O_3$ and $TiO_2$ were finely dispersed. Although a density of 95% or higher of the theoretical value cannot generally be obtained with ease in a sintered body, the density of the molded ceramic article obtained in Experimental Example A1 reached 99% or higher, and no voids were recognized. At grain boundaries, Ti(N, C) were also formed in addition to $TiO_2$ and hence, effects of $H_2$ existing therein became no problem.

Besides, a mixed raw material 37 in which atomization copper powder having an average particle size of 8 μm was used instead of the electrolytic copper powder was subjected to uniaxial press molding under a pressure of 300 MPa in the same manner as described above. As a result, a molded ceramic article good in quality can also be obtained.

Comparative Example A1

Only a mixed raw material 37 having the same composition as that in Experimental Example A1 was dried for 24 hours at 80° C. It was then charged in the uniaxial press molding machine illustrated in FIG. 3 to mold a preform under a pressure of 300 MPa. In this case, the internal pressure in the cavity 32 increased, and an external force of 50–100 MPa was required to remove the preform from the uniaxial press molding machine. It was therefore impossible to remove the preform without deforming its shape. All the preforms obtained by such a method were destroyed. In Experimental Example A1, the mold 30 remained clean even after 100 shots, and no adhesion of the raw material 37 was observed, while dragging caused by the preform occurred on the inner peripheral surface of the mold 30, from which the preform had been removed, even after one shot in Comparative Example A1, and the planished surface became a scraped or fusion-bonded state.

Experimental Example A2

A suitable amount of a liquid additive 39 composed of an acrylic resin emulsion, ammonium alginate and a water-soluble phenol resin was added to a mixed raw material 37 composed of 90 wt. % of silicon nitride, 5 wt. % of aluminum oxide and 5 wt. % of yttrium oxide and having an average particle size of 1.2 µm, and water was added further in a proportion of 50 parts by weight per 100 parts by weight of the raw material 37. They were wet-mixed for 24 hours in a ball mill. The resulting mixture 38 was subjected to deaeration for 48 hours at 70° C. and then dried and ground to give a particle size of 30 mesh. The moisture content of the thus-ground mixture 38 was then controlled to 18–21% by means of a humidistat and a water sprayer, thereby preparing a mixture 38 for preforming. This mixture 38 had a dough-like feel when it was rubbed with fingers.

The mixture 38 was then subjected to uniaxial press molding under a pressure of 200 MPa into preforms having a size of 80×30×40 mm. No cracks caused by lamination were observed on 30 preforms thus molded.

After each of the preforms was dewaxed at 650° C., it was subjected to capsule-free HIP sintering for 2 hour at 1750° C. under 250 bars. In general, when a preform is calcined by sintering under pressure after dewaxing, the preform were curved or deformed when the difference in internal density of the preform is great, many molding defects the degrees of which cannot be noticed visually occurs, and cracks or fractures tend to occur. However, in the case of the above-described preforms, small cracks occurred in only one of the 30 preforms. Their results were very good.

Comparative Example A2

After only a mixed raw material 37 composed of the same composition as that in Experimental Example A2 was wet-mixed in a ball mill, it was dried for 48 hours at 70° C. and then ground to give a particle size of 30 mesh. The thus-ground raw material was subjected to uniaxial press molding under the same conditions as those in Experimental Example A2 to obtain preforms.

In this case, cracks caused by lamination were observed on 29 preforms of 40 preforms thus molded, and resulted in defective moldings. In addition, when the preforms were sintered under the same conditions as those in Experimental Example A2, cracks appeared to be caused by lamination occurred on all of sintered bodies, and they were deformed.

The second embodiment of the present invention will hereinafter be described in detail.

In a production method of molded articles according to this embodiment of the present invention, a liquid additive which is added to a powder mix as raw materials to obtain a mixed raw material and composed of at least one of alcohols such as ethanol and 2-propanol, ketones such as acetone, arenes such as benzene, toluene and xylene, alkanes such as hexane, fluorine-containing alkanes, and water is added in a proportion of about 5–40 parts by weight per 100 parts by weight of the powder mix. If the proportion is lower than 5 parts by weight, the flowability of the powder mix cannot be improved. In addition, since the hydrostatically applied condition of pressure cannot be realized in the initial stage of injection molding, voids are blocked by particles of the powder mix, in other words, by plastic deformation of the filled materials and hence the discharge path of the liquid additive added is filled in. On the contrary, if the proportion is higher than 40 parts by weight, an excess of the liquid additive is separated upon the application of pressure and the powder components are dispersed and suspended in the liquid, and then caused to flow out of the mold through the boundary between a stationary mold and a movable mold, or an HIP vent. In addition, when the proportion of the liquid phase exceeds 40 parts by weight, segregation in component, particle size or the like may occur during the mixing of the components. Since the liquid additive has a low viscosity compared with the conventionally used low-viscosity additive, i.e., the organic compounds such as petroleum paraffin and a phenol resin, which are added in a proportion of 20–50 wt. % of the whole weight of the mixed raw material, in other words, has high flowability, the mixing ability with the powdery raw materials becomes high. Therefore, it is possible to intimately mix a mixed raw material without heating a kneader for feeding the mixed raw material and the mold, or the liquid additive and the mixed raw material itself in advance.

Further, the mixed raw material thus intimately mixed is injected into the mold and held in a hydrostatically applied condition of pressure by applying a pressure. Accordingly, the pressure is transmitted through a liquid phase formed in the hydrostatically applied condition of pressure. Although dispersion of pressure have been uneven due to interparticle friction and bridge phenomenon in which particles of the powders link to each other at their ends, and an excessive pressure has been required to date, the pressure is smoothly transmitted in the hydrostatically applied condition of pressure in the present example. It is therefore possible to mold heavy-gage articles.

Further, when the internal pressure of the mold increases to a certain threshold value or higher, the hydrostatically applied condition of pressure in the mold is destroyed, namely, the liquid phase of the mixture in the mold is destroyed, so that an excess of the liquid is discharged through an air vent of the mold or other clearances. After the excess of the liquid is discharged, the mixed raw material is held in the form of plastic deformation of powder, so-called, entanglement so that the content of the liquid additive is about from 1 wt. % to less than 5 wt. % for a molded metallic article, or from 3 wt. % to less than 15 wt. % for a molded ceramic article. Moreover, since the excess of the liquid additive is discharged from these molded article, it is possible to prevent defects and brittleness contingent to the scattering or evaporation of the liquid in a subsequent drying step from forming. Moreover, since a suitable amount of the liquid additive is left in the molded article and the excess of the liquid additive is discharged, it is not necessary to conduct a dewaxing process in which a long period of time is required, i.e., a process for eliminating the unnecessary liquid additive composed of the organic compounds, prior to calcination.

Incidentally, since the mold comes into contact with the raw materials through the liquid phase and moreover, a compound excellent in detergency such as a "Flonsolve" containing fluorine therein is contained in the liquid additive, the mold is always kept clean, and any raw materials neither fusion-bond to the mold nor drag the mold. Therefore, it is possible to prolong the durability of the mold and obtain high-quality preforms having little surface roughness. Accordingly, the molded ceramic articles obtained by calcining the high-quality preforms having little surface roughness can have a desired quality.

This embodiment of the present invention will hereinafter be described by the following experimental examples.

Experimental Example B1

A powder mix as raw materials was provided by weighing −325 mesh electrolytic copper powder, metal chromium powder having an average particle size of 2 µm, aluminum oxide powder having an average particle size of 0.6 µm,
 −325 mesh titanium powder and −325 mesh metal aluminum powder so as to give proportions of 98.3 parts by weight, 0.8 part by weight, 0.5 part by weight, 0.3 part by weight and 0.1 part by weight, respectively.

A liquid additive composed of 80 vol. % of ethanol and 20 vol. % of 2-propanol was then added to the powder mix in a proportion of 12 parts by weight per 100 parts by weight of the powder mix to mix them until they were intimately mixed, thereby obtaining a mixed raw material. The mixed raw material was then injection-molded under pressures of 300–2,000 kg f/cm$^2$ using an injection molding machine, thereby obtaining preforms. The thus-obtained preforms each had a size of 18 mm across and 80 mm long. The preforms were then dried for 32 hours at 100° C. to calculate separately the amounts of the liquid additive remaining in the preforms from their weights after and before the drying, thereby determining the densities of the preforms from these. The relationships between the moisture contents and the pressures applied upon the injection molding with respect to the respective preforms are shown in a graph illustrated in FIG. 4 and the relationships between their densities and the pressures applied at this time are shown in a graph illustrated in FIG. 5.

Thereafter, the preforms were separately heated at a rate of 15° C./min using a sintering furnace and held for each 30 minutes at 250° C., 350° C. and 650° C., and then for 30 minutes at 950° C., for 30 minutes at 1,000° C. and for 2 hours at 1,050°, thereby obtaining sintered bodies as molded ceramic articles. The relationships between the densities and the pressures applied upon the injection molding with respect to the respective molded ceramic articles are shown in a graph illustrated in FIG. 6.

Figure 4:
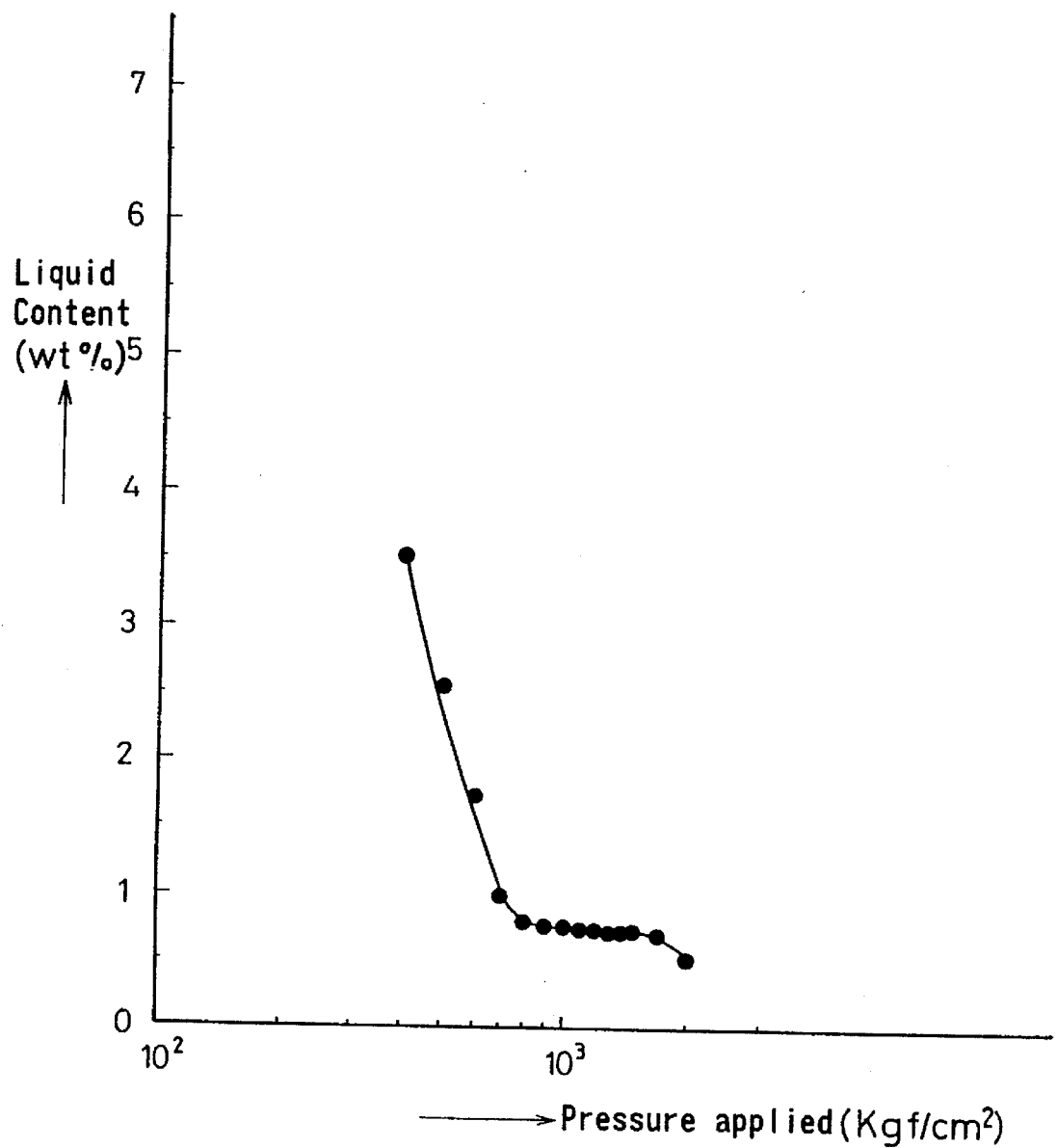
FIG. 4 graphically illustrates the relationships between the moisture contents in preforms and the pressures applied upon injection molding with respect to Experimental Example B1.
Figure 5:
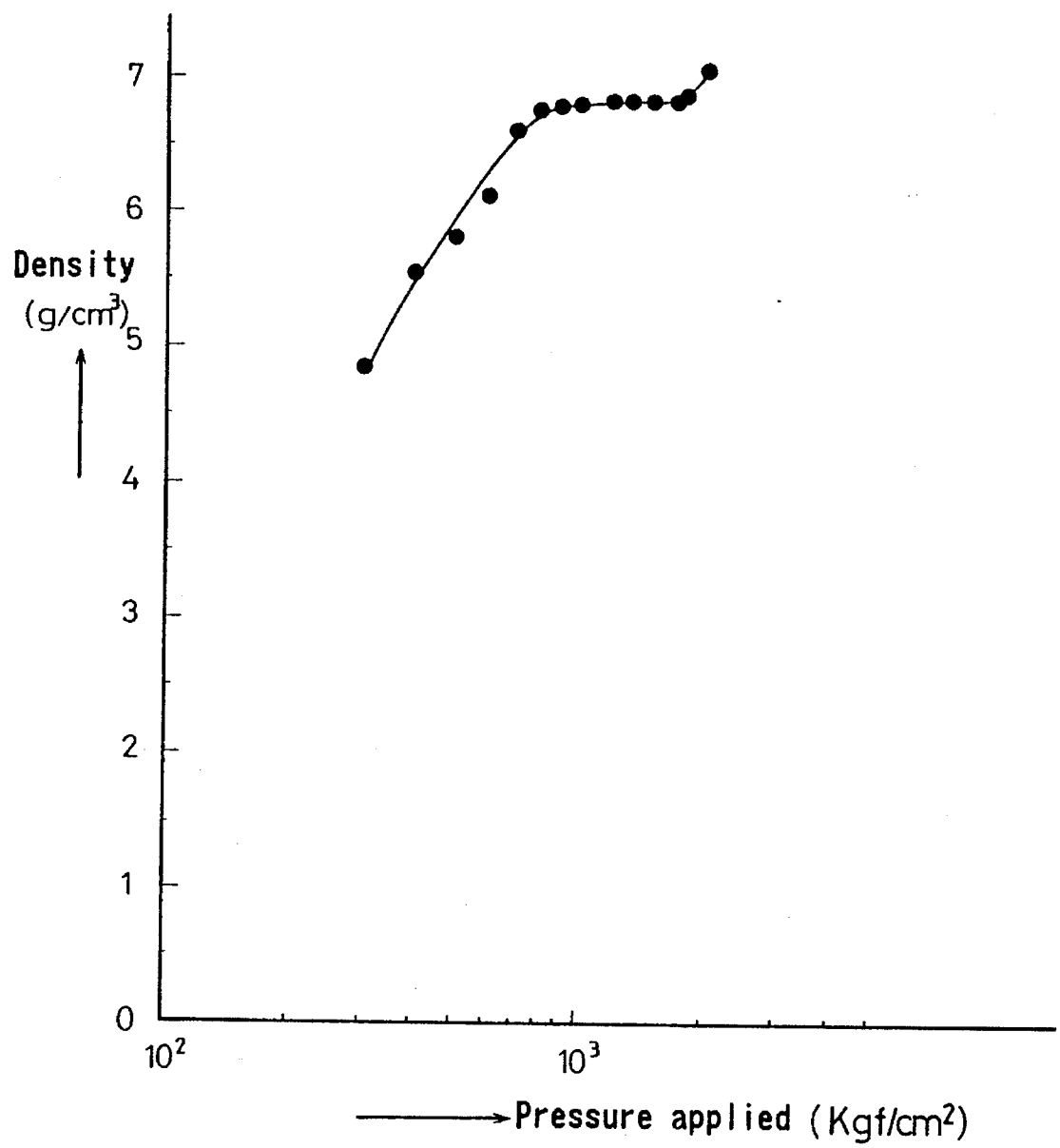
FIG. 5 graphically illustrates the relationship between the densities of the preforms and the applied pressures with respect to Experimental Example B1.

It is judged from the graphs in FIGS. 4 and 5 that the excess of the liquid additive is discharged completely by the application of pressure up to about 800 kg f/cm$^2$. Even when the pressure applied exceeds 1,800 kg f/cm$^2$ the density is somewhat increased. It can be understood from this that such pressures exceed the upper limit of the pressure required to discharge the excess of the liquid additive, whereby the preform undergoes a plastic deformation to a great extent.

Figure 6:
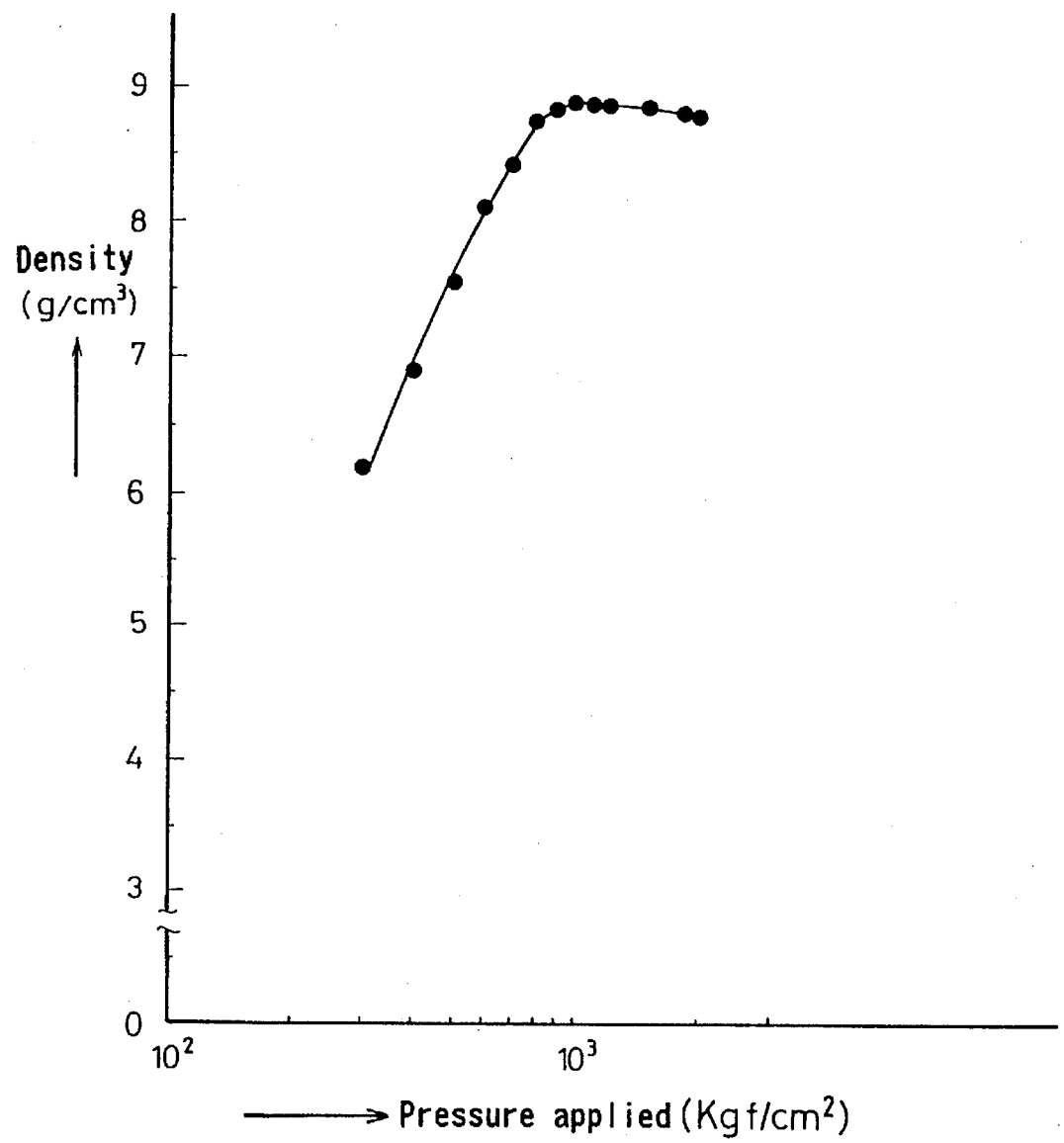
FIG. 6 graphically illustrates the relationships between the densities of molded ceramic articles and the applied pressures with respect to Experimental Example B1.

It is appreciated from the graph in FIG. 6 that any applied pressures exceeding 800 kg f/cm$^2$ result in molded ceramic articles having substantially the same density. However, when a pressure exceeding 1,800 kg f/cm$^2$ is applied, a preform applied with such a pressure undergoes a plastic deformation due to the undue pressure, whereby flow paths in the preform are blocked. It is therefore understood that the density of the resulting molded ceramic article is decreased due to the presence of voids in the blocked form.

Experimental Example B2

Silicon carbide whiskers were dispersed in −325 mesh quench-coagulated aluminum powder so as to give a concentration of 20 vol. %, thereby providing a powder mix as raw materials. As a liquid additive, a fluorine-containing alkane, a so-called "Flonsolve" was added in a proportion of 12 parts by weight per 100 parts by weight of the powder mix, and they were mixed to give an intimate mixture, thereby obtaining a mixed raw material.

Figure 7:
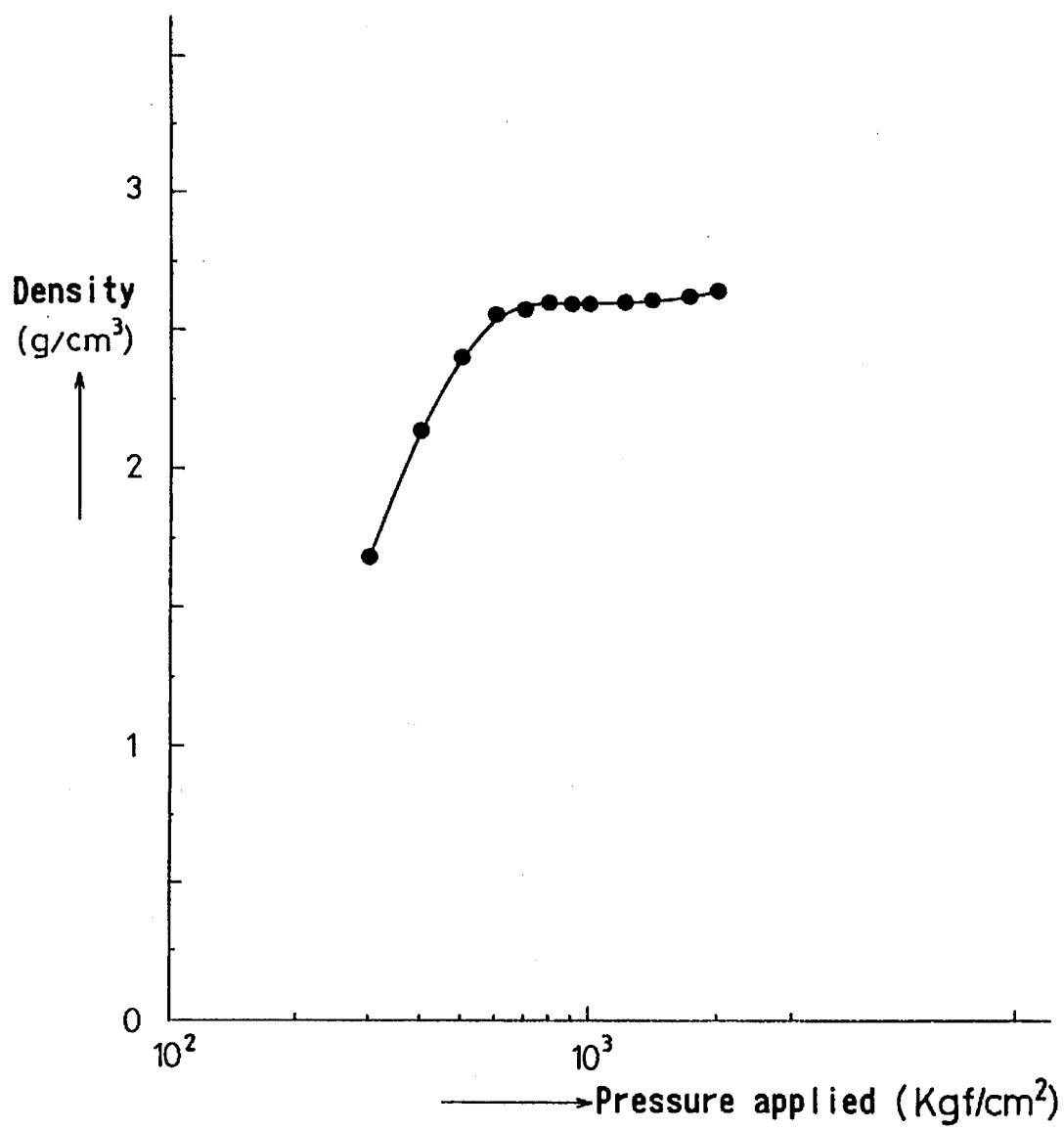
FIG. 7 graphically illustrates the relationships between the densities of molded ceramic articles and the pressures applied upon injection molding with respect to Experimental Example B2.

The mixed raw material was then injection-molded at room temperature under pressures of 300–2,000 kg f/cm$^2$ using an injection molding machine. The thus-obtained preforms each had a size of 35 mm across and 100 mm long. Each of the preforms was heated for 24 hours at 80° C. to eliminate the Flonsolve. Thereafter, the preforms were separately heated at a rate of 10° C./min and held for each 30 minutes at 150° C. and 280° C., and then heated up to 600° C. to sinter them for 1 hour in an argon gas atmosphere, thereby molded ceramic articles. The relationships between the densities and the pressures applied upon the injection molding with respect to the respective molded ceramic articles are shown in a graph illustrated in FIG. 7.

Each of the thus-obtained molded ceramic articles was then subjected to a hot isostatic pressing (hereinafter called "HIP") with a view toward making it a dense and high-strength product. The molded ceramic article was first of all formed in a size of 28×8×72 mm. The thus-formed article was placed into a stainless capsule. The capsule was deaerated and then vacuum-sealed to subject the ceramic article to the HIP for 30 minute at 560° C. under 2,000 atm.

The densities of the thus-treated articles were measured. As a result, it was found that those obtained by sintering under pressures higher than 200 kg f/cm$^2$ almost indicate a real density of at least 97% of the theoretical density. Incidentally, in the conventional injection conditions according to the prior art, it is necessary to heat the resulting preform to 600° C. with a view toward completely evaporating the low-viscosity additive such as petroleum paraffin and a phenol resin, which is added for improving the flowability and filling ability, in its removal process. Accordingly, when the preform is heated to 600° C. and then subjected to the dewaxing process, the additive reacts to aluminum contained as the base metal in the preform. Therefore, it has been impossible to conduct injection molding making use of aluminum as a raw material. For this reason, in the conventional technique, a raw material has been obtained by the uniaxial press molding or extrusion and the thus-obtained raw material has been subjected to casting, thereby molding it. Besides, it was found that if the additive is not added, whiskers agglomerate, so that difficulties are encountered on filling the raw material into a mold and hence, it is impossible to obtain any molded articles.

Namely, in the production method of molded ceramic articles according to this embodiment, it was possible to easily obtain molded ceramic articles making use of aluminum as a raw material and subjected to the HIP after the injection molding.

Experimental Example B3

A powder mix as raw materials was provided by weighing silicon carbide powder having an average particle size of 0.8 μm, yttrium oxide powder having an average particle size of 0.4 μm, aluminum oxide powder having an average particle size of 0.6 μm and lanthanum oxide powder having an average particle size of 1 μm so as to give proportions of 89 parts by weight, 5 parts by weight, 4 parts by weight and 2 parts by weight, respectively. As a liquid additive, purified water was added in a proportion of 20 parts by weight per 100 parts by weight of the powder mix, and they were wet-mixed for 24 hours using a ball mill. The resulting mixture was deaerated under reduced pressure, and its moisture content was adjusted to 20 wt. %, thereby obtaining a mixed raw material. After the mixed raw material was then kneaded by a kneader, the thus-kneaded mixed raw material was injection-molded under pressures of 300–2,000 kg f/cm$^2$ using an injection molding machine to obtain preforms.

The thus-obtained preforms were then dried and then calcined to obtain molded ceramic articles, and their densities were separately calculated. The graph in FIG. 8 illustrates the relationships between the pressures applied upon the injection molding and the densities of the respective molded ceramic articles.

As a comparative example, a mixed raw material was prepared by using the same powder mix of the raw materials as in Experimental Example B3, namely, the powder mix obtained by weighing silicon carbide powder having an average particle size of 0.8 μm, yttrium oxide powder having an average particle size of 0.4 μm, aluminum oxide powder having an average particle size of 0.6 μm and lanthanum oxide powder having an average particle size of 1 μm so as to give proportions of 89 parts by weight, 5 parts by weight, 4 parts by weight and 2 parts by weight, respectively, adding, as a low-viscosity additive, an additive composed of 30 vol. % of Bakelite and 70 vol. % of petroleum paraffin wax in a proportion of 40 vol. % per 100 vol. % of the powder mix, and then mixing them to give an intimate mixture.

The thus-obtained mixed raw material was fully kneaded by a kneader preheated to 160° C., and then injected into molds preheated to 80° C. under pressures of 300–2,000 kg f/cm² to mold it, thereby obtaining preforms. Incidentally, a cycle of this process was controlled to 40 seconds including the retention time under pressure. Thereafter, the resulting preforms were separately heated to 180° C. at a rate of 5° C./min and held for 4 hours at the same temperature, and then for each 6 hours at 260° C. and 300° C. They were then heated at a rate of 1° C./10 min from 300° C. and held for each 6 hours at 330° C., 350° C., 380° C. and 420° C. They were further heated at a rate of 1° C./10 min from 220° C. and held for each 6 hours at 330° C., 350° C., 380° C. and 420° C. Furthermore, they were heated at a rate of 1° C./20 min from 420° C. and held for each 12 hours at 430° C., 450° C., 480° C., 500° C., 520° C., 540° C. and 560° C., and then cooled in the furnace. By the way, the total time consumed in the above-described dewaxing process was about 7 days. The densities of the molded ceramic articles thus obtained are shown collectively by ○ marks in the graph illustrated in FIG. 8.

Figure 8:
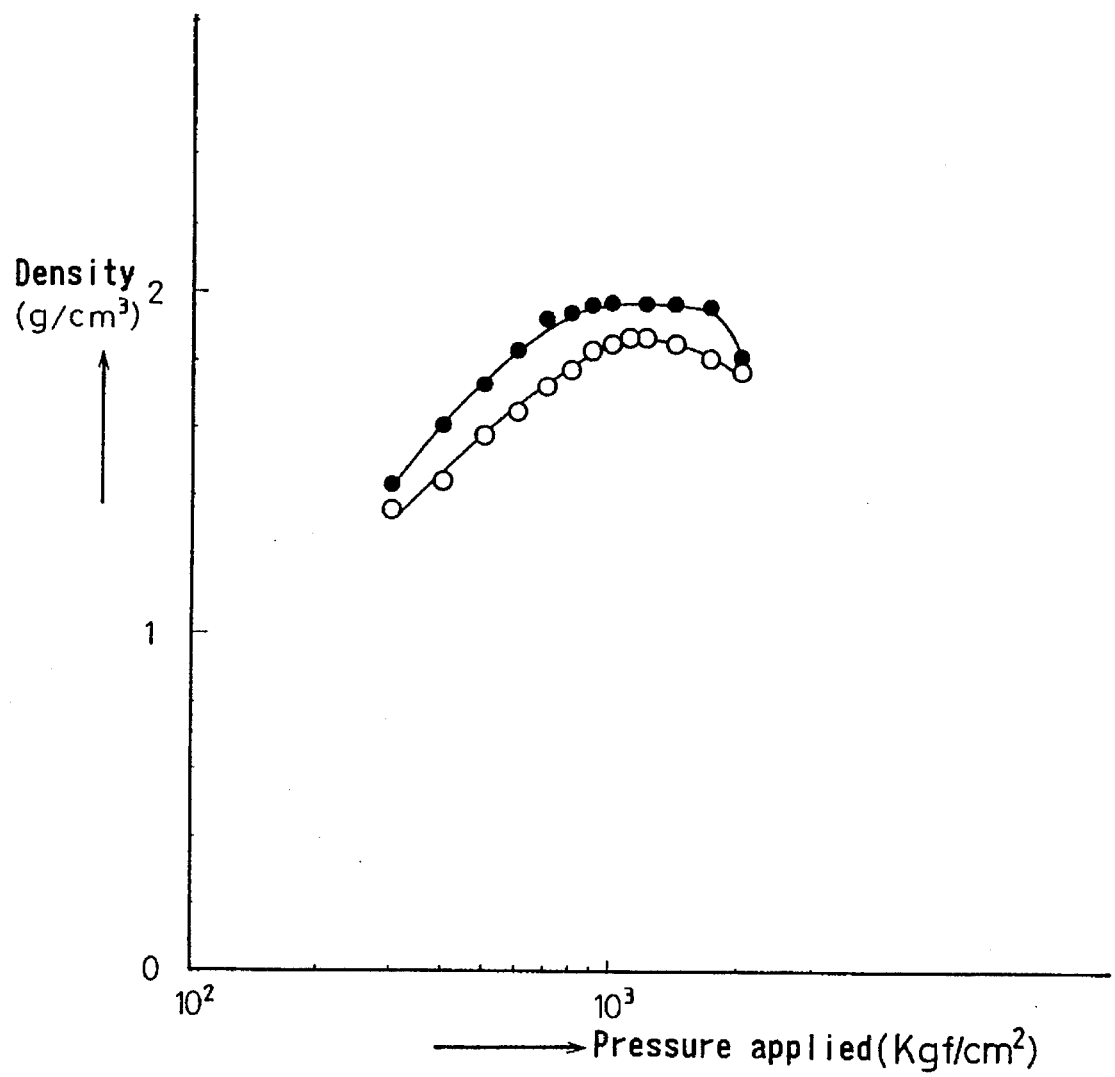
FIG. 8 graphically illustrates the relationships between the densities of molded ceramic articles and the pressures applied upon injection molding with respect to Experimental Example B3 and its comparative example.

As apparent from the above-described condition setting, the method of the comparative example, namely, the method making use of the low-viscosity additive, requires the dewaxing and sintering processes according to the complicated and long-term temperature setting and moreover, it permits the molding of sound ceramic articles only within the pressure range of 1,100–1,300 kg f/cm² compared with Experimental Example B3 as apparent from the ○ marks of the comparative example in FIG. 8. In the comparative example, cracks were formed in all the molded ceramic articles under any pressures outside the above range. It is therefore only possible to mold within the narrow pressure range.

Besides, in Experimental Example B3, cracks were formed in the molded ceramic articles under any pressures above 1,800 kg f/cm². It is understood from this that the hydrostatically applied condition of pressure was destroyed under any pressure above this limit, so that particles quarreled with one another and hence, heavy residual stress was released during the calcination. In addition, it is also understood that in the injection molding under any pressures below 700 kg f/cm² in Experimental Example B3, the interparticle distance became greater due to segregation, so that effective sintering could not be accomplished. Accordingly, it can be appreciated that in Experimental Example B3, the dewaxing and sintering processes according to the complicated and long-term temperature setting is useless upon the production of molded ceramic articles, and the stable range permitting the sound molding of the ceramic articles extends wide.

The molded ceramic articles and production method thereof according to the present invention will hereinafter be described in detail by the following preferred third embodiment.

In this embodiment, the following experiment was conducted, in which welding electrode tips making general use of molded ceramic articles were used. When the electrode tips after used in welding are analyzed, the diffusion of metal components from works is observed to a great extent on each of the electrode tips used in the above-described prior art. The metal components diffused in the electrode tip reacts with the components of the electrode tip to form an alloy or solid solution. Therefore, the electric resistance of the electrode tip is increased and generation of heat occurs on the distal end of the electrode tip, so that the diffusion is further facilitated and lastly, oxides are formed on the electrode tip.

In order to enhance the durability and corrosion resistance of such an electrode tip, it is therefore necessary to contain, in a material making up the electrode tip, at least one constituent component, which can prevent metal components from diffusing from a work in the electrode tip and forming a solid solution, in advance.

Namely, as alloy components of a composite comprising copper as a main component, there are added at least one component selected from Cr, Ni, Co, Fe and the like for enhancing strength to prevent the penetration of the metal components from the work, at least one component selected from Zn, Al, Si, B, P, Mn, Mo, W, V, Nb, Ti, Zr, Hf, Ca, Mg, Be and the like for enhancing corrosion resistance, and at least one component selected from Sb, Bi, Pb, Ag, Au and the like for facilitating the densification upon calcination. Incidentally, all the above additive components sharply increase the electric resistance of the electrode tip. In order to permit the practical use of an electrode tip containing them, it is therefore necessary to use the alloy components in an amount of at most 50 wt. %. In addition, it is also necessary to control their content to at least 0.3 wt. % for attaining the effects as the additive components. Accordingly, the additive components are controlled to an amount not less than 0.5 wt. % but less than 30 wt. %.

A small amount of at least one oxide such as CuO, Cu$_2$O, Ag$_2$O, SnO or ZnO, or finely particulate carbon, for example, carbon black is incorporated in the constituents of the electrode tip to cause it to perform a part of an oxygen source upon a reaction during calcination or a reaction during a casting process, or preliminary part of the reaction. For example, when taking the case of CuO, the copper oxide easily eliminates oxygen in an inert atmosphere or an inert atmosphere added with hydrogen gas to convert into metal copper. The active oxygen released at this time oxidizes Cr, Ni, Co, Al, Ti and/or the like, which is an active metal, to form ceramic particles. By the way, in this reaction, a metal to penetrate from the work is liable to be more oxidized than copper. Therefore, it is also expected to undergo an exchange reaction in which oxygen is imparted to the metal to diffuse and penetrate. It is hence unnecessary to allow the reaction to proceed by 100%.

Furthermore, the ceramics deposited are used to bond the matrix to the ceramics, thereby forming a ceramic-formed metal. In other words, ceramic particles are enlarged to permit densification by sintering.

The method according to this embodiment will hereinafter be described in detail by the following experimental example.

Experimental Example C

Copper powder having an arborescently-grown dendritic form as a main raw material, and as other raw materials, 0.8 wt. % of Cr, 0.5 wt. % of Ni, 0.5 wt. % of Al, 0.6 wt. % of Ti, 0.1 wt. % of B, 0.1 wt. % of Fe and 1.2 wt. % of $O_2$ were weighed and gathered. They were then mixed by a mixer and further, press-molded under pressure by uniaxial press molding using a molding machine, thereby obtaining preforms. After drying the thus-obtained preforms, they were calcined in a vacuum sintering furnace and then subjected to a solution treatment. After the solution treatment, they were subjected to a cooling treatment and then an aging treatment, thereby obtaining electrode tips made of a molded ceramic article.

According to the above-described process, electrode tip specimens to be used in Experimental Example C were produced. Incidentally, electrode tip specimens comprising copper as a main component and 0.8 wt. % of Cr was used in Comparative Example C. The electrode tip specimens to be used in both Experimental Example C and Comparative Example C were formed into dome type electrodes having a tip diameter of 6–12 mm.

Using the respective electrode tip specimens, a durability test for spot welding making use of galvanized steel plates of 0.75 mm thick as works was conducted under preset conditions of an applied pressure of 180–200 kg f/cm$^2$, a welding current of 11,000 A and a weld time of 12 seconds. As a result, it was found that in Comparative Example C, fusion bonding of the electrode tip and the work occurred in 600 spots. In Experimental Example C on the other hand, the fusion bonding occurred for the first time in 2,000 spots. It can therefore be judged that the electrode tip according to Experimental Example C was improved in durability by about three times.

Next, the sections of the tips after used were analyzed by an EPMA. It was found that the penetration of Zn was observed to an extremely great extent in Comparative Example C, but to a very slight extent as one severals of such an extent in Experimental Example C.

Furthermore, the identification of the formed products was attempted by X-ray diffraction. As a result, the formation of CuZn and $Cu_5Zn_8$, which were compositional components of the respective alloys composing the electrode tips, were observed in both Experimental Example C and Comparative Example C. However, the formation of $Cu_2O$, $Cu_2Cr_2O_4$ and $ZnO_2$ was recognized only in Comparative Example C.

With respect to the migrated corrosion of the tips, a difference of 0.7–1.1 arose in that of Comparative Example C, while the difference observed in that of Experimental Example C was as little as 0.05 mm.

From the analytic results of the formed products in the section of the tip after used by using the EPMA, identification results of the formed products by the X-ray diffraction and data of the migrated corrosion in Comparative Example C, it can be understood that a great amount of Zn diffused and penetrated deep in the depth direction of the electrode tip specimen from the work components, thereby forming a great amount of a new alloy. The thus-formed new alloy was caused to increase the electric resistance of the specimen, whereby an amount of heat generated thereon was increased and finally, the distal end of the specimen was oxidized. Therefore, the amount of heat generated on the specimen was further increased secondarily, whereby the molten Zn bonded to the distal end of the electrode tip specimen and an insulating layer was formed by oxidation accompanying the generation of heat. As a result, it can be understood that electrical discharge caused the migrated corrosion to occur to a great extent.

In Experimental Example C, Ze of the work component diffused and penetrated only in an extremely small amount compared with the case of Comparative Example C and also, its depth of penetration was extremely shallow. Therefore, it can be considered that the penetration and diffusion of Zn were prevented by the additive components added or ceramic particles deposited and the corrosion resistance was hence enhanced.

The hardnesses of the tips were $H_{RB}$ 65 for Experimental Example C and $H_{RB}$ 63 to $H_{RB}$ 70 for Comparative Example C.

It was confirmed from the above data that according to this embodiment, metal component(s) is prevented from diffusing and penetrating from one material, i.e., a work into the other material, i.e., an electrode tip, thereby inhibiting the formation of any alloys or solid solutions by the reaction of the metal component(s) of said one material with said the other material and the formation of any oxides, so that the durability and corrosion resistance of the electrode tip are improved to a significant extent.

The molded ceramic articles and production method thereof according to the present invention will hereinafter be described in detail by the following preferred fourth embodiment.

As indicated in Experimental Example C, in welding electrode tips making general use of molded ceramic articles and suitable for use in used, oxides are formed on the electrode tips after used. In order to enhance the durability and corrosion resistance of such an electrode tip, it is therefore necessary to contain, in a material making up the electrode tip, at least one constituent component, which can prevent metal components from diffusing from a work in the electrode tip and forming a solid solution, in advance.

Namely, in copper powder which has a dendritic structure and is a base metal for electrode tips, was incorporated at least one oxide powder, carbon powder or metal powder, which has a small particle size and can fill up the voids of the dendritic structure, to cause it to perform a part of an oxygen source or carbon source upon a reaction during calcination, or preliminary part of the reaction. At this time, such a component causes to diffuse a metal or carbon and the oxide itself is converted into an element metal. The oxygen released at this time oxidizes an active metal to form ceramic particles.

Furthermore, the ceramics deposited are used to bond the matrix to the ceramics, thereby forming a ceramic-formed metal. In other words, ceramic particles are enlarged to permit densification by sintering.

Experimental Example D

Mixed raw materials were separately prepared by weighing and gathering –325 mesh dendritic electrolytic copper powder as a principal raw material and other raw materials composed of 0–1.5 wt. % of Cr as a depositing and reinforcing material, 0–0.7 wt. % of Ni, 0.5–1.5 wt. % of $Al_2O_3$, 0.5–1.5 wt. % of $TiO_2$, 0–0.3 wt. % of Si and 0–3 wt. % of SiC as dispersing materials, 0–0.8 wt. % of Co and 0–0.5 wt. % of Ti as depositing and reinforcing materials, 0–0.8 wt. % of Fe, 0–0.3 wt. % of TiC, 0–0.5 wt. % of TiN, 0–10 wt. % of $TiB_2$ and 0–10 wt. % of $ZrB_2$ as solution solid-forming, depositing and reinforcing materials, 1–10 wt. % of titanium isopropoxide as a dispersing and reinforcing material, and 0–3 wt. % of aluminum isopropoxide as a dispersing and reinforcing material.

The thus-obtained mixed raw materials were then mixed over 10–30 minutes by a mixer while controlling their moisture contents to 10–15%.

Then, the resulting mixtures were separately press-molded under a pressure of 1–2 t/cm² by uniaxial press molding using a molding machine, thereby obtaining preforms. The thus-obtained preforms were dried for at least 2 hours at a drying temperature of 80°–120° C. Thereafter, they were calcined for 3–5 hours at a sintering temperature of 980°–1,060° C. in a vacuum sintering furnace and further subjected to a solution treatment for 1–2 hours at 1,000° C.

After the solution treatment, they were subjected to a gas cooling treatment in the presence of nitrogen gas.

Then, they were subjected to an aging treatment for 1–2 hours at a temperature of 500° C., thereby obtaining electrode tips made of their corresponding molded ceramic articles. The electric resistance of the thus-obtained electrode tips were measured about 0.1–100 $\mu\Omega$·cm under conditions of a terminal diameter of 30 mm by a precision resistance meter and further, their various physical properties were confirmed. Thereafter, the electrode tips were subjected to a precision embossing, thereby obtaining electrode tip specimens.

With respect to the thus-obtained electrode tip specimens of experimental examples 1 through 9 and comparative examples 1 and 2, which are shown in FIG. 9, a durability test for continuous spot welding making use of double-side hog-galvanized steel plates of 0.75 g/m² as works was conducted under test conditions of an applied pressure of 180–200 kg f/cm², a welding current of 11 kA and a weld time of 12 seconds.

Incidentally, the electrode tip specimens to be used each had a tip diameter of 6 mm, and the determination of weldability was conducted by predetermining the lower limit of a nugget diameter to 3.6 mm.

As a result, as apparent from the data shown in FIG. 9, it was found that in the comparative examples 1 and 2, the numbers of times of the welding before fusion bonding of the electrode tip and the work occurred were 600 spots and 800 spots, respectively, while in the experimental examples 1 through 9 according to the present invention, the numbers of times were 2,500 spots even at the lowest, and 3,000–3,500 spots in most cases. It can therefore be judged that the electrode tips according to the present invention were improved in durability upon the continuous spot welding.

Using the 7th example as a typical example according to this embodiment, its electrode tip specimen and various test results will hereinafter be described and analyzed more specifically.

A mixed raw material was prepared by weighing and gathering 94.7 wt. % of −325 mesh dendritic electrolytic copper powder as a principal raw material, 0.3 wt. % of Cr as a depositing and reinforcing material having a particle size of at most 10 µm, 5 wt. % of Ni as a dispersing material having a particle size of at most 5 µm, and 5 wt. % of titanium propoxide, 1 wt. % of aluminum isopropoxide and 0.2 wt. % of polycarbosilane as dispersing and reinforcing materials.

Of the thus-weighed raw materials, aluminum isopropoxide and polycarbosilane as the dispersing and reinforcing materials were dissolved in a solvent composed of ethanol and xylene in advance. The solution was added to the other raw materials and the whole amount of the raw materials was wet-mixed in a mixer by using ethanol again.

After wet-mixing, the content of the solvent in the mixed raw material was adjusted to 12 parts by weight based on 100 parts by weight of the raw materials weighed in a dryer controlled at 60° C.

The thus-obtained mixed raw material was then press-molded under a pressure of 1–2 t/cm² by uniaxial press molding using a molding machine into a rod-like preform of 20×20×75 mm.

The thus-obtained preform was dried for 6 hours at 80° C. and then for 6 hours at 110° C.

Thereafter, nitrogen gas was first of all introduced at a flow rate of 50 ml/min in a vacuum sintering furnace, and the thus-dried preform was heated at a rate of 10° C./min in the furnace and held for 30 minutes at 250° C., for 15 minutes at 320° C., for 15 minutes at 380° C. and for 30 minutes at 485° C. and further heated and held for 1 hour at 650° C.

The heating rate was then changed to 15° C./min to subject the preform to a calcination treatment for each 30 minutes at 750° C., 880° C., 920° C., 970° C. and 1,030° C., and for each 1 hour at 1,050° C. and 1,060° C.

After the thus-treated preform was cooled to 1,020° C. at a cooling rate of 80° C./min and held for 1 hour at the same temperature, it was cooled in a nitrogen gas atmosphere and immediately subjected to an aging treatment for 2 hours at a temperature of 500° C., thereby obtaining electrode tip specimens made of a molded ceramic article.

The physical properties of the thus-obtained electrode tip specimen were measured to obtain the following results.

The electrode tip specimen had a density of 8.87 g/cm³, a hardness, $H_{RB}$ of 65–68, a coefficient of linear contraction of 15.6% and an electric resistance of 2 $\mu\Omega$.

In addition, the durability test for continuous spot welding was conducted. As a result, 3,500 spots of welding were required before the fusion bonding occurred. Further, the electrode tip specimen after the test was analyzed by X-ray diffraction. As a result, it was confirmed that $Al_2O_3$, TiC, TiN and $TiO_2$ were present as components.

Furthermore, the particles of the ceramic formed were observed through an electron microscope. As a result, it was confirmed that their particle sizes were as fine as about 20–70 ⊙ and also, the particles bond to the matrix at their interface.

As apparent from the above data, even when the ceramic was added in a great amount compared with that in the comparative example 2, the electric resistance was 2 $\mu\Omega$ and lower than 6 $\mu\Omega$ in the comparative example 2.

Therefore, according to this embodiment of the present invention, it is possible to reduce the intergranular resistance, intergranular discharge and electrolytic corrosion owing to the bonding of the ceramics added and/or deposited to the matrix metal and hence, to add the ceramics in an amount more than any conventional amounts.

The molded ceramic articles according to the present invention will hereinafter be described in detail by the following preferred fifth embodiment with reference to the accompanying drawings.

In the production method of the molded ceramic articles according to this embodiment of the present invention, electrolytic copper powder was used as a main component in order to provide copper high in electric conductivity as a base metal.

However, since copper was low in hardness, chromium powder was added to obtain a Cu—Cr alloy. This alloy has mechanical strength as high as 45 kg f/cm² in terms of tensile strength because its interatomic force is strong. Further, since its electric resistance is low, it has an electric conductivity of the order of 70–80% of simple substance of copper. An amount of heat generated on a surface coming into contact with a weld metal upon welding is also less.

However, when the above-described alloy is used as a material for an electrode to weld a galvanized weld metal, metal components such as Zn and Fe other than the components of the alloy penetrate into the crystal structure of the alloy with ease and such different metal components are oxidized with oxygen in the working atmosphere to form enlarged oxides, so that the crystal structure is made brittle, and the alloy is caused to crack and finally to fusion-bond to the weld metal.

Therefore, in this embodiment, in order to avoid the phenomenon leading to the fusion bonding without lowering the electrical conductivity of the alloy, fine chromium powder was caused to diffuse into electrolytic copper powder and a ceramic was then formed, whereby the crystal structure was made dense to prevent the penetration of the different metal components. Incidentally, purified and unoxidized powders were used upon the ceramic formation.

Further, prior to the ceramic formation, the mixed raw powder was plastically deformed by press molding or the like, thereby causing particles of the raw powder to bond to one another. Thereafter, part of the surface thereof was oxidized to form an oxide film of the order of 0.001–0.01 μm thereon.

The reason why such a partial oxide film is formed is that when the whole surface of the raw powder is covered with the oxide film, a subsequent sintering is hindered, resulting in a failure in obtaining any dense ceramics. In addition, any oxide films thicker than 0.01 μm will hinder the sintering. On the contrary, any oxide films thinner than 0.001 μm will hinder the formation of chromium oxides and the growth of the oxide films, so that successful formation of the ceramics is not accomplished and hence, the desired effects cannot be attained.

The oxide films formed on the surfaces of the constituent particles in a preform accumulate in the grain boundaries at the final stage of the sintering and at the same time, facilitate the oxidation of chromium in accordance with the following reaction and hence sintering.

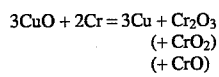

$$3CuO + 2Cr = 3Cu + Cr_2O_3$$
$$(+ CrO_2)$$
$$(+ CrO)$$

By the way, in order to form the oxide films on the surfaces of the constituent particles in the preform, the preform was subjected to a heat treatment at 100°–300° C., preferably, 130°–250° C. in the atmosphere.

After the heat treatment, the preform is sintered in a nitrogen atmosphere at a flow rate of 10–300 ml/min with a view toward eliminating oxygen adsorbed prior to the sintering out of the system and making the oxide films formed on the surfaces of the particles uniform. Any flow rates more than 300 ml/min will make the temperature distribution in a furnace wider, resulting in a failure of accomplishing the evenness. On the contrary, any flow rates less than 10 ml/min cannot attain the desired effects.

The sintering is conducted in a temperature range of 950°–1,065° C. for a period of at least 30 minutes but at most 6 hours.

Any temperatures lower than 950° C. will be difficult to cause sintering to proceed. On the other hand, any temperatures higher than 1,065° C. will cause the resulting sintered body to soften and deform, and vaporize the copper component. The vaporized copper is then solidified to cause the breakdown of the molded ceramic article, so that there is a potential problem that a worker is shocked. It is therefore necessary to preset the temperature within the above range.

This embodiment will hereinafter be described in detail by the following experimental examples with reference to the accompanying drawings.

Experimental Example E1

A powder mix as raw materials was provided by weighing, as a main component forming a base metal, electrolytic copper powder having an average particle size of 44 μm and as an additive component, chromium powder having an average particle size of 0.8 μm so as to give proportions of 98.5 wt. % and 1.5 wt. %, respectively, based on the whole weight of the powder mix.

The resultant powder mix was added with ethanol and the mixture was wet-mixing in a ball mill to disperse and mix the chromium powder into the electrolytic powder.

The content of the ethanol was then adjusted to about 12–13% and the thus-adjusted powder mix was plastically deformed. Thereafter, the thus-deformed powder mix was molded by uniaxial pressing into a preform in the form of 22×22×75 mm.

The thus-obtained preform was dried for 4 hours at 80° C. and then subjected to a heat treatment for 1 hours at 110° C. and for 4 hours at 210° C. in the atmosphere, thereby forming oxide films of the order of 0.001–0.01 μm on the surfaces of the particles making up the preform.

The thus-treated preform was heated to 650° C. at a rate of 10° C./min in a nitrogen atmosphere at a flow rate of 40 ml/min and held for 30 minutes at 650° C. After the flow rate of nitrogen was then reduced to 15 ml/min, the preform was heated up to 1,030° C. at a rate of 10° C./min and held for 1 hour at the same temperature and further heated up to 1,055° C. at a rate of 3° C./min and held for 15 minutes at the same temperature, thereby sintering the preform.

After the sintering, the resulting sintered body was cooled in a sintering furnace and subjected to a solution treatment for 2 hours at 1,000° C. in an argon atmosphere and then oil-cooled, thereby obtaining a molded ceramic article.

The molded ceramic article obtained in accordance with the above-described process was used as specimens to conduct the following various tests.

First of all, a weldability test will be described. Using two weld metals which were put on each other and composed of steel plates plated with each 45 g/m² of zinc on both sides and having a thickness of 0.8 mm, both continuous spot welding ability and fusion bonding behavior to the weld metals were tested under welding conditions of an applied pressure of 200 kg f/cm², a welding direct current of 10,000 A and a weld time of 10 seconds.

By the way, tips making use of the above-obtained sintered body were water-cooled upon the tests. For the sake of comparison, aluminum oxide dispersed copper was used.

As a result, the number of times of the possible continuous spot welding was improved to 2.4 times and the percent fusion bonding was decreased from 14.3% for the comparative example to 3.14%.

The density of the specimen of the comparative example was 8.65 as measured in accordance with the Archimedean method, while the density of the specimen according to this experimental example was increased to 8.89.

The hardness, $H_{RB}$ of the specimen of the comparative example was 72 as measured in accordance with the Rockwell hardness test making use of a steel ball, while the hardness, $H_{RB}$ of the specimen according to this experimental example was 52 and 72% of the comparative specimen.

As a result of a chemical analysis, it was found that the molded ceramic article contained 98.1% of Cu, 1.5% of Cr and 0.4% of $O_2$ and hence, it was confirmed that oxygen was contained. From this result, the following reaction system was established.

$$3CuO\ (Cu_2O\ in\ part)+2Cr=Cr_2O_3+3Cu\ (6Cu\ in\ part)$$

It is understood that the transfer of electrons occurred between the copper particles on which the oxide films were formed by the heat treatment and chromium by the sintering to oxidize chromium, thereby leading to the improvement of the continuous spot welding ability.

The crystallinity of the specimens was observed by etching the specimens with a mixed liquid of $FeCl_3$ and $HCl_3$. As a result, the specimen of the comparative example was in a fibrous form, while a dense crystal lattice was observed on the specimen of the experimental example.

In the observation of the structure making use of an electron microscope, the deposition of the ceramic components was observed on the crystal grains of copper. It is understood that such ceramic components were deposited by oxidation in the course of the ceramic-forming process of chromium. In addition, the bonding of the deposited components to the crystal grains of copper was observed. It is understood that their bonding was a chemical bond accompanied by diffusion.

The microfocus X-ray analysis is used to identify chromium oxides, and $Cr_2O_3$ and a small amount of $CrO_2$ were specified.

Experimental Example E2

Figure 10D:
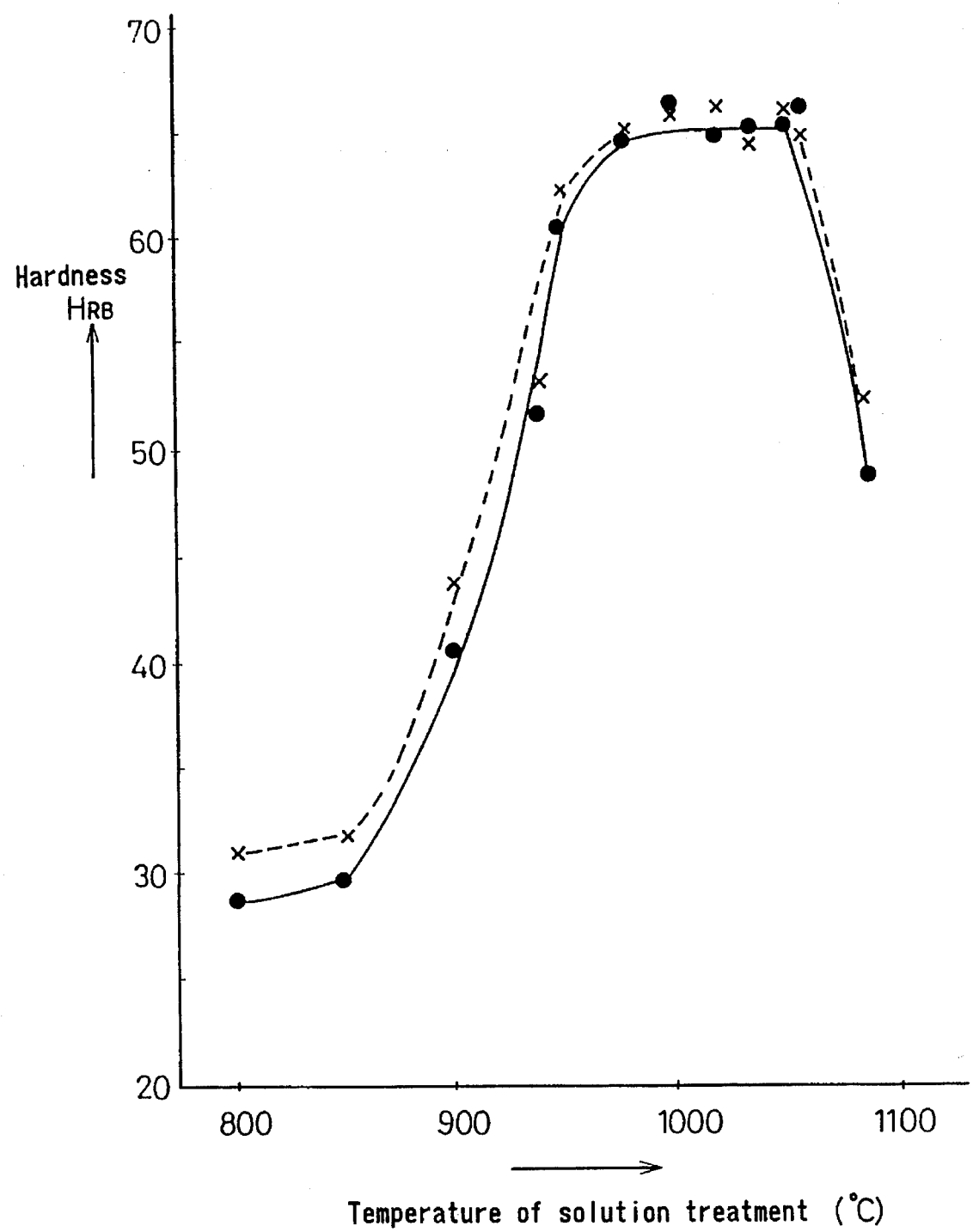
FIG. 10d graphically illustrates the test results of molded ceramic specimens obtained in Experimental Example E4 according to a preferred embodiment of the production method of the present invention.

The same powdery raw materials as those used in Experimental Example E1 were used. Ethanol was added to first through 26th powder mixes of their corresponding composition ratios diagrammatically shown in FIG. 10a. Each of the resulting mixtures was wet-mixed for 5 days in a ball mill to disperse and mix the chromium powder into the electrolytic copper powder.

The resulting mixtures were separately molded in the same manner as in Experimental Example E1, thereby obtaining respective preforms. The thus-obtained preforms were dried at 80° C. Thereafter, the preforms were respectively treated in accordance with the first through 26th process conditions shown in FIG. 10a, thereby obtaining molded ceramic articles.

The first through 26th sintered bodies thus obtained were separately used as specimens to conduct the same tests as in Experimental Example E1. Their results are shown in FIG. 10b. It can be judged collectively from the test results that when the amount of chromium added is within the range of from at least 0.4 wt. % to at most 3.0 wt. %, preferably, from at least 0.8 wt. % to at most 2.4 wt. %, the resulting molded ceramic article can suitably be put to practical use.

Experimental Example E3

The same powdery raw materials as those used in Experimental Examples E1 and E2 were used, and preforms to which the chromium powder was added in proportions of 0.8 wt. % and 1.4 wt. % were separately obtained in the same manner as in Experimental Examples E1 and E2.

The thus-obtained preforms were separately subjected to a heat treatment at 240° C. in the atmosphere to form oxide films of about 0.001–0.01 μm on the surfaces of particles making up each of the preforms.

The thus-treated preforms were separately sintered at 1,060° C. in an argon atmosphere at a flow rate of 10 ml/min.

After the sintering, the resulting sintered bodies were held for 4 hours at 1,000° C. and quenched by oil-cooling, followed by respective aging treatments for 4 hours at varied temperatures within the temperature range of 300°–600° C. to obtain respective molded ceramic articles. Incidentally, both specimens of the molded ceramic articles obtained by this experimental example had a density of 8.91–8.93 g/cm³.

The relationship between the hardness and the aging temperature with respect to each of the molded articles is graphically illustrated in FIG. 10c. The marks ○ and x indicate the molded ceramic articles added with 0.8 wt. % of the chromium powder and 1.4 wt. % of the chromium powder, respectively.

As apparent from FIG. 10c, it is judged that the aging temperature is suitably preset within the range of 450°–530° C., preferably, 480°–520° C.

Experimental Example E4

The same powdery raw materials as those used in Experimental Example E3 were used and calcined in the same manner as in Experimental Example E3. An aging temperature was then preset to 500° C., and the thus-obtained sintered bodies were respectively subjected to solution treatments at varied temperatures within the temperature range of 800°–1,060° C. The relationship between the hardness and the temperature upon the solution treatment with respect to each of the thus-obtained molded articles is graphically illustrated in FIG. 10d. The marks ○ and x indicate the molded ceramic articles added with 0.8 wt. % of the chromium powder and 1.4 wt. % of the chromium powder, respectively.

The hardness, $H_{RB}$ suitable for practical use is 50 or higher. Any hardness lower than $H_{RB}$ 50 cannot withstand the softening, wear and external pressure when an molded ceramic article having such a low hardness is used as an electrode and hence, it is apprehend that there will be reduction in current density. As apparent from FIG. 10d, it is judged that the temperature upon the solution treatment is suitably preset within the range of 950°–1,050° C., preferably, 980°–1,030° C.

Experimental Example E5

The same powdery raw materials as those used in Experimental Examples E1 and E4 were used, and preforms to which the chromium powder was added in proportions of 0.8 wt. %, 1.4 wt. % and 2.4 wt. % were separately obtained in the same manner as in Experimental Examples E1 and E4.

The thus-obtained preforms were separately subjected to a heat treatment at 300° C. in the atmosphere to form oxide films of about 0.001–0.01 μm on the surfaces of particles making up each of the preforms.

The thus-treated preforms were respectively sintered at 1,060° C. in mixed gas atmospheres of hydrogen and nitrogen at a flow rate of 300 ml/min.

After the sintering, the resulting sintered bodies were separately held for 4 hours at 1,000° C. in an argon atmosphere, thereby subjecting them to a solution treatment, and the thus-treated sintered bodies were quenched by oil-cooling, followed by an aging treatment for 4 hours at 500° C. to obtain respective molded ceramic articles.

Incidentally, the hydrogen concentrations in the mixed gas atmospheres were 0 wt. %, 5 wt. %, 15 wt. % and 35 wt. %, respectively.

The first through 12th sintered bodies thus obtained were separately used as specimens to conduct the same tests as in Experimental Examples E1 and E2 under the same conditions as those therein. Their results are shown in FIG. 11.

As apparent from FIG. 11, it is understood that since hydrogen eliminates an excess of oxygen and reduces the copper particles the surfaces of which have been oxidized to excess upon the heat treatment, the sintered density of the resulting sintered body is increased, whereby the enhancement in test results with respect to both hardness and number of times of fusion bonding behavior is recognized.

The molded ceramic articles and production method thereof according to the present invention will hereinafter be described in detail by the following preferred sixth embodiment.

In the production method of the molded ceramic articles according to this embodiment of the present invention, a Cu—Cr alloy with chromium powder added to electrolytic copper powder as a base metal was used.

However, when this alloy is used as a material for an electrode to weld a galvanized weld metal, metal components such as Zn and Fe other than the components of the alloy penetrate into the crystal structure of the alloy with ease and such different metal components are oxidized with oxygen in the working atmosphere to form enlarged oxides, so that the crystal structure is made brittle, and the alloy is caused to crack and finally to fusion-bond to the weld metal.

Therefore, in this embodiment, in order to avoid the phenomenon leading to the fusion bonding without lowering the electrical conductivity of the alloy, fine chromium powder was caused to diffuse into electrolytic copper powder and the resulting mixture was then sintered in an inert gas atmosphere such as nitrogen gas to form both nitride layer and carbide layer on the surface of the chromium so as to increase apparent ceramic particles corresponding to the deposition of chromium, whereby the penetration of the different metal components is prevented.

The chromium is added within the composition range of from at least 0.4 wt. % to at most 3.0 wt. %. Any amounts more than 3.0 wt. % will cause the sensitization of grain boundaries, so that the oxidation of the chromium proceeds to an extent greater than it needs and hence, intergranular corrosion and the like occur thereon and moreover an electrode material composed of such an alloy is deformed with time. Therefore, the intended effects cannot be substantially accomplished if the chromium is added in such an amount. On the other hand, the addition of any amounts less than 0.4 wt. % will also result in a substantial failure in attaining the intended effects.

In order to provide the above inert gas atmosphere, nitrogen gas alone or a mixed gas composed of nitrogen gas and argon gas and/or hydrogen gas is used as an inert gas. The use of argon gas alone is expensive in view of cost, while the use of hydrogen gas alone involves a risk of explosion.

It is also possible to enhance the reaction efficiency by adding carbon monoxide gas, ammonia gas and/or the like to the inert gas.

With a view toward cleaning the surface of the powder oxidized, enhancing the nitriding efficiency of the chromium and using for the carbonization of the chromium, the carbonaceous material is added in such a proportion that a carbon residue is at most 0.1 wt. %.

Any carbon residues exceeding 0.1 wt. % will inhibit the densification of a resulting sintered body. Also, from the viewpoint of accomplishing its intimate dispersion, it is necessary to add the carbonaceous material in the above range.

The carbonaceous material to be added is desirably in the form of a liquid such as an alcohol, but may be in a finely particulate form such as carbon black.

In order to attaining the cleaning of the surface of the powder oxidized, which is one of the above-described objects, without inhibiting the sintering, it is necessary to preset a temperature range up to at most 700° C. at which the carbonaceous material added is vaporized.

The flow rate of the inert gas is kept to about 0.5–20 l/min by suction of a vacuum pump. Any flow rates exceeding 20 l/min will make the furnace temperature distribution wider, resulting in a reduced cleaning efficiency. On the contrary, any flow rates less than 0.5 l/min will make the cleaning impossible.

Incidentally, the sintering is conducted under a pressure not less than 0.1 kg f/cm$^2$ but up to 10 kg f/cm$^2$. The sintering pressure is preset lower at its initial stage and gradually increased after this. Any pressures lower than 0.1 kg f/cm$^2$ will fail to obtain a good sintering efficiency. On the contrary, any pressures higher than 10 kg f/cm$^2$ will inhibit the sintering.

Experimental Example F1

A powder mix as raw materials was provided by weighing, as a main component making up a base metal, electrolytic copper powder having an average particle size of 44 µm, and as additive components, chromium powder having an average particle size of 1.6 µm and carbon black in such a way that they were respectively in proportions of 98.55 wt. %, 1.4 wt. % and 0.05 wt. %, all, based on the whole weight of the powder mix.

Ethanol was added to the powder mix and the mixture was wet-mixed in a ball mill to disperse and diffuse the chromium powder into the electrolytic copper powder.

The content of the ethanol was then adjusted to about 12–13% and the thus-adjusted powder mix was then molded under a pressure of 150 MPa by uniaxial pressing into a preform in the form of 22×22×75 mm.

The resulting preform was dried for 6 hours at 80° C. and then heated to 110° C. to dry it for 4 hours in the atmosphere.

The thus-dried preform was then heated up to 350° C. at a rate of 10° C./min in a nitrogen atmosphere at a flow rate of 2 l/min and held for 1 hour at the same temperature, and then heated up to 485° C. at a rate of 10° C./min and held for 1 hour at the same temperature. Oxygen contained in the preform was eliminated in the course of up to this process.

After the preform was heated further to 900° C. at a rate of 10° C./min and held for 30 minutes at the same temperature in a furnace, nitrogen gas was filled in the furnace to a pressure of 5 bars to uniformly stabilize a protective ceramic film formed. The thus-treated preform was then heated up to 980° C. at a rate of 10° C./min and held for 30 minutes at the same temperature and further heated up to 1,030° C. at a rate of 5° C./min and held for 30 minutes at the same temperature, and still further heated up to 1,050° C. at a rate of 5° C./min and held for 30 minutes at the same temperature.

Then, the thus-obtained sintered body was immediately cooled to 1,000° C. and held for 4 hours to form a solution of the chromium, followed by its quenching by oil cooling.

After the quenching, the sintered body was subjected to an aging treatment for 2 hours at 500° C. with a view toward depositing and forming fine particles of chromium and applying residual stress.

The thus-obtained molded ceramic article was used as specimens to conduct the following various tests.

First of all, a weldability test will be described.

Using two weld metals which were put on each other and composed of steel plates plated with each 45 g/m² of zinc on both sides and having a thickness of 0.8 mm, both continuous spot welding ability and fusion bonding behavior to the weld metals were tested under welding conditions of an applied pressure of 200 kg f/cm², a welding direct current of 10,000 A and a weld time of 10 seconds.

For the sake of comparison, aluminum oxide dispersed copper containing 0.8 wt. % of aluminum oxide was used.

Their results are shown in FIG. 12. As apparent from FIG. 12, the numbers of times of the possible continuous spot welding were 2,500 spots for this example and 900 spots for the comparative example. Therefore, the number of times of the possible continuous spot welding was improved to about 278% and the fusion bonding was decreased to ⅕. It is apparent that the durability of the specimen according to this experimental example was significantly improved.

The density of the specimen of the comparative example was 8.76 as measured in accordance with the Archimedean method, while the density of the specimen according to this experimental example was increased to 8.89.

Their hardness was measured by the Rockwell B scale. The hardness, HRB of the specimen of the comparative example was 74, while the hardness, $H_{RB}$ of the specimen according to this experimental example was 53 and 72% of the comparative specimen.

As a result of a chemical analysis, it was found that the molded ceramic article contained 98.5% of Cu, 1.38% of Cr, 0.03% of C, 0.01% of N and the balance of $O_2$ and hence, it was confirmed that oxygen and nitrogen were contained. Incidentally, it is considered that the carbon added was vaporized as carbon monoxide and carbon dioxide.

By the observation of the structure and analysis of the deposited layer and deposits, it was confirmed that carbon and nitrogen are not present in the crystal grains of copper. It is therefore judged that carbon and nitrogen were reacted with chromium. It was also identified that the carbide and nitride of the chromium are $Cr_2C_3$ and $CrN_2$, respectively, including an amorphous layer in part.

Experimental Example F2

The same powdery raw materials as those used in Experimental Example F1 were used. Ethanol as a liquid medium was added to first through 28th powder mixes of their corresponding composition ratios diagrammatically shown in FIG. 13. Each of the resulting mixtures was wet-mixed in a ball mill to disperse and mix the chromium powder into the electrolytic copper powder.

Incidentally, with respect to the carbonaceous materials to be added, ethyl cellosolve was used each in an amount of 10 wt. % based on the whole weight of the mixture in the 6th, 12th, 18th and 19th cases and in the other cases, carbon black having an average particle size of 50 Å was used in their corresponding amounts shown in FIG. 13.

After the mixtures as the raw materials were dried, their moisture contents were adjusted to 11–13 wt. % at 70° C.

Each of the mixtures was cooled to room temperature and then molded in the same manner as in Experimental Example F1, thereby obtaining a preform in the form of 22×22×75 mm. The resulting preform was dried for 24 hours at 80° C. and for 24 hours at 110° C.

The pressure within a furnace was then reduced to about 0.1–0.3 Torr by a vacuum pump in a nitrogen atmosphere at a flow rate of 10 l/min.

Sintering was then preformed under preset conditions shown in FIG. 13. Incidentally, the pressures shown in FIG. 13 are controlled pressures, and the changes in gas pressure, which are caused by the thermal expansion of the gas introduced in the furnace, are automatically controlled.

After the sintering was conducted for 60 minutes, the respective sintered bodies thus obtained were subjected to a solution treatment and an aging treatment in accordance with the respective processes in Experimental Example F1.

The first through 28th molded ceramic articles obtained in accordance with the above-described process were separately used as specimens to conduct the same tests as in Experimental Example F1. Their results are shown in FIG. 14.

As apparent from FIGS. 13 and 14, the numbers of times of the possible continuous spot welding were 900 spots and the percent fusion bonding was 14.3% with respect to the specimen made of the aluminum oxide dispersed copper containing 0.8 wt. % of aluminum oxide and used as the comparative example, while the specimens of this experimental example according to this invention were improved to about 2 times in the number of times of the possible continuous spot welding and reduced to 1/10 through 1/50 in the fusion bonding behavior. Therefore, it can be judged that the molded ceramic articles according to this invention predominate in use as electrode materials.

It is also understood that it is preferable to use ethyl cellosolve, i.e., a liquid material as the carbonaceous material.

Experimental Example F3

The same powdery raw materials as those used in Experimental Examples F1 and F2 were used, and molded ceramic articles to which the chromium powder was added in proportions of 0.8 wt. %, 1.4 wt. % and 2.4 wt. % were separately obtained in accordance with their corresponding composition ranges of chromium and other additive components and their corresponding compositions of an inert gas and additive gases by which respective inert gas atmospheres were formed, said composition ranges and compositions being shown in FIG. 15a, in the same manner as in Experimental Examples F1 and F2 except that only the sintering time was reduced to 30 minutes. Incidentally, with respect to the carbonaceous materials to be added, ethyl cellosolve was used in the 16th through 18th cases and in the other cases, carbon black was used.

The molded ceramic articles thus obtained were separately used as specimens to conduct the same tests as in Experimental Examples F1 and F2. Their results are shown in FIG. 15b.

When the test results of this experimental example shown in FIG. 15b are compared with those of Experimental Example F2 shown in FIG. 14, it is found that the specimens of the present experimental example are more stable in basic physical properties such as density and hardness and more improved in both fusion bonding behavior and number of times of the possible continuous spot welding. Accordingly, it is judged that the surface of the raw powder was cleaned by adding NH$_3$, CO and/or H$_2$ to the inert gas.

Besides, with respect to the sintering time, Experimental Example F2 took 60 minutes in every case to sinter the preforms. Although the sintering time was shortened to 30 minutes in every case of the present experimental example on the contrary, the desired effects could be attained.

Therefore, it is judged that both nitriding and carbonizing efficiencies were enhanced, thereby facilitating the sintering.

The molded ceramic articles and production method thereof according to the present invention will hereinafter be described in detail by the following preferred seventh embodiment.

The Cu—Cr alloy obtained in the course of the production process of the molded ceramic articles according to the present invention undergoes fusion bonding upon welding of galvanized weld metals and aluminum alloys.

Therefore, in this embodiment, in order to avoid the phenomenon leading to the fusion bonding without lowering the electrical conductivity of the alloy, fine chromium, aluminum and titanium powders were caused to diffuse into electrolytic copper powder and the resulting mixture was then sintered in an inert gas atmosphere such as nitrogen gas to form both nitride layer and carbide layer on the surface of the chromium so as to increase apparent ceramic particles corresponding to the deposition of chromium, and to oxidize the aluminum into Al$_2$O$_3$, and oxidize the titanium into TiO$_2$ and TiO, and further nitride and carbonize the titanium into TiN, TiC and Ti(C, N) so as to increase ceramic particles, whereby the penetration of the different metal components is prevented.

The chromium, aluminum and titanium are added within the composition ranges of from at least 0.4 wt. % to at most 3.0 wt. %, from at least 0.05 wt. % to at most 1.2 wt. % and from at least 0.03 wt. % to at most 1.0 wt. %, respectively. Any amounts of the chromium more than 3.0 wt. % will cause the sensitization of grain boundaries, so that the oxidation of the chromium proceeds to an extent greater than it needs and hence, intergranular corrosion and the like occur thereon and moreover an electrode material composed of such an alloy is deformed with time. Therefore, the intended effects cannot be substantially accomplished if the chromium is added in such an amount. On the other hand, the addition of any amounts of the chromium less than 0.4 wt. % will also result in a substantial failure in attaining the intended effects. With respect to the aluminum, any amounts less than 0.05 wt. % will result in a failure in attaining the intended effects. On the contrary, any amounts exceeding 1.2 wt. % will make the electric resistance of the alloy greater and hence, make it impossible to put the alloy to practical use. Also, with respect to the titanium, the addition of any amounts less than 0.03 wt. % will result in a failure in attaining the intended effects, while any amounts exceeding 1.0 wt. % will make the electric resistance of the alloy greater and hence, make it impossible to put the alloy to practical use.

In order to provide the above inert gas atmosphere, nitrogen gas alone or a mixed gas composed of nitrogen gas and argon gas and/or hydrogen gas is used as an inert gas. The use of argon gas alone is expensive in view of cost, while the use of hydrogen gas alone involves a risk of explosion.

It is also possible to enhance the reaction efficiency by adding carbon monoxide gas, ammonia gas and/or the like to the inert gas.

With a view toward cleaning the surface of the powder oxidized, enhancing the nitriding efficiencies of the chromium and titanium and using for the carbonization of the chromium and titanium, a carbonaceous material is added in such a proportion that the carbon residue is at most 0.1 wt. %. Any carbon residues exceeding 0.1 wt. % will inhibit the densification of a resulting sintered body. Also, from the viewpoint of accomplishing its intimate dispersion, it is necessary to add the carbonaceous material in the above range.

Experimental Example G1

A powder mix as raw materials was provided by weighing, as a main component making up a base metal, electrolytic copper powder having an average particle size of 44 μm, and as additive components, chromium powder having an average particle size of 1.6 μm, aluminum powder having an average particle size of 0.8 μm, titanium powder having an average particle size of 1.8 μm and carbon black in such a way that they were respectively in proportions of 98.0 wt. %, 1.4 wt. %, 0.4 wt. %, 0.2 wt. % and 0.05 wt. %, all, based on the whole weight of the powder mix.

Ethanol was added to the powder mix and the mixture was wet-mixed in a ball mill to disperse and diffuse the chromium powder into the electrolytic copper powder.

The content of the ethanol was then adjusted to about 12–13% and the thus-adjusted powder mix was then molded under a pressure of 150 MPa by uniaxial pressing into a preform in the form of 22×22×75 min.

The resulting preform was dried for 6 hours at 80° C. and then heated to 110° C. to dry it for 4 hours in the atmosphere.

The thus-dried preform was then heated up to 350° C. at a rate of 10° C./min in a nitrogen atmosphere at a flow rate of 2 l/min and held for 1 hour at the same temperature, and then heated up to 485° C. at a rate of 10° C./min and held for 1 hour at the same temperature. Oxygen adsorbed in the preform was eliminated in the course of up to this process.

After the preform was heated further to 900° C. at a rate of 10° C./min and held for 30 minutes at the same temperature in a furnace, nitrogen gas was filled in the furnace to a pressure of 5 bars to uniformly stabilize a protective ceramic film formed. The thus-treated preform was then heated up to 980° C. at a rate of 10° C./min and held for 30 minutes at the same temperature and further heated up to 1,030° C. at a rate of 5° C./min and held for 30 minutes at the same temperature, and still further heated up to 1,050° C. at a rate of 5° C./min and held for 30 minutes at the same temperature.

Then, the thus-obtained sintered body was immediately cooled to 1,000° C. and held for 4 hours to form a solution of the chromium, followed by its quenching by oil cooling.

After the quenching, the sintered body was subjected to an aging treatment for 2 hours at 500° C. with a view toward depositing and forming fine particles of chromium and applying residual stress.

The thus-obtained molded ceramic article was used as specimens to conduct the following various tests.

First of all, a weldability test will be described.

Using two weld metals which were put on each other and composed of steel plates plated with each 45 g/m$^2$ of zinc on both sides and having a thickness of 0.8 mm, both continuous spot welding ability and fusion bonding behavior to the weld metals were tested under welding conditions of an applied pressure of 200 kg f/cm$^2$, a welding direct current of 10,000 A and a weld time of 10 seconds.

Besides, using two weld metals which were put on each other, made of an aluminum material prescribed in JIS A 5052P and had a thickness of 2.5 mm, both continuous spot welding ability and fusion bonding behavior to the weld metals were tested under welding conditions of an applied pressure of 700 kg f/cm$^2$ and a welding current of 3,500 A.

For the sake of comparison, aluminum oxide dispersed copper containing 0.8 wt. % of aluminum oxide was used.

Their results are shown in FIGS. 16a and 16b. As apparent from these drawings, the numbers of times of the possible continuous spot welding to the galvanized steel plate shown in FIG. 16a and the aluminum alloy shown in FIG. 16b were improved by 200% and 330%, respectively, over the comparative example. On the other hand, the fusion bonding behavior (the number of times of fusion bonding) was reduced to 0 in each case. Therefore, it is apparent that the durability of the specimen according to this experimental example was significantly improved.

The density of the specimen of the comparative example was 8.76 as measured in accordance with the Archimedean method, while the density of the specimen according to this experimental example was increased to 8.91.

Their hardness was measured by the Rockwell B scale. The hardness, H$\underline{RB}$ of the specimen of the comparative example was 74, while the hardness, H$\underline{RB}$ of the specimen according to this experimental example was 62 and 84% of the comparative specimen.

As a result of a chemical analysis, it was found that the molded ceramic article contained 98.48% of Cu, 1.38% of Cr, 0.03% of C, 0.07% of N and the balance of O$_2$ and hence, it was confirmed that oxygen and nitrogen were contained. Incidentally, it is considered that the carbon added was vaporized as carbon monoxide and carbon dioxide.

By the observation of the structure and analysis of the deposited layer and deposits, it was confirmed that carbon and nitrogen are not present in the crystal grains of copper. It is therefore judged that carbon and nitrogen were reacted with chromium and titanium. It was also identified that the carbide and nitride of the chromium and titanium are Cr$_2$C$_3$ and CrN$_2$, and TiN, TiC and Ti(C, N), respectively, including an amorphous layer in part.

Experimental Example G2

The same powdery raw materials as those used in Experimental Example G1 were used. Ethanol as a liquid medium was added to first through 35th powder mixes of their corresponding composition ratios diagrammatically shown in FIG. 17. Each of the resulting mixtures was wet-mixed in a ball mill to disperse and mix the chromium powder into the electrolytic copper powder.

Incidentally, with respect to the carbonaceous materials to be added, ethyl cellosolve was used each in an amount of 10 wt. % based on the whole weight of the mixture in the 7th, 13th, 19th, 20th and 27th cases and in the other cases, carbon black having an average particle size of 50 Å was used in their corresponding amounts shown in FIG. 17.

After the mixtures as the raw materials were dried, their moisture contents were adjusted to 11–13 wt. % at 70° C.

Each of the mixtures was cooled to room temperature and then molded in the same manner as in Experimental Example G1, thereby obtaining a preform in the form of 20×20×70 mm. The resulting preform was dried for 24 hours at 80° C. and for 24 hours at 110° C.

The pressure within a furnace was then reduced to about 0.1–0.3 Torr by a vacuum pump in a nitrogen atmosphere at a flow rate of 10 l/min.

Sintering was then preformed under preset conditions shown in FIG. 17. Incidentally, the pressures shown in FIG. 17 are controlled pressures, and the changes in gas pressure, which are caused by the thermal expansion of the gas introduced in the furnace, are automatically controlled.

After the sintering was conducted for 60 minutes, the respective sintered bodies thus obtained were subjected to a solution treatment and an aging treatment in accordance with the respective processes in Experimental Example G1.

The first through 35th molded ceramic articles obtained in accordance with the above-described process were separately used as specimens to conduct the same tests as in Experimental Example G1. Their results are shown in FIG. 18.

As apparent from FIGS. 17 and 18, the numbers of times of the possible continuous spot welding were 900 spots and the percent fusion bonding was 14.3% with respect to the specimen made of the aluminum oxide dispersed copper containing 0.8 wt. % of aluminum oxide and used as the comparative example, while the specimens of this experimental example according to this invention were improved to about 2 times in the number of times of the possible continuous spot welding and mostly reduced to 0 in the fusion bonding behavior. Therefore, it can be judged that the molded ceramic articles according to this invention predominate in use as electrode materials.

It is also understood that it is preferable to use ethyl cellosolve, i.e., a liquid material as the carbonaceous material.

Experimental Example G3

The same powdery raw materials as those used in Experimental Examples G1 and G2 were used, and molded ceramic articles, to which the chromium, aluminum and titanium powders were added in combination in proportions of 0.8 wt. %, 0.3 wt. % and 0.1 wt. %, 1.5 wt. %, 0.5 wt. % and 0.3 wt. %, and 2.8 wt. %, 0.5 wt. % and 0.3 wt. %, were separately obtained in accordance with their corresponding composition ranges of the chromium, aluminum, titanium and carbonaceous material and their corresponding compositions of an inert gas and additive gases by which respective inert gas atmospheres were formed, said composition ranges and compositions being shown in FIG. 19a, in the same manner as in Experimental Examples G1 and G2 except that only the sintering time was reduced to 30 minutes. Incidentally, with respect to the carbonaceous materials to be added, ethyl cellosolve was used in the 13th through 15th cases and in the other cases, carbon black was used.

The molded ceramic articles thus obtained were separately used as specimens to conduct the same tests as in Experimental Examples G1 and G2. Their results are shown in FIG. 19b.

When the test results of this experimental example shown in FIG. 19b are compared with those of Experimental Example G2 shown in FIG. 18, it is found that the specimens of the present experimental example are more stable in basic physical properties such as density and hardness and more improved in both fusion bonding behavior and number of times of the possible continuous spot welding. Accordingly, it is judged that the surface of the raw powder was cleaned by adding NH$_3$, CO and/or H$_2$ to the inert gas.

Besides, with respect to the sintering time, Experimental Example G2 took 60 minutes in every case to sinter the preforms. Although the sintering time was shortened to 30 minutes in every case of the present experimental example on the contrary, the desired effects could be attained.

Therefore, it is judged that both nitriding and carbonizing efficiencies were enhanced, thereby facilitating the sintering.

The molded ceramic articles and production method thereof according to the present invention will hereinafter be described in detail by the following preferred eighth embodiment.

The Cu—Cr alloy obtained in the course of the production process of the molded ceramic articles according to the present invention undergoes fusion bonding upon welding of galvanized weld metals and aluminum alloys.

Therefore, in this embodiment, in order to avoid the phenomenon leading to the fusion bonding without lowering the electrical conductivity of the alloy, fine chromium, aluminum and titanium powders were caused to diffuse into electrolytic copper powder and a ceramic was then formed, whereby the crystal structure was made dense to prevent the penetration of the different metal components. Incidentally, purified and unoxidized powders were used upon the ceramic formation.

Further, prior to the ceramic formation, the mixed raw powder was plastically deformed by press molding or the like, thereby causing particles of the powder to bond to one another. Thereafter, their surfaces were subjected to a treatment for forming an oxide film of the order of 0.001–0.01 μm thereon and oxidizing parts of the aluminum and titanium added.

The reason why such a partial oxide film is formed is that when the whole surface of the raw powder is covered with the oxide film, a subsequent sintering is hindered, resulting in a failure in obtaining any dense ceramics. In addition, any oxide films thicker than 0.01 μm will hinder the sintering. On the contrary, any oxide films thinner than 0.001 μm will hinder the formation of chromium oxides and the growth of the oxide films, so that successful formation of the ceramics is not accomplished and hence, the desired effects cannot be attained.

The oxide films formed on the surfaces of the constituent particles in a preform accumulate in the grain boundaries at the final stage of the sintering and at the same time, facilitate the oxidation of chromium, aluminum and titanium in accordance with the following reactions and hence sintering.

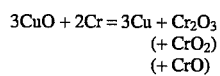
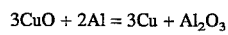
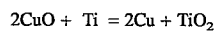

$3CuO + 2Cr = 3Cu + Cr_2O_3$
$(+ CrO_2)$
$(+ CrO)$ $3CuO + 2Al = 3Cu + Al_2O_3$ $2CuO + Ti = 2Cu + TiO_2$

By the way, in order to form the oxide films on the surfaces of the constituent particles in the preform, the preform was subjected to a heat treatment at 100°–300° C., preferably, 130°–250° C. in the atmosphere.

After the heat treatment, the preform is sintered in a nitrogen atmosphere at a flow rate of 10–300 ml/min with a view toward eliminating oxygen adsorbed prior to the sintering out of the system and making the oxide films formed on the surfaces of the particles uniform. Any flow rates more than 300 ml/min will make the temperature distribution in a furnace wider, resulting in a failure of accomplishing the evenness. On the contrary, any flow rates less than 10 ml/min cannot attain the desired effects.

The sintering is conducted in a temperature range of 950°–1,065° C. for a period of at least 30 minutes but at most 6 hours.

Any temperatures lower than 950° C. will be difficult to cause sintering to proceed. On the other hand, any temperatures higher than 1,065° C. will cause the resulting sintered body to soften and deform, and vaporize the copper component. The vaporized copper is then solidified to cause the breakdown of the molded ceramic article, so that there is a potential problem that a worker is shocked.

Experimental Example H1

A powder mix as raw materials was provided by weighing, as a main component making up a base metal, electrolytic copper powder having an average particle size of 44 μm, and as additive components, chromium powder having an average particle size of 0.8 μm, aluminum powder having an average particle size of 2.4 μm and titanium powder having an average particle size of 1.8 μm in such a way that they were respectively in proportions of 98.6 wt. %, 0.8 wt. %, 0.4 wt. % and 0.2 wt. %, all, based on the whole weight of the powder mix.

Ethanol was added to the powder mix and the mixture was wet-mixed in a ball mill to disperse and mix the chromium, aluminum and titanium powders into the electrolytic copper powder.

The content of the ethanol was then adjusted to about 12–13% and the thus-adjusted powder mix was then molded by uniaxial pressing into a preform in the form of 22×22×75 mm.

The thus-obtained preform was dried for 4 hours at 80° C. and then subjected to a heat treatment for 1 hours at 110° C. and for 4 hours at 210° C. in the atmosphere, thereby forming oxide films of the order of 0.001–0.01 μm on the surfaces of the particles making up the preform.

The thus-treated preform was heated to 650° C. at a rate of 10° C./min in a nitrogen atmosphere at a flow rate of 40 ml/min and held for 30 minutes at 650° C. After the flow rate of nitrogen was then reduced to 15 ml/min, the preform was heated up to 1,030° C. at a rate of 10° C./min and held for 1 hour at the same temperature and further heated up to 1,055° C. at a rate of 3° C./min and held for 15 minutes at the same temperature, thereby sintering the preform.

After the sintering, the resulting sintered body was cooled in a sintering furnace and subjected to a solution treatment for 2 hours at 1,000° C. in an argon atmosphere and then oil-cooled, thereby obtaining a molded ceramic article.

The molded ceramic article obtained in accordance with the above-described process was used as specimens to conduct the following various tests.

First of all, a weldability test will be described. Using two weld metals which were put on each other and composed of steel plates plated with each 45 g/m² of zinc on both sides and having a thickness of 0.8 mm, both continuous spot welding ability and fusion bonding behavior to the weld metals were tested under welding conditions of an applied pressure of 200 kg f/cm², a welding direct current of 10,000 A and a weld time of 10 seconds. Their results are shown in FIG. 20a.

By the way, tips making use of the above-obtained sintered body were water-cooled upon the tests. For the sake of comparison, aluminum oxide dispersed copper was used.

Besides, using two weld metals which were put on each other, made of an aluminum plate material, 5052 (corresponding to JIS A 5052P, U.S. Standard AA 5052, German Standard DIN AlMg 2.5, France Standard NF A-G 25C, Canada Standard CSA 5052 and Australia Standard A 5052)

and had a thickness of 2.0 mm, both continuous spot welding ability and fusion bonding behavior to the weld metals were tested under welding conditions of an applied pressure of 700 kg f/cm$^2$ and a welding direct current of 35,000 A. As another comparative example, a commercially-available chromium-copper was used in addition to the Al$_2$O$_3$ dispersed copper.

Their results are shown collectively in FIG. 20b.

As apparent from FIG. 20a, the number of times of the possible continuous spot welding was improved to 1.7 times compared with the specimen made of the aluminum oxide dispersed copper as the comparative example and the percent fusion bonding was decreased from 14.3% for the specimen made of the aluminum oxide dispersed copper to 0%.

The density of the specimen made of the aluminum oxide dispersed copper as the comparative example was 8.65 as measured in accordance with the Archimedean method, while the density of the specimen according to this experimental example was increased to 8.92.

The hardness, $H_{RB}$ of the specimen of the comparative example making use of the aluminum oxide dispersed copper was 72 as measured in accordance with the Rockwell hardness test making use of a steel ball, while the hardness, $H_{RB}$ of the specimen according to this experimental example was 63 and 72% of the comparative specimen.

As a result of a chemical analysis, it was found that the molded ceramic article contained 98.1% of Cu, 1.5% of Cr, 0.4% of Al, 0.2% of Ti and 0.9% of O$_2$ and hence, it was confirmed that oxygen was contained. From this result, the following reaction system was established.

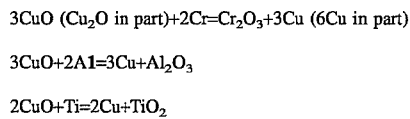

$3CuO \text{ (Cu}_2\text{O in part)}+2Cr=Cr_2O_3+3Cu \text{ (6Cu in part)}$ $3CuO+2Al=3Cu+Al_2O_3$ $2CuO+Ti=2Cu+TiO_2$ It is understood that the transfer of electrons occurred between the copper particles on which the oxide films were formed by the heat treatment, and chromium, aluminum and titanium by the sintering to oxidize chromium, aluminum and titanium, thereby leading to the improvement of the continuous spot welding ability.

The crystallinity of the specimens was observed by etching the specimens with a mixed liquid of FeCl$_3$ and HCl$_3$. As a result, the specimen of the comparative example was in a fibrous form, while a dense crystal lattice was observed on the specimen of the experimental example.

In the observation of the structure making use of an electron microscope, the deposition of the ceramic components was observed on the crystal grains of copper. It is understood that such ceramic components were deposited by oxidation in the course of the ceramic-forming process of chromium. In addition, the bonding of the deposited components to the crystal grains of copper was observed. It is understood that their bonding was a chemical bond accompanied by diffusion.

The microfocus X-ray analysis is used to identify the oxides, and Cr$_2$O$_3$, TiO$_2$, Al$_2$O$_3$ and small amounts of CrO$_2$ and TiO were specified.

Incidentally, although metal aluminum powder and metal titanium powder were used respectively as raw materials for the oxides of aluminum and titanium in this experimental example, it is also possible to add them in the form of an oxide from the beginning.

Experimental Example H2

The same powdery raw materials as those used in Experimental Example H1 were used. Ethanol was added to first through 35th powder mixes of their corresponding composition ratios diagrammatically shown in FIG. 21. Each of the resulting mixtures was wet-mixed for 5 days in a ball mill to disperse and mix the chromium powder into the electrolytic copper powder.

The resulting mixtures were separately molded in the same manner as in Experimental Example E1, thereby obtaining respective preforms. The thus-obtained preforms were dried at 80° C. Thereafter, the preforms were respectively treated in accordance with the first through 35th process conditions shown in FIG. 10a, thereby obtaining molded ceramic articles.

The first through 35th sintered bodies thus obtained were separately used as specimens to conduct the same tests as in Experimental Example H1. Their results are shown in FIG. 22. It can be judged collectively from the test results that when the amounts added are within the range of from at least 0.4 wt. % to at most 3.0 wt. %, preferably, from at least 0.8 wt. % to at most 2.4 wt. % with respect to the chromium, within the range of from at least 0.05 wt. % to at most 1.2 wt. %, preferably, from at least 0.1 wt. % to at most 0.8 wt. % with respect to the aluminum and within the range of from at least 0.03 wt. % to at most 1.0 wt. %, preferably, from at least 0.05 wt. % to at most 0.6 wt. % with respect to the titanium, the resulting molded ceramic article can suitably be put to practical use.

The molded ceramic articles and production method thereof according to the present invention will hereinafter be described in detail by the following preferred ninth embodiment.

Figure 24:
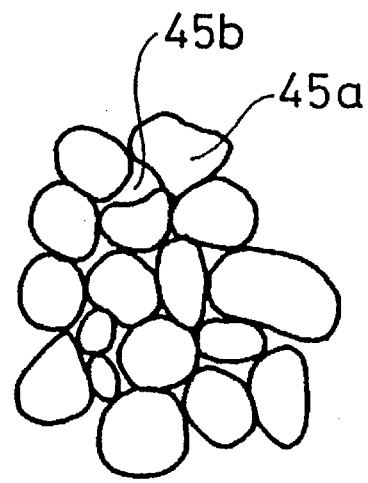
FIG. 24 schematically illustrates the condition of open voids.
Figure 25:
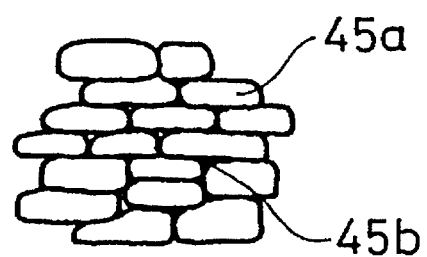
FIG. 25 schematically illustrates the condition of closed voids.
Figure 26:
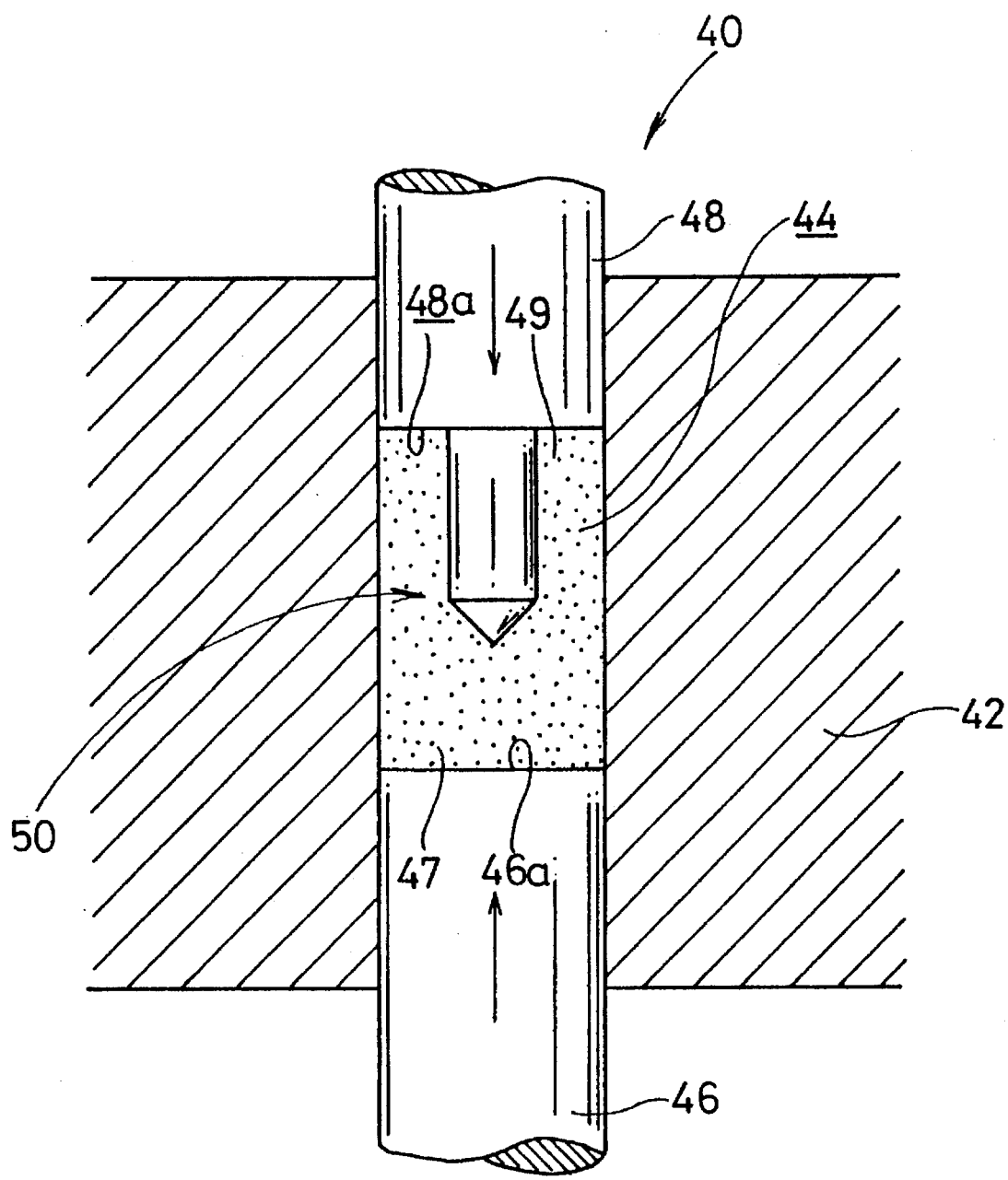
FIG. 26 is a vertical cross-sectional view of a molding machine used in the preferred embodiment of the production method of the present invention.
Figure 28A:
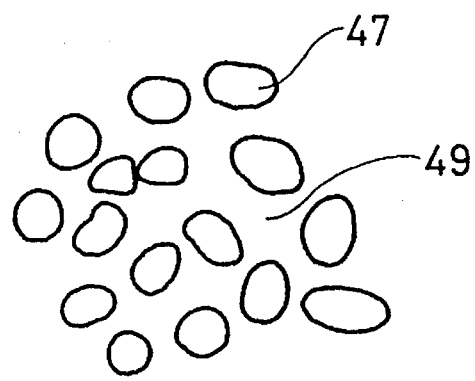
FIG. 28 is a view illustrating compression densities of particles in the respective processes in Experimental Example I according to the preferred embodiment of the production method of the present invention.
Figure 28B:
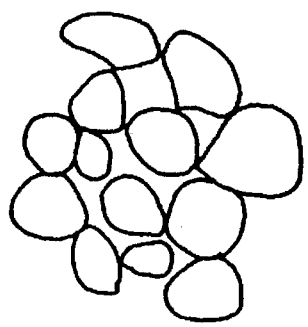
Figure 28C:
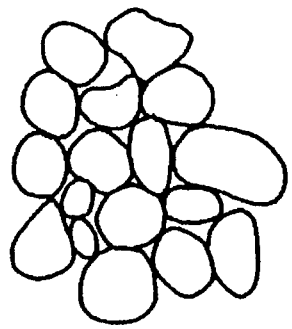
Figure 28D:
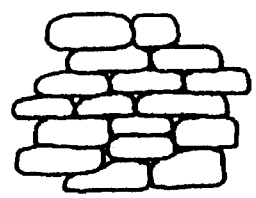
Figure 30:
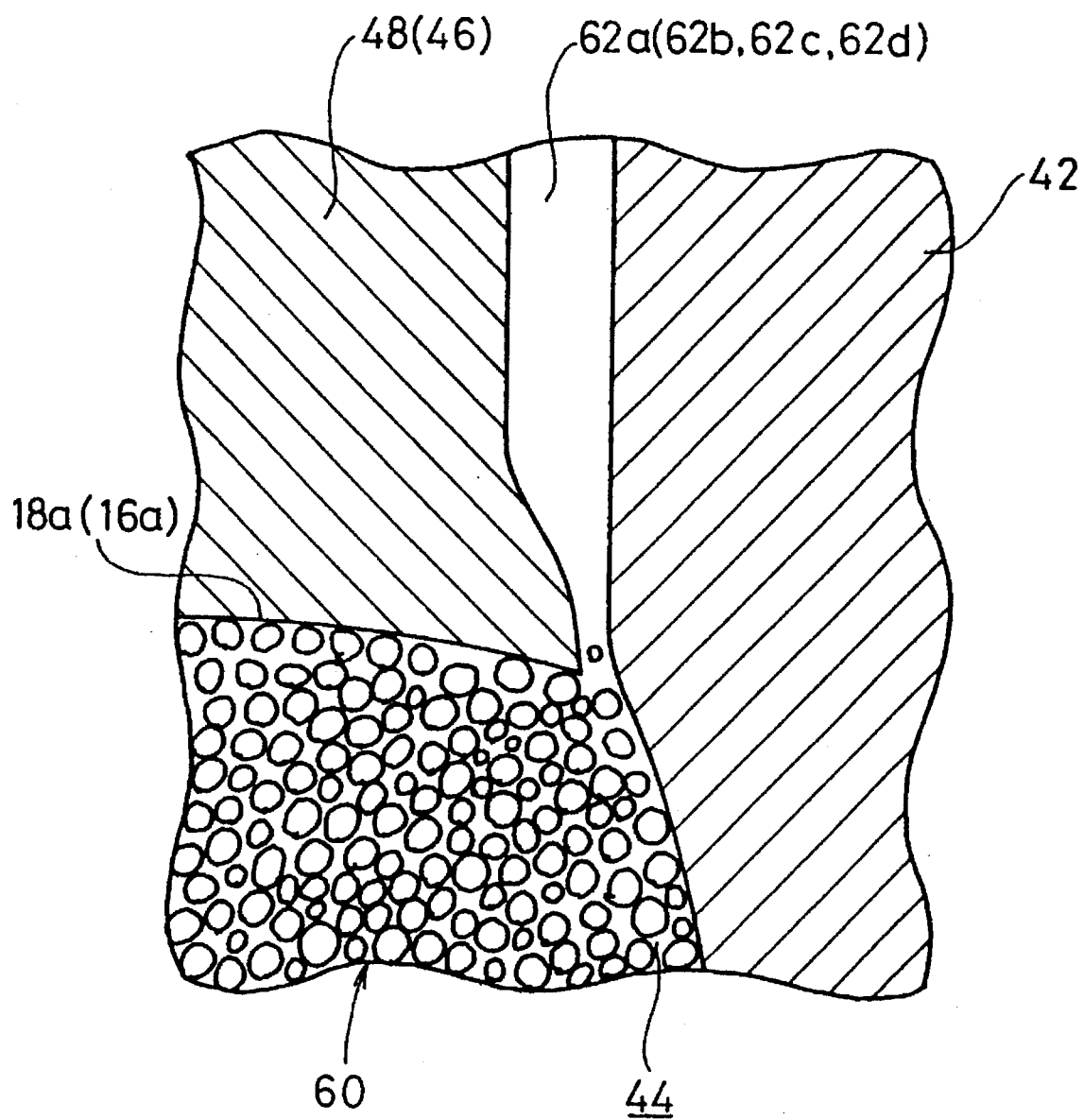
FIG. 30 is an enlarged fragmentary view of FIG. 29.

In the conventional uniaxial press molding, individual particles undergo complicated movement, which is caused by frictional resistance between adjacent particles and/or differences in size, hardness, etc. of the particles, or the material and/or difference in surface roughness, etc. of a mold defining a cavity 44 in a molding apparatus 40 illustrated in FIG. 26. Accordingly, it is difficult to apply a uniform pressure to a raw material 45 composed of the particles only so as to obtain a preform having a throughout uniform density. Therefore, it has been attempted to increase the density by applying an excessive pressure to the raw material 45 to plastically deform the raw material 45 into a state as illustrated in FIGS. 24 and 25. Even in this case, both low-density portions and high-density portions remain in the preform.

When the preform thus obtained is calcined to obtain a molded ceramic article, a gas 45b remaining between particles 45a of the raw material 45 is discharged out through paths formed of interparticle spaces at the low-density portions in the raw material 45 in the form of compressed powder, as illustrated in FIG. 24, as the particles are densified upon sintering. At the high-density portions in the compressed raw material 45, as illustrated in FIG. 25, the remaining gas 45b is however surrounded by the particles 45a, so that so-called closed voids are generated, and the remaining gas 45b is sealed in the closed voids and hence not discharged out. In addition, although the volume of the remaining gas 45b is decreased until the densifying pressure upon the sintering reaches the equilibrium condition to the internal pressure of the remaining gas 45b as the preform is sintered gradually, it is difficult to allow the closed voids to vanish completely.

In this experimental example on the contrary, when a mixture 50 with a liquid additive 49 added to the raw material 45 in the form of powder is subjected to the uniaxial press molding, the individual particles of the raw material 45 form bridges 64 by crosslinking the apices and/or edges of the particles to one another in clearances 42a through 42d between the wall of the mold, which makes up the cavity 44 in the molding apparatus 40, and punches. Thereafter, an excess of the liquid additive 49 is eliminated through voids in the bridges 64, while the raw material 45 is molded into a preform under a pressure within the pressure range, in which the raw material 45 can be elastically deformed, through a hydrostatic applied condition of pressure. As a result, a preform having a throughout uniform density can be obtained. Further, the gas remaining between the particles can be discharged out upon the sintering.

Experimental Example I

In the production method of molded ceramic articles according to Experimental Example I, a molding apparatus 40 illustrated in FIG. 26 is used. First of all, liquid additive 49 shown in FIG. 23 were respectively added to their corresponding first through seventh raw materials in the form of powder, which will be shown in FIG. 23, followed by mixing to obtain respective mixtures 60.

The mixtures 60 were then filled in respective cavities 44 of the molding apparatus 40. At this time, clearances 42a through 42d defined between the wall of a mold making up the cavity 44, and a lower punch 46 and a upper punch 48 have respective sizes shown in FIG. 23. The sliding surfaces of the lower punch 46 and the upper punch 48 to the mold 40 are planished.

Thereafter, there begun to press each of the mixtures 60 by the lower punch 46 and the upper punch 48. In FIG. 27, the relationship between pressures applied and densities in the course of the molding of a preform in this experiment example is indicated by a solid line 66, and the relationship therebetween in the course of the molding of a preform in the prior art free of any liquid additives is indicated by a solid line 68, and moreover the relationship between discharged amounts of the excess of the liquid additive and the pressure applied is indicated by a solid line 70.

In a coarse loading process indicated by A in FIG. 27, the particles of the raw material 47 composing the mixture 60 are independently dispersed in the liquid additive 49 as illustrated in (a) of FIG. 28.

A further application of pressure causes to move the particles 45a and discharge the excess of the liquid component, whereby the compression process of the particles 45a is transferred to a transition process B of the density of such a degree that edges and/or apices of the particles 45a of the raw material 47 are joined to one another as illustrated in (b) of FIG. 28. At the transfer to the transition process B, the pressure applied is generally 750 kg f/cm$^2$.

Figure 31:
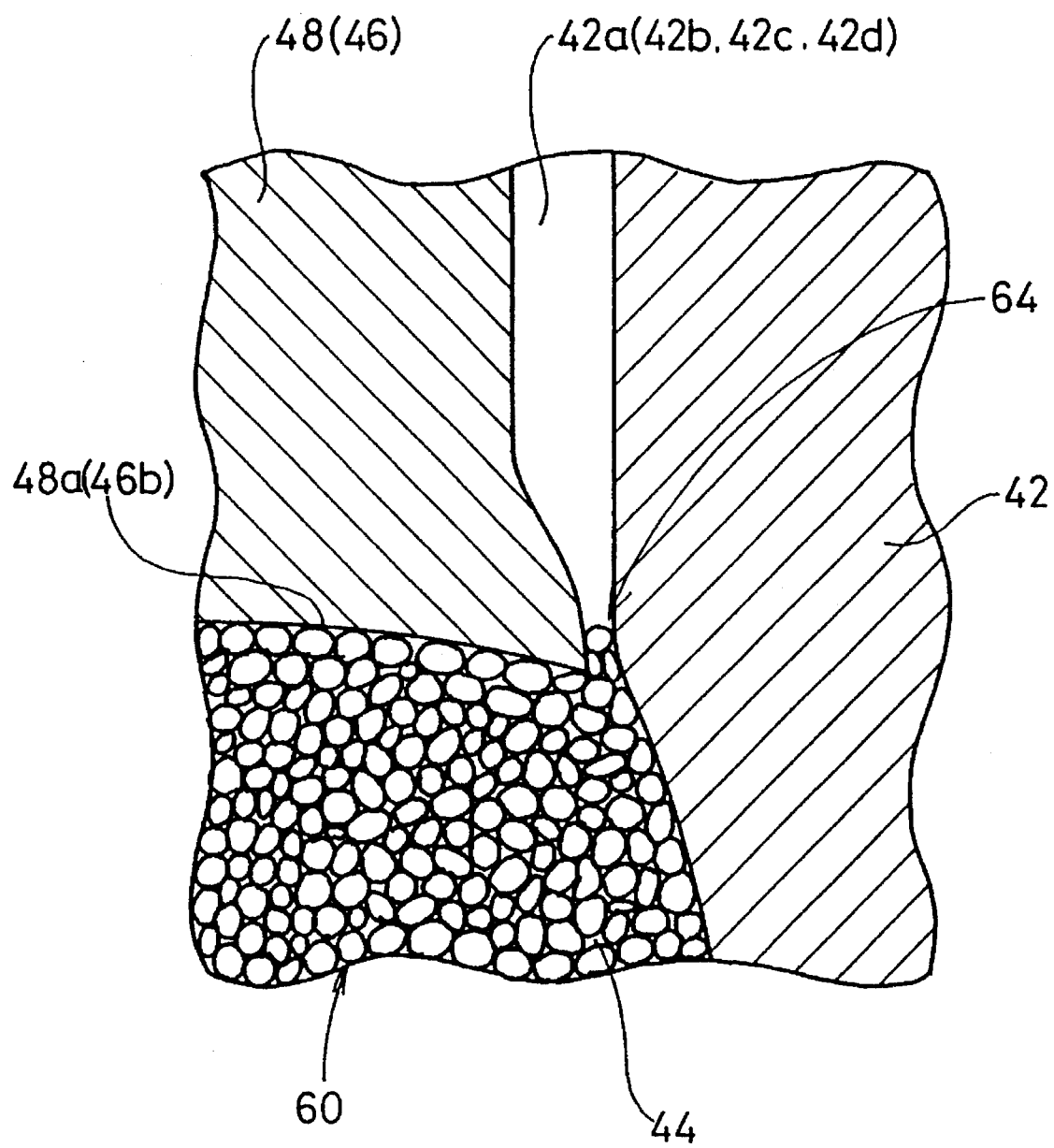
FIG. 31 is an enlarged view of a bridge formed in the transition process in Experimental Example I according to the preferred embodiment of the production method of the present invention.

In the transition process B, the lower punch 46 and upper punch 48 are strained by the reaction force from the mixture 60 at respective contact surfaces 46a, 48a with the mixture 60 as schematically illustrated in FIG. 29. As a result, the contact surfaces 46a, 48a come to extend toward the mold 42, whereby the clearances 42a through 42d are made narrower. By the way, with respect to the flowability of the particles 45a composing the mixture a portion of the particles 45a, which is situated in the center, has higher flowability than that of another portion of the particles 45a, which is situated in the vicinity of the mold 42, because the frictional resistance between the wall surface of the mold 42 and the particles 45a is greater than that between adjacent particles Accordingly, the most heaviest stress is applied to edges 60a through 60d of the mixture 60 from the above-described two main causes. As a result, the densification of the particles 45a is started from the edges 60a through 60d. As the pressure applied is increased, portions of particles 45a, which have been joined to one another by the densification, are finally crosslinked between the edges 60a through 60d and the wall surface of the mold to form bridges 64 (FIG. 31).

The bridges 64 thus formed prevent the particles 45a composing the mixture 60 from flowing out of the cavity 44. In addition, the hydrostatically applied condition of pressure is kept by the liquid additive 49 remaining in a suitable amount, whereby the compression process of the particles 45a is transferred to a dense loading process C. Incidentally, a uniform pressure is applied to the whole mixture 60 in this process.

In the dense loading process C, as indicated by the solid line 66 in FIG. 27, the densification of the mixture 60 is caused to further proceed under a pressure within a pressure range, in which the mixture 60 is elastically deformed, through a hydrostatically applied condition of pressure while an excess of the liquid component is discharged. As a result, the preform molded in accordance with this experimental example becomes homogeneous and has a uniform density at every portion. Besides, since the particles 45a are placed within the elastic deformation region, the interparticle voids are also kept in the state of open voids.

In the dense loading process C, if a pressure higher than 1,500 kg f/cm$^2$ is applied, the density of the preform is scarcely increased. At this time, the molding of the preform can be completed. On the contrary, in the method according to the prior art, which is free of any liquid additives and is indicated by the solid line 68, it is necessary to increase the pressure applied further up to about 75,000 kg f/cm$^2$ including the subsequent calcining process, in order to impart a desired density to a preform to complete the molding. According to the method of this experimental example, it is therefore possible to obtain a preform under a pressure about one fiftieth to one hundredth of that required in the method according to the prior art.

The thickness of the preforms obtained by the method according to the prior art was at most about 10 mm. According to the method of this experimental example, it is however possible to mold preforms having a thickness up to about 120 mm.

Lastly, the preforms obtained by the above-described method were separately calcined to obtain respective molded ceramic articles. The preform obtained by the method according to the prior art is not uniform in the compression condition of all portions and has closed voids as illustrated in (d) of FIG. 28. Therefore, such a preform cannot have sufficient strength. On the other hand, the compression condition of the preform obtained by the method according to this experimental example is in the state having open voids as illustrated in (c) of FIG. 28. It is therefore possible to discharge the gas remaining in the interior of the preform so as to eliminate any voids after the calcination. Molded ceramic articles having a high density can hence be obtained.

According to the production method of molded ceramic articles of the present invention, as has been described above, since the press molding can be conducted in a hydrostatically applied condition of pressure by using a liquid additive, a pressure is applied uniformly to a powder mix as raw materials, whereby high-quality molded ceramic articles having a throughout uniform density and little surface roughness can be provided with ease by applying a small pressure in accordance with a simple process. In addition, since the liquid additive has a high detergency, a mold is always kept clean, whereby bring about an effect to significantly prolong the service life of the mold.

Further, according to the production method of molded ceramic articles of the present invention, it is possible to improve the wettability with a matrix to undergo interfacial bonding, thereby making a molded ceramic article dense by sintering. Accordingly, when such a molded ceramic article is used as an electrode material or the like, it is possible to prevent the diffusion or penetration of metal component(s) in a work into the electrode or the like and the formation of any alloys or solid solutions with the metal component and further the formation of any oxides, and bring about effects to reduce the intergranular resistance, intergranular discharge and electrolytic corrosion of the matrix.

Furthermore, according to the production method of molded ceramic articles of the present invention, there are brought about such effects that a molded ceramic article which is excellent in mechanical strength and electrical conductivity upon its use as an electrode material or the like can be provided and its service life as the electrode material or the like can be prolonged owing to possible reduction of its fusion bonding behavior to a weld metal, and moreover the electrode material and the like can be easily obtained at low cost owing to the improvement of sintering efficiency.

What is claimed is:

1. A method of producing a molded article, which comprises:

providing a powder mix as raw materials comprising electrolytic copper powder as a main component, and chromium powder within a composition range of from at least 0.4 wt. % to at most 3.0 wt. % based on the whole weight of the powder mix and a carbonaceous material in which the carbon residue falls within a composition range of at most 0.1 wt. %, or chromium powder in a proportion of from at least 4 mg to at most 30 mg per gram of the powder mix and a carbonaceous material in which the carbon residue is in a proportion of at most 1 mg per gram of the powder mix to diffuse the chromium powder into the electrolytic copper powder;

the first step wet-mixing the powder mix with a liquid additive thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of at most 700° C. under an inert gas atmosphere and then sintering the preform in a temperature range of from at least 950° C. to at most 1065° C. under an inert gas atmosphere whose pressure is lower than 10 kg/cm$^2$, thereby depositing a reinforcement on a part of the surface of the chromium powder.

2. A method as claimed in claim 1, wherein the reinforcement deposited in the third step is at least one carbide, nitride or carbonitride selected from the group consisting of $Cr_4C_3$, $Cr_3C_2$, $CrN_2$, CrN and Cr(C, N).

3. A method as claimed in claim 1, wherein the inert gas atmosphere is obtained by adding $H_2$, CO or $NH_3$ to an inert gas.

4. A method of producing a molded article, which comprises:

providing a powder mix as raw materials comprising electrolytic copper powder as a main component, and chromium powder within a composition range of from at least 0.4 wt. % to at most 3.0 wt. % based on the whole weight of the powder mix or in a proportion of from at least 4 mg to at most 30 mg per gram of the powder mix to diffuse the chromium powder into the electrolytic copper powder;

the first step wet-mixing powder mix with a liquid additive thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of from at least 100° C. to at most 300° C. under an inert gas atmosphere and then sintering the preform in a temperature range of from at least 950° C. to at most 1065° C. under an inert gas atmosphere, thereby depositing and dispersing a ceramic reinforcement on a part of the surface of the chromium powder.

5. A method as claimed in claim 4, wherein the reinforcement deposited and dispersed in the third step is at least one oxide selected from the group consisting of CrO, $CrO_2$ and $Cr_2O_3$.

6. A method of producing a molded article, which comprises:

providing a powder mix as raw materials comprising electrolytic copper powder as a main component, and chromium powder within a composition range of from at least 0.4 wt. % to at most 3.0 wt. % based on the whole weight of the powder mix, aluminum powder within a composition range of from at least 0.05 wt. % to at most 1.2 wt. %, titanium powder within a composition range of from at least 0.03 wt. % to at most 1.0 wt. % and a carbonaceous material in which the carbon residue falls within a composition range of at most 0.1 wt. %, or chromium powder in a proportion of from at least 4 mg to at most 30 mg per gram of the powder mix, aluminum powder in a proportion of from at least 0.5 mg to at most 12 mg per gram of the powder mix, titanium powder in a proportion of from at least 0.3 mg to at most 10 mg per gram of the powder mix and a carbonaceous material in which the carbon residue is in a proportion of at most 1 mg per gram of the powder mix to diffuse the chromium powder, the aluminum powder and the titanium powder into the electrolytic copper powder;

the first step wet-mixing the powder mix with a liquid additive thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of at most 700° C. under an inert gas atmosphere and then sintering the preform in a temperature range of from at least 950° C. to at most 1065° C. under an inert gas atmosphere whose pressure is lower than 10 kg/cm$^2$, thereby depositing a reinforcement on a part of the surface of the chromium powder and on at least parts of the surfaces of the aluminum powder and titanium powder.

7. A method as claimed in claim 6, wherein the reinforcement obtained in the third step comprises:

at least one carbide or nitride selected from the group consisting of $Cr_4C_3$, $Cr_3C_2$, $CrN_2$, CrN, TiN and TiC;

at least one carbonitride selected from the group consisting of Cr(C, N) and Ti(C, N); and at least one oxide selected from the group consisting of $Al_2O_3$, $TiO_2$ and TiO.

8. A method as claimed in claim 6, wherein the inert gas atmosphere is obtained by adding $H_2$, CO or $NH_3$ to an inert gas.

9. A method of producing a molded article, which comprises:

providing a powder mix as raw materials comprising electrolytic copper powder as a main component, and chromium powder within a composition range of from at least 0.4 wt. % to at most 3.0 wt. % based on the whole weight of the powder mix or in a proportion of from at least 4 mg to at most 30 mg per gram of the powder mix, aluminum powder within a composition range of from at least 0.05 wt. % to at most 1.2 wt. % based on the whole weight of the powder mix or in a proportion of from at least 0.5 mg to at most 12 mg per gram of the powder mix and titanium powder within a composition range of from at least 0.03 wt. % to at most 1.0 wt. % based on the whole weight of the powder mix or in a proportion of from at least 0.3 mg to at most 10 mg per gram of the powder mix to diffuse the chromium powder, the aluminum powder and the titanium powder into the electrolytic copper powder;

the first step wet-mixing the powder mix with a liquid additive thereby obtaining a mixed raw material;

the second step press-molding the mixed raw material obtained in the first step in a hydrostatically applied condition of pressure, thereby removing an excess of the liquid additive to obtain a preform; and the third step subjecting the preform obtained in the second step to a heat treatment within a temperature range of from at least 100° C. to at most 300° C. under an inert gas atmosphere and then sintering the preform in a temperature range of from at least 950° C. to at most 1065° C. under an inert gas atmosphere, thereby depositing and dispersing a ceramic reinforcement on a part of the surface of the chromium powder and on at least parts of the surfaces of the aluminum powder and titanium powder.

10. A method as claimed in claim 9, wherein the deposited and dispersed reinforcement obtained in the third step is at least one oxide selected from the group consisting of CrO, $CrO_2$, $Cr_2O_3$, $Al_2O_3$, TiO and $TiO_2$.

* * * * *